US009310889B2

(12) United States Patent
Griffin et al.

(10) Patent No.: US 9,310,889 B2
(45) Date of Patent: Apr. 12, 2016

(54) TOUCHSCREEN KEYBOARD PREDICTIVE DISPLAY AND GENERATION OF A SET OF CHARACTERS

(71) Applicant: Research In Motion Limited, Waterloo (CA)

(72) Inventors: Jason Tyler Griffin, Kitchener (CA); Gil Pinheiro, Cambridge (CA); Donald Somerset McCulloch McKenzie, Waterloo (CA); Jerome Pasquero, Montreal (CA); David Ryan Walker, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 341 days.

(21) Appl. No.: 13/773,812

(22) Filed: Feb. 22, 2013

(65) Prior Publication Data

US 2013/0176228 A1    Jul. 11, 2013

Related U.S. Application Data

(63) Continuation-in-part of application No. 13/588,803, filed on Aug. 17, 2012, which is a continuation of application No. 13/373,356, filed on Nov. 10, 2011, now Pat. No. 8,490,008.

(51) Int. Cl.
*G06F 17/21*    (2006.01)
*G06F 3/01*    (2006.01)
*G06F 17/27*    (2006.01)
(Continued)

(52) U.S. Cl.
CPC .............. *G06F 3/017* (2013.01); *G06F 3/0237* (2013.01); *G06F 3/04886* (2013.01); *G06F 17/276* (2013.01)

(58) Field of Classification Search
CPC ....... G06F 17/21; G06F 3/048; G06F 3/0484; G06F 3/02; G06F 3/041
See application file for complete search history.

(56) References Cited

U.S. PATENT DOCUMENTS

| 3,872,433 | A | 3/1975 | Holmes et al. |
| 4,408,302 | A | 10/1983 | Fessel et al. |
| 5,261,009 | A | 11/1993 | Bokser |

(Continued)

FOREIGN PATENT DOCUMENTS

| CA | 2688204 | 7/2010 |
| CA | 2812457 | 10/2013 |

(Continued)

OTHER PUBLICATIONS

Distinctive Touch: Gesture-based lightweight identification for touchscreen displays, Electronic Max, Dec. 7, 2004, http://courses.media.mit.edu/2004fall/mas622j/04.projects/students/VanKleek/; accessed online Apr. 27, 2009, pp. 1-11.

(Continued)

*Primary Examiner* — Rashawn Tillery

(57) ABSTRACT

A communication device includes a display with a layout including key locations with associated characters. The communication device detects an input gesture and determines one or more committed characters based at least in part on a change in the input gesture. The device presents one or more strings on the layout in association with key locations that are selected based at least in part on a relationship between each presented string and non-committed characters of each presented string.

20 Claims, 43 Drawing Sheets

(51) Int. Cl.
  *G06F 3/023*    (2006.01)
  *G06F 3/0488*   (2013.01)

(56) References Cited

U.S. PATENT DOCUMENTS

| | | |
|---|---|---|
| 5,523,775 A | 6/1996 | Capps |
| 5,664,127 A | 9/1997 | Anderson et al. |
| 5,832,528 A | 11/1998 | Kwatinetz et al. |
| 5,963,671 A | 10/1999 | Comerford et al. |
| 6,002,390 A | 12/1999 | Masui |
| 6,064,340 A | 5/2000 | Martin et al. |
| 6,094,197 A | 7/2000 | Buxton et al. |
| 6,223,059 B1 | 4/2001 | Haestrup |
| 6,226,299 B1 | 5/2001 | Henson |
| 6,351,634 B1 | 2/2002 | Shin |
| 6,421,453 B1 | 7/2002 | Kanevsky et al. |
| 6,573,844 B1 | 6/2003 | Venolia et al. |
| 6,621,424 B1 | 9/2003 | Brand |
| 6,646,572 B1 | 11/2003 | Brand |
| 6,801,190 B1 | 10/2004 | Robinson et al. |
| 7,061,403 B2 | 6/2006 | Fux |
| 7,098,896 B2 | 8/2006 | Kushler et al. |
| 7,107,204 B1 | 9/2006 | Liu et al. |
| 7,216,588 B2 | 5/2007 | Suess |
| 7,259,752 B1 | 8/2007 | Simmons |
| 7,277,088 B2 | 10/2007 | Robinson et al. |
| 7,292,226 B2 | 11/2007 | Matsuura et al. |
| 7,304,638 B2 | 12/2007 | Murphy |
| 7,318,019 B1 | 1/2008 | Baker et al. |
| 7,382,358 B2 | 6/2008 | Kushler et al. |
| 7,394,346 B2 | 7/2008 | Bodin |
| 7,443,316 B2 | 10/2008 | Lim |
| 7,479,949 B2 | 1/2009 | Jobs et al. |
| 7,487,461 B2 | 2/2009 | Zhai et al. |
| 7,526,316 B2 | 4/2009 | Shimizu |
| 7,530,031 B2 | 5/2009 | Iwamura et al. |
| 7,539,472 B2 | 5/2009 | Sloo |
| 7,661,068 B2 | 2/2010 | Lund |
| 7,671,765 B2 | 3/2010 | Fux |
| 7,692,629 B2 | 4/2010 | Baudisch et al. |
| 7,694,231 B2 | 4/2010 | Kocienda et al. |
| 7,698,127 B2 | 4/2010 | Trower, II et al. |
| 7,886,233 B2 | 2/2011 | Rainisto et al. |
| 7,934,156 B2 | 4/2011 | Forstall et al. |
| 8,023,930 B2 | 9/2011 | Won |
| 8,042,056 B2 | 10/2011 | Wheeler et al. |
| 8,059,101 B2 | 11/2011 | Westerman et al. |
| 8,065,624 B2 | 11/2011 | Morin et al. |
| 8,201,087 B2 | 6/2012 | Kay et al. |
| 8,225,203 B2 | 7/2012 | Unruh |
| 8,276,099 B2 | 9/2012 | Yost |
| 8,289,283 B2 | 10/2012 | Kida et al. |
| 8,294,680 B2 | 10/2012 | Karlsson |
| 8,326,358 B2 | 12/2012 | Runstedler et al. |
| 8,490,008 B2 | 7/2013 | Griffin et al. |
| 8,516,367 B2 | 8/2013 | Archer |
| 8,516,386 B2 | 8/2013 | Adam et al. |
| 8,542,206 B2 | 9/2013 | Westerman et al. |
| 2002/0057256 A1 | 5/2002 | Flack |
| 2002/0080186 A1 | 6/2002 | Frederiksen |
| 2002/0097270 A1 | 7/2002 | Keely et al. |
| 2002/0122029 A1 | 9/2002 | Murphy |
| 2002/0154037 A1 | 10/2002 | Houston |
| 2002/0180797 A1 | 12/2002 | Bachmann |
| 2003/0182279 A1 | 9/2003 | Willows |
| 2004/0111475 A1 | 6/2004 | Schultz |
| 2004/0135818 A1 | 7/2004 | Thomson et al. |
| 2004/0140956 A1 | 7/2004 | Kushler et al. |
| 2004/0153963 A1 | 8/2004 | Simpson et al. |
| 2004/0168131 A1 | 8/2004 | Blumberg |
| 2004/0201576 A1 | 10/2004 | Shimada et al. |
| 2005/0017954 A1 | 1/2005 | Kay et al. |
| 2005/0024341 A1 | 2/2005 | Gillespie et al. |
| 2005/0039137 A1 | 2/2005 | Bellwood et al. |
| 2005/0052425 A1 | 3/2005 | Zadesky et al. |
| 2005/0093826 A1 | 5/2005 | Huh |
| 2005/0162407 A1 | 7/2005 | Sakurai et al. |
| 2005/0195173 A1 | 9/2005 | McKay |
| 2005/0244208 A1 | 11/2005 | Suess |
| 2005/0275632 A1 | 12/2005 | Pu et al. |
| 2005/0283358 A1 | 12/2005 | Stephanick et al. |
| 2006/0022947 A1 | 2/2006 | Griffin et al. |
| 2006/0026521 A1 | 2/2006 | Hotelling et al. |
| 2006/0033724 A1 | 2/2006 | Chaudhri et al. |
| 2006/0053387 A1 | 3/2006 | Ording |
| 2006/0176283 A1 | 8/2006 | Suraqui |
| 2006/0209040 A1 | 9/2006 | Garside et al. |
| 2006/0239562 A1 | 10/2006 | Bhattacharyay et al. |
| 2006/0253793 A1 | 11/2006 | Zhai et al. |
| 2006/0265648 A1 | 11/2006 | Rainisto et al. |
| 2006/0265668 A1 | 11/2006 | Rainisto |
| 2006/0279548 A1 | 12/2006 | Geaghan |
| 2006/0285163 A1 | 12/2006 | Han et al. |
| 2007/0015534 A1 | 1/2007 | Shimizu |
| 2007/0040813 A1* | 2/2007 | Kushler et al. ............... 345/173 |
| 2007/0046641 A1 | 3/2007 | Lim |
| 2007/0061753 A1 | 3/2007 | Ng et al. |
| 2007/0074131 A1 | 3/2007 | Assadollahi |
| 2007/0150842 A1 | 6/2007 | Chaudhri et al. |
| 2007/0152978 A1 | 7/2007 | Kocienda et al. |
| 2007/0152979 A1 | 7/2007 | Jobs et al. |
| 2007/0156394 A1 | 7/2007 | Banerjee et al. |
| 2007/0157085 A1 | 7/2007 | Peters |
| 2007/0229476 A1 | 10/2007 | Huh |
| 2007/0256029 A1 | 11/2007 | Maxwell |
| 2007/0260981 A1 | 11/2007 | Kim et al. |
| 2007/0263932 A1 | 11/2007 | Bernardin et al. |
| 2008/0016457 A1 | 1/2008 | Tabuchi et al. |
| 2008/0033713 A1 | 2/2008 | Brostrom |
| 2008/0100581 A1 | 5/2008 | Fux |
| 2008/0122796 A1 | 5/2008 | Jobs et al. |
| 2008/0126387 A1 | 5/2008 | Blinnikka |
| 2008/0136587 A1 | 6/2008 | Orr |
| 2008/0141125 A1 | 6/2008 | Ghassabian |
| 2008/0158020 A1 | 7/2008 | Griffin |
| 2008/0165202 A1 | 7/2008 | Brodersen et al. |
| 2008/0168366 A1 | 7/2008 | Kocienda et al. |
| 2008/0184360 A1 | 7/2008 | Kornilovsky et al. |
| 2008/0189605 A1 | 8/2008 | Kay et al. |
| 2008/0195388 A1 | 8/2008 | Bower et al. |
| 2008/0231610 A1 | 9/2008 | Hotelling et al. |
| 2008/0259040 A1 | 10/2008 | Ording et al. |
| 2008/0266261 A1 | 10/2008 | Idzik |
| 2008/0266263 A1 | 10/2008 | Motaparti |
| 2008/0273013 A1 | 11/2008 | Levine et al. |
| 2008/0281583 A1 | 11/2008 | Slothouber et al. |
| 2008/0304890 A1 | 12/2008 | Shin et al. |
| 2008/0309644 A1 | 12/2008 | Arimoto |
| 2008/0316183 A1 | 12/2008 | Westerman et al. |
| 2008/0318635 A1 | 12/2008 | Yoon et al. |
| 2009/0002326 A1 | 1/2009 | Pihlaja |
| 2009/0006991 A1 | 1/2009 | Lindberg et al. |
| 2009/0007001 A1 | 1/2009 | Morin et al. |
| 2009/0025089 A1 | 1/2009 | Martin et al. |
| 2009/0058823 A1 | 3/2009 | Kocienda |
| 2009/0058830 A1 | 3/2009 | Herz et al. |
| 2009/0066668 A1 | 3/2009 | Kim et al. |
| 2009/0077464 A1 | 3/2009 | Goldsmith et al. |
| 2009/0085881 A1 | 4/2009 | Keam |
| 2009/0094562 A1 | 4/2009 | Jeong et al. |
| 2009/0125848 A1 | 5/2009 | Keohane et al. |
| 2009/0132576 A1 | 5/2009 | Miller et al. |
| 2009/0144667 A1 | 6/2009 | Christoffersson et al. |
| 2009/0150785 A1 | 6/2009 | Asami et al. |
| 2009/0160800 A1 | 6/2009 | Liu et al. |
| 2009/0167700 A1 | 7/2009 | Westerman et al. |
| 2009/0174667 A1 | 7/2009 | Kocienda et al. |
| 2009/0193334 A1 | 7/2009 | Assadollahi |
| 2009/0213081 A1 | 8/2009 | Case, Jr. |
| 2009/0228792 A1 | 9/2009 | Van Os et al. |
| 2009/0228842 A1 | 9/2009 | Westerman et al. |
| 2009/0237361 A1 | 9/2009 | Mosby et al. |
| 2009/0240949 A9 | 9/2009 | Kitchens et al. |
| 2009/0247112 A1 | 10/2009 | Lundy et al. |

(56) References Cited

U.S. PATENT DOCUMENTS

| | | |
|---|---|---|
| 2009/0251410 A1 | 10/2009 | Mori et al. |
| 2009/0254818 A1 | 10/2009 | Jania et al. |
| 2009/0259962 A1 | 10/2009 | Beale |
| 2009/0265669 A1 | 10/2009 | Kida et al. |
| 2009/0267909 A1 | 10/2009 | Chen et al. |
| 2009/0284471 A1 | 11/2009 | Longe et al. |
| 2009/0295737 A1 | 12/2009 | Goldsmith et al. |
| 2009/0307768 A1 | 12/2009 | Zhang et al. |
| 2009/0313693 A1 | 12/2009 | Rogers |
| 2010/0020033 A1 | 1/2010 | Nwosu |
| 2010/0020036 A1 | 1/2010 | Hui et al. |
| 2010/0026650 A1 | 2/2010 | Srivastava et al. |
| 2010/0045705 A1 | 2/2010 | Vertegaal et al. |
| 2010/0050121 A1 | 2/2010 | Shin |
| 2010/0052880 A1 | 3/2010 | Laitinen |
| 2010/0070908 A1 | 3/2010 | Mori et al. |
| 2010/0079413 A1 | 4/2010 | Kawashima et al. |
| 2010/0095238 A1 | 4/2010 | Baudet |
| 2010/0097321 A1 | 4/2010 | Son et al. |
| 2010/0115402 A1 | 5/2010 | Knaven et al. |
| 2010/0127991 A1 | 5/2010 | Yee |
| 2010/0131900 A1 | 5/2010 | Spetalnick |
| 2010/0141590 A1 | 6/2010 | Markiewicz et al. |
| 2010/0156813 A1 | 6/2010 | Duarte et al. |
| 2010/0156818 A1 | 6/2010 | Burrough et al. |
| 2010/0161538 A1 | 6/2010 | Kennedy, Jr. et al. |
| 2010/0192086 A1 | 7/2010 | Kocienda et al. |
| 2010/0197352 A1 | 8/2010 | Runstedler et al. |
| 2010/0199176 A1 | 8/2010 | Chronqvist |
| 2010/0225599 A1 | 9/2010 | Danielsson et al. |
| 2010/0235726 A1 | 9/2010 | Ording et al. |
| 2010/0253620 A1 | 10/2010 | Singhal |
| 2010/0257478 A1 | 10/2010 | Longe et al. |
| 2010/0257490 A1 | 10/2010 | Lyon et al. |
| 2010/0259482 A1 | 10/2010 | Ball |
| 2010/0259561 A1 | 10/2010 | Forutanpour et al. |
| 2010/0265181 A1 | 10/2010 | Shore |
| 2010/0269040 A1 | 10/2010 | Lee |
| 2010/0277424 A1 | 11/2010 | Chang et al. |
| 2010/0287486 A1 | 11/2010 | Coddington |
| 2010/0292984 A1 | 11/2010 | Huang et al. |
| 2010/0293475 A1 | 11/2010 | Nottingham et al. |
| 2010/0295801 A1 | 11/2010 | Bestle et al. |
| 2010/0313127 A1 | 12/2010 | Gosper et al. |
| 2010/0313158 A1 | 12/2010 | Lee et al. |
| 2010/0315266 A1 | 12/2010 | Gunawardana et al. |
| 2010/0325721 A1 | 12/2010 | Bandyopadhyay et al. |
| 2010/0333027 A1 | 12/2010 | Martensson et al. |
| 2011/0010655 A1 | 1/2011 | Dostie et al. |
| 2011/0018812 A1 | 1/2011 | Baird |
| 2011/0029862 A1 | 2/2011 | Scott et al. |
| 2011/0035696 A1 | 2/2011 | Elazari et al. |
| 2011/0041056 A1 | 2/2011 | Griffin et al. |
| 2011/0043455 A1 | 2/2011 | Roth et al. |
| 2011/0050594 A1 | 3/2011 | Kim et al. |
| 2011/0060984 A1 | 3/2011 | Lee |
| 2011/0061017 A1* | 3/2011 | Ullrich et al. ............... 715/780 |
| 2011/0061029 A1 | 3/2011 | Yeh et al. |
| 2011/0063231 A1 | 3/2011 | Jakobs et al. |
| 2011/0074704 A1 | 3/2011 | Causey et al. |
| 2011/0078563 A1 | 3/2011 | Archer |
| 2011/0078613 A1 | 3/2011 | Bangalore |
| 2011/0086674 A1 | 4/2011 | Rider et al. |
| 2011/0090151 A1 | 4/2011 | Huang et al. |
| 2011/0099505 A1 | 4/2011 | Dahl |
| 2011/0099506 A1 | 4/2011 | Gargi et al. |
| 2011/0119623 A1 | 5/2011 | Kim |
| 2011/0148572 A1 | 6/2011 | Ku |
| 2011/0171617 A1 | 7/2011 | Yeh et al. |
| 2011/0179355 A1 | 7/2011 | Karlsson |
| 2011/0193797 A1 | 8/2011 | Unruh |
| 2011/0201387 A1 | 8/2011 | Paek et al. |
| 2011/0202835 A1 | 8/2011 | Jakobsson et al. |
| 2011/0202876 A1 | 8/2011 | Badger et al. |
| 2011/0205160 A1* | 8/2011 | Song et al. ............... 345/168 |
| 2011/0209087 A1 | 8/2011 | Guyot-Sionnest |
| 2011/0233407 A1 | 9/2011 | Wu et al. |
| 2011/0239153 A1 | 9/2011 | Carter et al. |
| 2011/0242138 A1 | 10/2011 | Tribble |
| 2011/0248945 A1 | 10/2011 | Higashitani |
| 2011/0249076 A1 | 10/2011 | Zhou et al. |
| 2011/0256848 A1 | 10/2011 | Bok et al. |
| 2011/0285656 A1* | 11/2011 | Yaksick et al. ............... 345/173 |
| 2011/0291940 A1 | 12/2011 | Ghassabian |
| 2011/0302518 A1 | 12/2011 | Zhang |
| 2011/0305494 A1 | 12/2011 | Kang |
| 2012/0005576 A1 | 1/2012 | Assadollahi |
| 2012/0023447 A1 | 1/2012 | Hoshino et al. |
| 2012/0029910 A1 | 2/2012 | Medlock et al. |
| 2012/0030566 A1 | 2/2012 | Victor |
| 2012/0030623 A1 | 2/2012 | Hoellwarth |
| 2012/0030624 A1 | 2/2012 | Migos |
| 2012/0036469 A1 | 2/2012 | Suraqui |
| 2012/0053887 A1 | 3/2012 | Nurmi |
| 2012/0062465 A1 | 3/2012 | Spetalnick |
| 2012/0062494 A1 | 3/2012 | Hsieh et al. |
| 2012/0068937 A1 | 3/2012 | Backlund et al. |
| 2012/0079373 A1 | 3/2012 | Kocienda et al. |
| 2012/0084734 A1 | 4/2012 | Wilairat |
| 2012/0092278 A1 | 4/2012 | Yamano |
| 2012/0102401 A1 | 4/2012 | Ijas et al. |
| 2012/0110518 A1 | 5/2012 | Chan et al. |
| 2012/0117506 A1 | 5/2012 | Koch et al. |
| 2012/0119997 A1 | 5/2012 | Gutowitz |
| 2012/0149477 A1 | 6/2012 | Park et al. |
| 2012/0159317 A1 | 6/2012 | Di Cocco et al. |
| 2012/0162081 A1 | 6/2012 | Stark |
| 2012/0166696 A1 | 6/2012 | Kallio et al. |
| 2012/0167009 A1 | 6/2012 | Davidson et al. |
| 2012/0200514 A1 | 8/2012 | Allen |
| 2012/0223959 A1 | 9/2012 | Lengeling |
| 2012/0249595 A1 | 10/2012 | Feinstein |
| 2012/0284673 A1 | 11/2012 | Lamb et al. |
| 2012/0306772 A1 | 12/2012 | Tan et al. |
| 2012/0311437 A1 | 12/2012 | Weeldreyer et al. |
| 2013/0007606 A1 | 1/2013 | Dolenc |
| 2013/0019172 A1 | 1/2013 | Kotler et al. |
| 2013/0036388 A1 | 2/2013 | Kirkpatrick |
| 2013/0046544 A1 | 2/2013 | Kay et al. |
| 2013/0050222 A1 | 2/2013 | Moran et al. |
| 2013/0061317 A1 | 3/2013 | Runstedler et al. |
| 2013/0063356 A1 | 3/2013 | Martisauskas |
| 2013/0067382 A1 | 3/2013 | Townsend et al. |
| 2013/0067411 A1 | 3/2013 | Kataoka et al. |
| 2013/0080962 A1 | 3/2013 | Razzaghi |
| 2013/0104068 A1 | 4/2013 | Murphy et al. |
| 2013/0120266 A1 | 5/2013 | Griffin et al. |
| 2013/0120267 A1 | 5/2013 | Pasquero et al. |
| 2013/0120268 A1 | 5/2013 | Griffin et al. |
| 2013/0125034 A1 | 5/2013 | Griffin et al. |
| 2013/0125036 A1 | 5/2013 | Griffin et al. |
| 2013/0125037 A1 | 5/2013 | Pasquero et al. |
| 2013/0176228 A1 | 7/2013 | Griffin et al. |
| 2013/0187858 A1 | 7/2013 | Griffin et al. |
| 2013/0187868 A1 | 7/2013 | Griffin et al. |
| 2013/0222249 A1 | 8/2013 | Pasquero et al. |
| 2013/0222255 A1 | 8/2013 | Pasquero et al. |
| 2013/0222256 A1 | 8/2013 | Pasquero et al. |
| 2013/0246329 A1 | 9/2013 | Pasquero et al. |
| 2013/0263038 A1 | 10/2013 | Griffin et al. |
| 2013/0271375 A1 | 10/2013 | Griffin et al. |
| 2013/0271385 A1 | 10/2013 | Griffin et al. |
| 2013/0275923 A1 | 10/2013 | Griffin et al. |
| 2013/0285913 A1 | 10/2013 | Griffin et al. |
| 2013/0285916 A1 | 10/2013 | Griffin et al. |
| 2013/0285927 A1 | 10/2013 | Pasquero et al. |
| 2013/0285928 A1 | 10/2013 | Thorsander |
| 2013/0285930 A1 | 10/2013 | Thorsander et al. |
| 2013/0290906 A1 | 10/2013 | Thorsander |
| 2013/0314331 A1 | 11/2013 | Rydenhag et al. |
| 2013/0342452 A1 | 12/2013 | Kuo et al. |
| 2014/0002363 A1 | 1/2014 | Griffin et al. |

(56) References Cited

U.S. PATENT DOCUMENTS

| | | | |
|---|---|---|---|
| 2014/0062886 A1 | 3/2014 | Pasquero et al. | |
| 2014/0062923 A1 | 3/2014 | Thorsander et al. | |
| 2014/0063067 A1 | 3/2014 | Compton et al. | |
| 2014/0067372 A1 | 3/2014 | Pasquero et al. | |
| 2014/0108992 A1* | 4/2014 | Bi et al. ................ | 715/773 |
| 2014/0164977 A1 | 6/2014 | Spetalnick | |
| 2014/0179283 A1 | 6/2014 | Kwon et al. | |

FOREIGN PATENT DOCUMENTS

| | | | |
|---|---|---|---|
| CA | 2813393 | | 10/2013 |
| CA | 2819839 | | 12/2013 |
| CA | 2820997 | | 1/2014 |
| CN | 101021762 | A | 8/2007 |
| EP | 0844571 | A2 | 5/1998 |
| EP | 0880090 | A2 | 11/1998 |
| EP | 0880090 | A3 | 11/1998 |
| EP | 1847917 | A2 | 10/2007 |
| EP | 1847917 | A3 | 10/2007 |
| EP | 1850217 | A2 | 10/2007 |
| EP | 1909161 | A1 | 4/2008 |
| EP | 1939715 | | 7/2008 |
| EP | 1942398 | | 7/2008 |
| EP | 2077491 | A1 | 7/2009 |
| EP | 2109046 | | 10/2009 |
| EP | 2128750 | A2 | 12/2009 |
| EP | 2146271 | A2 | 1/2010 |
| EP | 2184686 | A1 | 5/2010 |
| EP | 2214118 | | 8/2010 |
| EP | 2256614 | A1 | 12/2010 |
| EP | 2282252 | A1 | 2/2011 |
| EP | 2293168 | | 3/2011 |
| EP | 2320312 | A1 | 5/2011 |
| EP | 2336851 | | 6/2011 |
| EP | 2381384 | | 10/2011 |
| EP | 2386976 | | 11/2011 |
| EP | 2402846 | A2 | 1/2012 |
| EP | 2420925 | A2 | 2/2012 |
| EP | 2431842 | A2 | 3/2012 |
| EP | 2400426 | | 3/2013 |
| EP | 2618248 | | 7/2013 |
| EP | 2631758 | | 8/2013 |
| EP | 2653955 | | 10/2013 |
| EP | 2660697 | | 11/2013 |
| EP | 2660699 | | 11/2013 |
| EP | 2660727 | | 11/2013 |
| EP | 2703955 | | 3/2014 |
| EP | 2703956 | | 3/2014 |
| EP | 2703957 | | 3/2014 |
| EP | 2660696 | | 6/2014 |
| JP | 2011-197782 | | 10/2011 |
| JP | 2012-068963 | A | 4/2012 |
| KR | 20120030652 | A | 3/2012 |
| WO | WO03/029950 | A2 | 4/2003 |
| WO | WO03/054681 | A1 | 7/2003 |
| WO | WO2004/001560 | A1 | 12/2003 |
| WO | 2005/064587 | | 7/2005 |
| WO | WO2006/100509 | A2 | 9/2006 |
| WO | WO2007/068505 | A1 | 6/2007 |
| WO | WO2007/076210 | A1 | 7/2007 |
| WO | WO2007/134433 | A1 | 11/2007 |
| WO | 2008/030974 | | 3/2008 |
| WO | WO2008/057785 | A2 | 5/2008 |
| WO | 2008/085741 | | 7/2008 |
| WO | WO2009/019546 | A2 | 2/2009 |
| WO | 2010/035585 | | 4/2010 |
| WO | WO2010/035574 | A1 | 4/2010 |
| WO | 2010/099835 | | 9/2010 |
| WO | WO2010/112841 | A1 | 10/2010 |
| WO | WO2011/073992 | A2 | 6/2011 |
| WO | WO2011/098925 | A1 | 8/2011 |
| WO | WO2011/113057 | A1 | 9/2011 |
| WO | WO2012/043932 | A1 | 4/2012 |
| WO | 2013/163718 | | 11/2013 |
| WO | 2013/164013 | | 11/2013 |

OTHER PUBLICATIONS

Enable or Disable Sure Type with a RIM BlackBerry Pearl Using Handheld Software, version 4.x, "http://www.wireless.att.com/support_static_files/KB/KB72601.html", at least as early as Feb. 8, 2008 (3 pages).

iPhone J.D. Typing Letters or Symbols That Are Not on the iPhone Keyboard dated Mar. 19, 2010, accessed "http://www. iphonejd . com/iphone jd201 0/03/typ i ng-letters-or-symbols-that-are-not-on-the-iphonekeyboard.html" on Feb. 26, 2013 (3 pages).

Sprint Support Tutorial Set the Screen Lock Pattern—Samsung Moment, http://support.sprint.com/support/tutorial/Set_the_Screen_Lock_Pattern_Samsung_Moment/10887-171, date of access: May 31, 2012 (9 pages).

Through the Magic Window—Magic Window word processor for Apple II, Artsci Publishing, 1980, http://www.artsciDub.com/history:/magicwindow, accessed May 21, 2013 (5 pages).

T-Mobile Forum—Help & How to—Hidden Pattern, http://forums.t-mobile.com/tmbl/board/messiage?board.id=Android3&message.id=6015&query.id=50827#M6015, Oct. 22, 2008.

Touchpal (combination of two sources: first, youtube video on touchpal at url: http://www.youtube.com/watch?v=eJUWFEXxJal, dated on Dec. 1, 2011, with screen captures shown below; second, TimesofIndia website article on touchpal at url: http://articles.timesofindia.indiatimes.com/2012-01-29/computing/30673975_1_swype-android-marketqwerty, dated Jan. 29, 2012).

Wang, Feng, et al., "Detecting and Leveraging Finger Orientation for Interaction with Direct-Touch Surfaces", UIST '09, Oct. 4-7, 2009, Victoria, British Columbia, Canada (1 O pages).

Canadian Office Action in Canadian Application No. 2,688,204, dated Aug. 8, 2012, 3 pages.

Canadian Office Action in Canadian Application No. 2,737,314, dated Mar. 27, 2013, 3 pages.

Canadian Office Action in Canadian Application No. 2,789,827, dated May 13, 2014, 4 pages.

Canadian Office Action in Canadian Application No. 2,793,629, dated Jul. 8, 2014, 4 pages.

Canadian Office Action in Canadian Application No. 2,794,063, dated Sep. 8, 2014, 2 pages.

Canadian Office Action in Canadian Application No. 2,803 192, dated May 5, 2014, 4 pages.

Canadian Office Action in Canadian Application No. 2,812,033, dated Jun. 2, 2014, 3 pages.

Canadian Office Action in Canadian Application No. 2,812,457, dated Jun. 25, 2014, 5 pages.

Canadian Office Action in Canadian Application No. 2,813,393, dated Jul. 17, 2014, 4 pages.

Canadian Office Action in Canadian Application No. 2,818,720, dated Jun. 12, 2014, 3 pages.

Canadian Office Action in Canadian Application No. 2,819,839, dated Jun. 30, 2014, 3 pages.

Canadian Office Action in Canadian Application No. 2,821,772, dated Jun. 12, 2014, 2 pages.

Canadian Office Action in Canadian Application No. 2,821,784, dated Jul. 3, 2014, 3 pages.

Canadian Office Action in Canadian Application No. 2,821,814, dated Jun. 19, 2014, 3 pages.

European Office Action in European Application No. 12182612.7, dated Apr. 11, 2014, 5 pages.

European Office Action in European Application No. 11192713.3, dated Apr. 16, 2014, 7 pages.

European Office Action in European Application No. 12180190.6, dated Apr. 5, 2013, 7 pages.

European Office Action in European Application No. 12166520.2, dated Aug. 22, 2013, 4 pages.

European Office Action in European Application No. 12173818.1, dated Aug. 22, 2013, 6 pages.

European Office Action in European Application No. 12172458.7, dated Dec. 9, 2013, 4 pages.

(56) References Cited

OTHER PUBLICATIONS

European Office Action in European Application No. 12166142.5, dated Jun. 2, 2014, 4 pages.
European Office Action in European Application No. 12172458.7, dated Jun. 3, 2014, 5 pages.
European Office Action in European Application No. 12169649.6, dated Mar. 12, 2014, 7 pages.
European Search Report in European Application No. 12184574.7, dated Mar. 7, 2013, 5 pages.
European Search Report in European Application No. 10160590.5, dated Feb. 28, 2011.
European Search Report in European Application No. 12166115.1, dated Aug. 24, 2012, 5 pages.
European Search Report in European Application No. 12169649.6, dated Aug. 27, 2012, 7 pages.
European Search Report in European Application No. 12166170.6, dated Aug. 31, 2012, 7 pages.
European Search Report in European Application No. 12173818.1, dated Dec. 21, 2012, 8 pages.
European Search Report in European Application No. 12184574.7, dated Jun. 26, 2013, 10 pages.
European Search Report in European Application No. 12182611.9, dated Mar. 8, 2013, 8 pages.
European Search Report in European Application No. 09151723.5, dated May 6, 2009, 7 pages.
European Search Report in European Application No. 11180985.1, dated Nov. 28, 2011, 4 pages.
European Search Report in European Application No. 10160590.5, dated Sep. 16, 2010.
German Office Action dated Sep. 1, 2014, issued in German Application No. 112012000299.7-51, 6 pages.
International Preliminary Report on Patentability in International Application No. PCT/IB2011/003273, dated May 13, 2014, 5 pages.
International Search Report and Written Opinion in International Application No. PCT/CA2012/050405, dated Nov. 8, 2012, 12 pages.
Notice of Allowance in U.S. Appl. No. 13/373,356, dated Mar. 15, 2013, 25 pages.
Notice of Allowance in U.S. Appl. No. 13/564,687, dated Aug. 12, 2013, 10 pages.
Notice of Allowance U.S. Appl. No. 13/563,943, dated Oct. 11, 2013, 14 pages.
U.S. Appl. No. 13/601,736, filed Aug. 31, 2012 44 pages.
United States Office Action in U.S. Appl. No. 12/362,536, dated Jun. 8, 2011, 19 pages.
United States Office Action in U.S. Appl. No. 12/362,536, dated May 29, 2012, 16 pages.
United States Office Action in U.S. Appl. No. 12/362,536, dated Oct. 26, 2011, 21 pages.
United States Office Action in U.S. Appl. No. 12/764,298, dated Jul. 20, 2012, 38 pages.
United States Office Action in U.S. Appl. No. 13/447,704, dated Apr. 11, 2014, 15 pages.
United States Office Action in U.S. Appl. No. 13/447,704 dated Nov. 22, 2013, 16 pages.
United States Office Action in U.S. Appl. No. 13/447,835, dated Apr. 4, 2013, 20 pages.
United States Office Action in U.S. Appl. No. 13/459,301, dated Jul. 30, 2013, 15 pages.
United States Office Action in U.S. Appl. No. 13/459,301, dated Jul. 30, 2013, 27 pages.
United States Office Action in U.S. Appl. No. 13/459,301, dated May 10, 2013, 16 pages.
United States Office Action in U.S. Appl. No. 13/459,301, dated May 2, 2014, 19 pages.
United States Office Action in U.S. Appl. No. 13/459,301, dated Oct. 17, 2014, 18 pages.
United States Office Action in U.S. Appl. No. 13/459,872, dated Oct. 31, 2014, 20 pages.
United States Office Action in U.S. Appl. No. 13/481, 171, dated Apr. 11, 2014, 12 pages.
United States Office Action in U.S. Appl. No. 13/481,171, dated Apr. 11, 2014, 12 pages.
United States Office Action in U.S. Appl. No. 13/481,171, dated Sep. 24, 2014, 12 pages.
United States Office Action in U.S. Appl. No. 13/482,705, dated Aug. 7, 2012, 10 pages.
United States Office Action in U.S. Appl. No. 13/482,705, dated May 15, 2014, 12 pages.
United States Office Action in U.S. Appl. No. 13/485, dated Aug. 29, 2014,723, 18 pages.
United States Office Action in U.S. Appl. No. 13/485,723, dated Aug. 29, 2014, 18 pages.
United States Office Action in U.S. Appl. No. 13/485,723, dated Feb. 10, 2014, 13 pages.
United States Office Action in U.S. Appl. No. 13/485,723, dated May 21, 2014, 18 pages.
United States Office Action in U.S. Appl. No. 13/485,723, dated Oct. 17, 2013, 12 pages.
United States Office Action in U.S. Appl. No. 13/524,678, dated Apr. 18, 2014, 12 pages.
United States Office Action in U.S. Appl. No. 13/524,678, dated Sep. 18, 2014, 10 pages.
United States Office Action in U.S. Appl. No. 13/525,576, dated Jul. 21, 2014, 19 pages.
United States Office Action in U.S. Appl. No. 13/529,182, dated Oct. 16, 2014, 14 pages.
United States Office Action in U.S. Appl. No. 13/534,101, dated Jan. 31, 2014, 12 pages.
United States Office Action in U.S. Appl. No. 13/534,101, dated Jul. 2, 2014, 15 pages.
United States Office Action in U.S. Appl. No. 13/548,469, dated Mar. 26, 2014, 11 pages.
United States Office Action in U.S. Appl. No. 13/548,469, dated Oct. 23, 2014, 9 pages.
United States Office Action in U.S. Appl. No. 13/560,796, dated Jul. 25, 2013, 19 pages.
United States Office Action in U.S. Appl. No. 13/560,796, dated Mar. 12, 2013, 22 pages.
United States Office Action in U.S. Appl. No. 13/563,182, dated Jun. 11, 2014, 8 pages.
United States Office Action in U.S. Appl. No. 13/563,182, dated May 15, 2013, 21 pages.
United States Office Action in U.S. Appl. No. 13/564,070, dated Jul. 9, 2013, 20 pages.
United States Office Action in U.S. Appl. No. 13/564,070, dated Jul. 9, 2013, 26 pages.
United States Office Action in U.S. Appl. No. 13/564,687, dated May 2, 2013, 17 pages.
United States Office Action in U.S. Appl. No. 13/564,697, dated Apr. 25, 2013, 11 pages.
United States Office Action in U.S. Appl. No. 13/564,697, dated Dec. 6, 2013, 11 pages.
United States Office Action in U.S. Appl. No. 13/564,697, dated Mar. 26, 2014, 9 pages.
United States Office Action in U.S. Appl. No. 13/564,697, dated Sep. 25, 2014, 6 pages.
United States Office Action in U.S. Appl. No. 13/569,000, dated Jul. 28, 2014, 13 pages.
United States Office Action in U.S. Appl. No. 13/569,000, dated Mar. 14, 2014, 10 pages.
United States Office Action in U.S. Appl. No. 13/569,000, dated Mar. 14, 2014, 10pages.
United States Office Action in U.S. Appl. No. 13/572,232, dated Apr. 11, 2014, 38 pages.
United States Office Action in U.S. Appl. No. 13/572,232, dated Dec. 13, 2013, 23 pages.
United States Office Action in U.S. Appl. No. 13/572,232, dated Mar. 15, 2013, 36 pages.
United States Office Action in U.S. Appl. No. 13/572,232, dated May 30, 2013, 49 pages.

(56) References Cited

OTHER PUBLICATIONS

United States Office Action in U.S. Appl. No. 13/572,232, dated Oct. 14, 2014, 32 pages.
United States Office Action in U.S. Appl. No. 13/588,803, dated Sep. 18, 2014, 8 pages.
United States Office Action in U.S. Appl. No. 13/601,736, dated Apr. 21, 2014, 19 pages.
United States Office Action in U.S. Appl. No. 13/601,736, dated Sep. 15, 2014, 19 pages.
United States Office Action in U.S. Appl. No. 13/601,864, dated Sep. 8, 2014, 9 pages.
United States Office Action in U.S. Appl. No. 13/601,898, dated Jun. 18, 2014, 12 pages.
United States Office Action in U.S. Appl. No. 13/616,423, dated Jul. 24, 2014, 21 pages.
United States Office Action in U.S. Appl. No. 13/616,423, dated Mar. 12, 2014, 19 pages.
"Features Included in the T-Mobile G1", http://www.t-mobileg1.com/T-Mobile-G1-Features.pdf, 2009.
"Windows Mobile Café—Software (Freeware): Touchpal, Let's Try Tabbing Up to 300 Chars/Min", Nov. 4, 2007, retrieved from URL:http://windows-mobile-cafe.blogspot.nl/2007/11/software-freeware-touchpal-lets-try.html, accessed online Jan. 18, 2013 (2 pages).
BlackBerry Seeker—Freeware—Pattern Lock v1.0.7, http://www.blackberryseeker.com/applications/preview/Pattern-Lock-v107.aspx, Jul. 28, 2009.
Chong et al., Exploring the Use of Discrete Gestures for Authentication, IFIP International Federation for Information Processing, 2009.
Conveniently select text, images, annotations, etc. in a PDF or any other text format on a touch based mobile/tablet device, IP.com Journal, Mar. 1, 2011, XP013142665, (10 pages).
DROID X by Motorola © 2010 Screen shots.
DROID X by Motorola © 2010 User Manual (72 pages).
European Partial Search Report dated Jan. 16, 2013, issued in European Application No. 12182612.7 (5 pages).
European Partial Search Report dated Sep. 16, 2010, issued in European Application No. 10160590.5 (5 pages).
Extended European Search Report dated Aug. 24, 2012, issued in European Application No. 12166115.1 (5 pages).
Extended European Search Report dated Feb. 28, 2011, issued in European Application No. 10160590.5 (10 pages).
Extended European Search Report dated Feb. 28, 2013, issued in European Application No. 12182610.1 (7 pages).
Extended European Search Report dated Jan. 25, 2013, issued in European Application No. 12166520.2 (8 pages).
Extended European Search Report dated Nov. 22, 2012, issued in European Application No. 12172892.7 (7 pages).
Extended European Search Report dated Oct. 9, 2012, issued in European Application No. 12166244.9 (6 pages).
Extended European Search Report dated Sep. 10, 2012, issued in European Application No. 12166246.4 (6 pages).
Extended European Search Report dated Sep. 10, 2012, issued in European Application No. 12166247.2 (8 pages).
Extended European Search Report dated Sep. 21, 2012, issued in European Application No. 12164240.9 (6 pages).
Extended European Search Report dated Sep. 25, 2012, issued in European Application No. 11192713.3 (7 pages).
Extended European Search Report dated Sep. 25, 2012, issued in European Application No. 12176453.4 (7 pages).
Extended European Search Report dated Sep. 25, 2012, issued in European Application No. 12180190.6 (8 pages).
Extended European Search Report dated Sep. 3, 2012, issued in European Application No. 12164300.1 (7 pages).
Final Office Action dated Feb. 1, 2013, issued in U.S. Appl. No. 13/563,943 (17 pages).
Final Office Action dated Feb. 28, 2013, issued in U.S. Appl. No. 13/524,678 (21 pages).
Final Office Action dated Jan. 18, 2013, issued in U.S. Appl. No. 13/482,705 (18 pages).
Google Mobile Help—Editing text, http://support.google.com/mobile/bin/answer.py?hl=en&answer=168926, date of access: Jun. 6, 2012 (2 pages).
GSMArena—Samsung announce s5600 & s5230 full touch midrange phones, http://www.gsmarena.com/samsung_announce_s5600_and_s5230_full_touch_midrange_phones-news-825.php, Mar. 10, 2009.
Hardware Sphere—Samsung s5600 & s5230 Touchscreen phones, http://hardwaresphere.com/2009/03/09/samsung-s5600-s5230-touchscreen-phones/, Mar. 9, 2009.
iPhone User Guide—for iPhone OS 3.1 Software, 2009 (217 pages).
Madhvanath, Sriganesh, HP-Gesture based computing interfaces, Mar. 2008.
Manual del usuario Samsung Moment™ with Google™, dated May 20, 2012 (224 pages).
Merrett, Andy, "iPhone OS 3.0: How to cut, copy and paste text and images", http://www.iphonic.tv/2009/06/iphone_os_30_how_to_cut_copy_a.html, Jun. 18, 2009, XP002684215, (8 pages).
Mobile Tech News—Samsung launches new Gesture Lock touchscreen handsets, http://www.mobiletechnews.com/info/2009/03/11/124559.html, Mar. 11, 2009.
Office Action dated Aug. 7, 2012, issued in U.S. Appl. No. 13/482,705 (10 pages).
Office Action dated Dec. 28, 2012, issued in U.S. Appl. No. 13/459,301 (22 pages).
Office Action dated Jan. 22, 2013, issued in U.S. Appl. No. 13/564,687 (19 pages).
Office Action dated Jan. 29, 2013, issued in U.S. Appl. No. 13/563,182 (19 pages).
Office Action dated Jan. 7, 2013, issued in U.S. Appl. No. 13/564,070 (21 pages).
Office Action dated Jan. 7, 2013, issued in U.S. Appl. No. 13/564,697 (19 pages).
Office Action dated Jul. 20, 2012, issued in U.S. Appl. No. 12/764,298 (38 pages).
Office Action dated Nov. 14, 2012, issued in U.S. Appl. No. 13/572,232 (24 pages).
Office Action dated Nov. 16, 2012, issued in U.S. Appl. No. 13/554,583 (21 pages).
Office Action dated Nov. 8, 2012, issued in U.S. Appl. No. 13/373,356 (18 pages).
Office Action dated Oct. 15, 2012, issued in U.S. Appl. No. 13/560,270 (15 pages).
Office Action dated Oct. 17, 2012, issued in U.S. Appl. No. 13/563,943 (17 pages).
Office Action dated Oct. 18, 2012, issued in U.S. Appl. No. 13/563,182 (12 pages).
Office Action dated Oct. 23, 2012, issued in U.S. Appl. No. 12/764,298 (41 pages).
Office Action dated Oct. 25, 2012, issued in U.S. Appl. No. 13/459,732 (15 pages).
Office Action dated Oct. 26, 2012, issued in U.S. Appl. No. 13/554,436 (22 pages).
Office Action dated Oct. 5, 2012, issued in U.S. Appl. No. 13/447,835 (20 pages).
Office Action dated Sep. 10, 2012, issued in U.S. Appl. No. 13/524,678 (12 pages).
Office Action dated Sep. 28, 2012, issued in U.S. Appl. No. 13/494,794 (14 pages).
PCT International Search Report and Written Opinion dated Jan. 24, 2013, issued in International Application No. PCT/CA2012/050274 (9 pages).
PCT International Search Report and Written Opinion dated Jun. 14, 2012, issued in International Application No. PCT/IB2011/003273 (8 pages).
PCT International Search Report and Written Opinion dated Nov. 7, 2012, issued in International Application No. PCT/CA2012/050362 (9 pages).
PCT International Search Report and Written Opinion dated Oct. 12, 2012, issued in International Application No. PCT/EP2012/057944 (10 pages).

(56) References Cited

OTHER PUBLICATIONS

PCT International Search Report and Written Opinion dated Sep. 10, 2012, issued in International Application No. PCT/EP2012/057945 (11 pages).
Sprint Support Tutorial Unlock a Forgotten Lock Pattern—Samsung Moment, http://support.sprint.com/support/tutorial/Unlock_a_Forgotten_Lock_Pattern_Samsung_Moment/10887-339, date of access: May 31, 2012 (7 pages).
Support—Sprint Cell Phones SPH-M900—Samsung Cell Phones, http://www.samsung.com/us/support/owners/product/SPH-M900?tabContent-content2, date of access: May 31, 2012 (1 page).
Swype Product Features, accessed online at http://www.swype.com/about/specifications/ on Feb. 25, 2013 (2 pages).
T-Mobile Forum—Help & How to—Hidden Pattern, http://forums.t-mobile.com/tmbl/board/message?board.id=Android3&message.id=3511&query.id=52231#M3511, Oct. 23, 2008.
T-Mobile Forum—Help & How to—Screen Unlock Pattern, http://forums.t-mobile.com/tmbl/board/message?board.id=Android3&message.id=6015&query.id=50827#M6015, Oct. 22, 2008.
T-Mobile launches the highly anticipated T-Mobile G1, Oct. 22, 2008.
U.S. Appl. No. 13/616,423, filed Sep. 14, 2012 (30 pages).
U.S. Appl. No. 13/773,812, filed Feb. 22, 2013 (94 pages).
User Guide Samsung Moment(TM) with Google(TM), dated Dec. 4, 2009 (122 pages).
User Guide Samsung Moment(TM) with Google(TM), dated Mar. 2, 2010 (218 pages).
United States Office Action in U.S. Appl. No. 13/588,803, dated Feb. 20, 2015, 9 pages.

* cited by examiner

TOUCHSCREEN KEYBOARD PREDICTIVE DISPLAY AND GENERATION OF A SET OF CHARACTERS

FIELD

Example embodiments disclosed herein relate generally to input methodologies for electronic devices and more particularly, to methods for receiving input and generation of output for electronic devices.

BACKGROUND

Increasingly, electronic devices, such as computers, netbooks, cellular phones, smart phones, personal digital assistants, and tablets, for example, have touchscreens that allow a user to input characters, strings, or symbols into an application, such as a word processor or email application. Character input on touchscreens can be a cumbersome task due to, for example, the small touchscreen area, particularly where a user needs to input a long message.

DESCRIPTION OF EXAMPLE EMBODIMENTS

Figure 1:
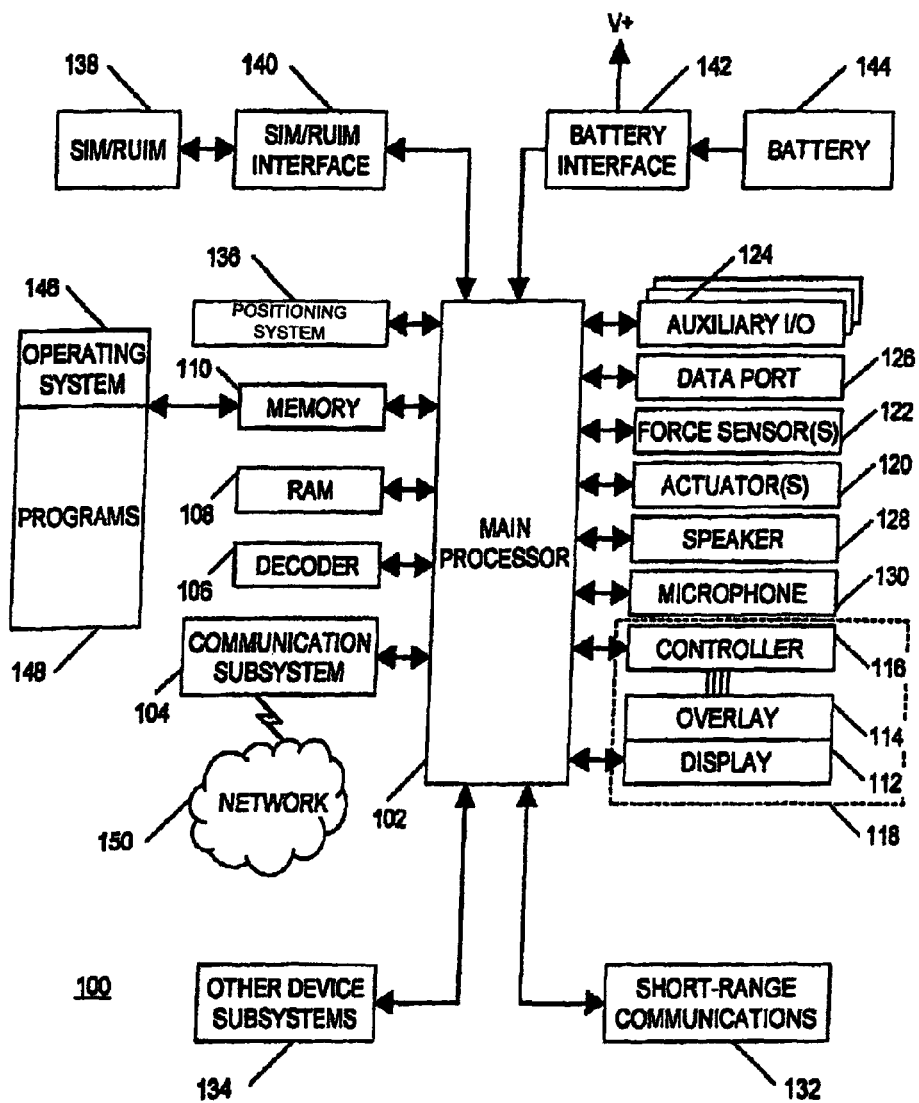
FIG. 1 is an example block diagram of an electronic device, consistent with embodiments disclosed herein.

Reference will now be made in detail to various embodiments, examples of which are illustrated in the accompanying drawings. Wherever possible, the same reference numbers will be used throughout the drawings to refer to the same or like parts.

The present disclosure relates to an electronic device, including wired communication devices (for example, a laptop computer having a touchscreen) and mobile or handheld wireless communication devices such as cellular phones, smartphones, wireless organizers, personal digital assistants, wirelessly enabled notebook computers, tablets, and similar devices. The electronic device can also be an electronic device without wireless communication capabilities, such as a handheld electronic game device, digital photograph album, digital camera, or other device.

Basic predictive text input solutions have been introduced for assisting with input on an electronic device. These solutions include predicting which word a user is entering and offering a suggestion for completing the word. But these solutions can have limitations, often requiring the user to input most or all of the characters in a word before the solution suggests the word the user is trying to input. Even then, a user often has to divert focus from the keyboard to view and consider the suggested word displayed elsewhere on the display of the electronic device, and thereafter, look back at the keyboard to continue typing. Refocusing of one's eyes relative to the keyboard while inputting information in an electronic device, particularly when composing large texts, can strain the eyes and be cumbersome, distracting, and otherwise inefficient. Moreover, processing cycles are lost and display power wasted as the processor is idling while the user is focusing attention to the input area, and then back at the virtual keyboard.

Accordingly, example embodiments described herein permit the user of an electronic device to input characters without diverting attention from the keyboard and subsequently refocusing.

Use of the indefinite article "a" or "an" in the specification and the claims is meant to include one feature or more than one of the features that it introduces, unless otherwise indicated. Thus, the term "a set of characters" as used in "generating a set of characters" can include the generation of one or more than one set of characters. Similarly, use of the definite article "the" or "said," particularly after a feature has been introduced with the indefinite article, is meant to include one feature or more than one of the features to which it refers (unless otherwise indicated). Therefore, the term "the generated set of characters" as used in "displaying the generated set of characters" includes displaying one or more generated sets of characters.

In one embodiment, a method is provided that includes receiving an input of a character from a virtual keyboard that is rendered on a display, generating a set of characters that includes the character, and displaying the generated set of characters at a location that is associated with the virtual keyboard and that is located on the display.

In another embodiment, an electronic device is provided that comprises a display having a virtual keyboard rendered thereupon, and a processor. The processor can be configured to receive an input of a character from the virtual keyboard, generate a set of characters that includes the character, and display the set of characters at a location that is associated with the virtual keyboard and that is on the display.

These example embodiments, as well as those described below permit the user of an electronic device to input a set of characters without diverting attention from the virtual keyboard and subsequently refocusing. Predicting and providing various options that the user is likely contemplating, and doing so at appropriate locations on the keyboard, allows the focus to remain on the keyboard, which enhances efficiency, accuracy, and speed of character input.

FIG. 1 is a block diagram an electronic device 100, consistent with example embodiments disclosed herein. Electronic device 100 includes multiple components, such as a main processor 102 that controls the overall operation of electronic device 100. Communication functions, including data and voice communications, are performed through a communication subsystem 104. Data received by electronic device 100 is decompressed and decrypted by a decoder 106. The communication subsystem 104 receives messages from and sends messages to a network 150. Network 150 can be any type of network, including, but not limited to, a wired network, a data wireless network, voice wireless network, and dual-mode wireless networks that support both voice and data communications over the same physical base stations. Electronic device 100 can be a battery-powered device and include a battery interface 142 for receiving one or more batteries 144.

Main processor 102 is coupled to and can interact with additional subsystems such as a Random Access Memory (RAM) 108; a memory 110, such as a hard drive, CD, DVD, flash memory, or a similar storage device; one or more actuators 120; one or more force sensors 122; an auxiliary input/output (I/O) subsystem 124; a data port 126; a speaker 128; a microphone 130; short-range communications 132; other device subsystems 134; and a touchscreen 118.

Touchscreen 118 includes a display 112 with a touch-active overlay 114 connected to a controller 116. The display 112 may have a layout having key locations with associated characters, such as a graphic user interface (GUI) or a virtual keyboard. User-interaction with the GUI may be performed through touch-active overlay 114. The user interaction may include tapping, swiping, flicking, accelerated swiping, pinching, multi-point tapping, pressing, blowing, or other physical actions.

Main processor 102 interacts with touch-active overlay 114 via controller 116. Characters, such as text, symbols, images, and other items are displayed on display 112 of touchscreen 118 via main processor 102. Characters are inputted when the user touches the touchscreen at a location associated with said character.

Touchscreen 118 is connected to and controlled by main processor 102. Accordingly, detection of a touch event and/or determining the location of the touch event can be performed by main processor 102 of electronic device 100. A touch event includes in some embodiments, a tap by a finger, a swipe by a finger, a swipe by a stylus, a long press by finger or stylus, or a press by a finger for a predetermined period of time, and the like.

While specific embodiments of a touchscreen have been described, any suitable type of touchscreen for an electronic device can be used, including, but not limited to, a capacitive touchscreen, a resistive touchscreen, a surface acoustic wave (SAW) touchscreen, an embedded photo cell touchscreen, an infrared (IR) touchscreen, a strain gauge-based touchscreen, an optical imaging touchscreen, a dispersive signal technology touchscreen, an acoustic pulse recognition touchscreen or a frustrated total internal reflection touchscreen. The type of touchscreen technology used in any given embodiment will depend on the electronic device and its particular application and demands.

Main processor 102 can also interact with a positing system 136 for determining the location of electronic device 100. The location can be determined in any number of ways, such as by a computer, by a Global Positioning System (GPS), either included or not included in electric device 100, through a Wi-Fi network, or by having a location entered manually. The location can also be determined based on calendar entries.

In some embodiments, to identify a subscriber for network access, electronic device 100 uses a Subscriber Identity Module or a Removable User Identity Module (SIM/RUIM) card 138 inserted into a SIM/RUIM interface 140 for communication with a network, such as network 150. Alternatively, user identification information can be programmed into memory 110.

Electronic device 100 may also include an operating system 146 and programs 148 that are executed by main processor 102 and are typically stored in memory 110. Additional applications may be loaded onto electronic device 100 through network 150, auxiliary I/O subsystem 124, data port 126, short-range communications subsystem 132, or any other suitable subsystem.

A received signal such as a text message, an e-mail message, or web page download is processed by communication subsystem 104 and may be provided to main processor 102. Main processor 102 processes the received signal for output to display 112, to auxiliary I/O subsystem 124, or a combination of both. A user can compose data items, for example e-mail messages, which can be transmitted over network 150 through communication subsystem 104. For voice communications, the overall operation of electronic device 100 is similar. Speaker 128 outputs audible information converted from electrical signals, and microphone 130 converts audible information into electrical signals for processing.

Figure 2:
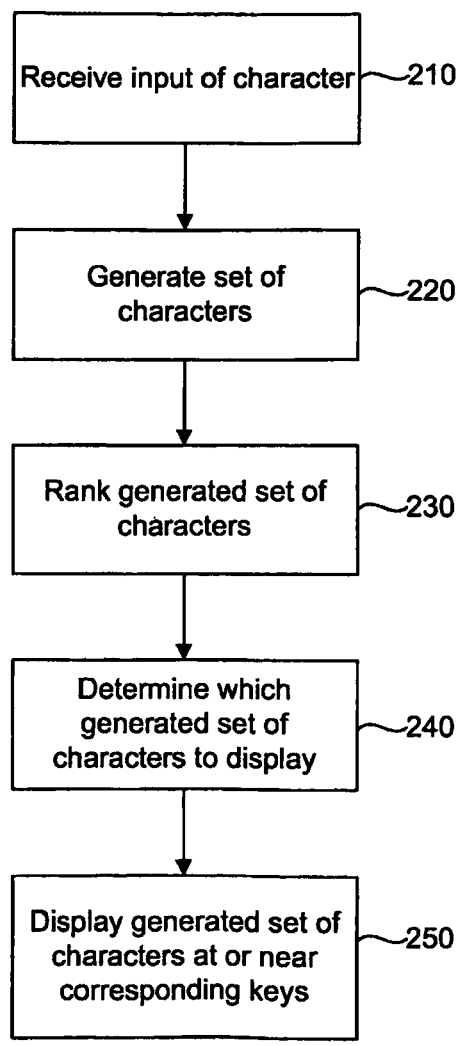
FIG. 2 is a flowchart illustrating an example method for displaying a selected set of characters or strings, consistent with embodiments disclosed herein.

FIG. 2 is a flowchart illustrating an example method 200 for predicting a set of characters or string, consistent with example embodiments disclosed herein. As used herein, a predictor (such as a predictive algorithm, program or firmware) may include a set of instructions that when executed by a processor (for example, main processor 102), can be used to disambiguate received input (such as ambiguous text input, for example) and provide various options, such as a string (for example, a set of characters, words or phrases, acronyms, names, slang, colloquialisms, abbreviations, or any combination thereof) that a user might be contemplating. A predictor can also receive otherwise unambiguous text input and predict strings or sets of characters potentially contemplated by the user based on several factors, such as context, frequency of use, and others as appreciated by those skilled in the field.

For example, the predictor may include a program 146 residing in memory 110 of electronic device 100. Accordingly, method 200 includes a predictor for generating a string corresponding to a subsequent candidate input character based on inputted characters. It can be appreciated that while the example embodiments described herein are directed to a predictor program executed by a processor, the predictor can be executed by other computing devices, such as a virtual keyboard controller, for example.

Method 200 begins at block 210, where the processor receives an input of one or more characters from a virtual keyboard displayed on a touchscreen. As used herein, however, a character can be any alphanumeric character, such as a letter, a number, a symbol, a punctuation mark, and the like. The inputted character can be displayed in an input field (for example, input field 330 further described below in FIGS. 3-9) that displays the character the user inputs using the virtual keyboard.

At block 220, the processor generates one or more sets of characters such as strings, words or phrases, acronyms, names, slang, colloquialisms, abbreviations, or any combination thereof based on the input received in block 210. The set of characters includes, for example, a set of characters that are stored in a dictionary (for example, a word or an acronym) of a memory of the electronic device, a set of characters that were previously inputted by the user (for example, a name or acronym), a set of characters based on a hierarchy or tree structure, a combination thereof, or any set of characters that are selected by a processor based on defined arrangement. As used herein, the term "string" is consistent with its custom and ordinary meaning as understood by those with skill in the art. For example, a "string" may be synonymous with a set of characters.

In some embodiments, the processor can use contextual data for generating a set of characters or string. Contextual data may consider the context of characters in the input field. Contextual data can include information about, for example, set of characters previously inputted by the user, grammatical attributes of the characters inputted in the input field (for example, whether a noun or a verb is needed as the next set of characters in a sentence), or any combination thereof. For example, if the set of characters "the" has already been inputted into the display, the processor can use the contextual data to determine that a noun—instead of a verb—will be the next set of characters after "the". Likewise, if the set of characters "Guy Lafleur played in the National Hockey" was inputted, based on the context, the processor can determine the subsequent set of characters is likely "League". Using the contextual data, the processor can also determine whether an inputted character was incorrect. For example, the processor can determine that the inputted character was supposed to be a "w" instead of an "a", given the proximity of these characters on a QWERTY virtual keyboard. In some embodiments, contextual data may also include data pertaining to an application used by a user on the electronic device 100. For example, the user may be using the electronic device 100 to send an email. As a result, the predictor might predict strings that are likely to be used when composing an email, such as "Hello," "Dear," "Sincerely," "Best," or "Regards," for example.

Processor 102 can also include an affix as part of the set of characters, such as an adverb ending, an adjective ending, different verb tenses, and the like, or any other change to make a complete set of characters. Processor 102 can also use the received input to generate affixes, such as plural endings or plural forms. Any known predictive technique or software can be used to process the received input and the contextual data in generating set of characters at block 220.

In some example embodiments, the set of characters or string generated at block 220 can begin with the same character received as input at block 210. For example, if the characters "pl" have been received as input using a virtual keyboard, these characters will be received by the processor as the input. In these embodiments, the set of characters or string generated at block 220 would all begin with "pl", such as "please" or "plot." There is no limit on the length of a generated set of characters. Regarding affixes, if the user has input the characters "child", for example, the affixes generated at block 220 could include "-ren", to make the set of characters "children", or "-ish", to make the set of characters "childish".

In some example embodiments, the set of characters generated at block 220 includes the same characters received as input at block 210, but not necessarily in the same order. For example, if the received input is an "x," the processor may generate "example" or "xylophone" as the set of characters. Such sets of characters can be generated using the contextual data.

In another example embodiment, if input has not been received or a delimiter (such as a <SPACE>) has been used, the generated set of characters can be placed on subsequent candidate input characters that correspond to the first letter of the generated set of characters.

Next, at block 230, the generated set of characters from block 220 can be ranked. The rankings reflect the likelihood that a candidate set of characters might have been intended by the user, or might be chosen by a user compared to another candidate set of characters.

In some embodiments, contextual data can be included in the ranking at block 230. In some embodiments, the electronic device can be configured to rank nouns or adjectives higher based on the previous inputted set of characters. If the inputted set of characters is suggestive of a noun or adjective, the processor, using the contextual data, can rank the nouns or adjectives corresponding to what the user is typing at block 230. In an additional embodiment, set of characters including adjective affixes (such as "-ish" or "-ful"), phrases, plurals, or combinations thereof can also be ranked. Contextual data can increase the likelihood that the higher ranked generated set of characters are intended by a user. In some embodiment, contextual data can include information about which programs or applications are currently running or being used by a user. For example, if the user is running an email application, then set of characters associated with that user's email system, such as set of characters from the user's contact list, can be used to determine the ranking. N-grams, including unigrams, bigrams, trigrams, and the like, can be also used in the ranking of the sets of characters. Alternatively, the geolocation of the electronic device or user can be used in the ranking process. If, for example, the electronic device recognizes that a user is located at his/her office, then sets of characters generally associated with work can be ranked higher in the list. If, on the other hand, the device determines a user is at the beach, then sets of characters generally associated with the beach can be ranked higher in the list.

At block 240, the processor determines which of the set of characters to display based on the ranking. For example, higher ranked sets of characters are more likely to be determined that they should be displayed. A ranker (such as a ranking algorithm, program or firmware) includes a set of instructions that when executed by a processor (for example, main processor 102), can be executed to determine ranking in this regard. In some embodiments, the ranker is a program 146 residing in memory 110 of electronic device 100.

At block 250, the determined set of characters may be displayed at a location on the keyboard corresponding to a subsequent candidate input character, predicted as the next character in a word that the user might input. For instance, if a user inputs "pl", the word "please" would be displayed near the key location for the letter "e"—the subsequent candidate input character for that word. Similarly, the word "plus"

would also be displayed near the key location for the letter "u"—another subsequent candidate input character. The subsequent candidate input character can be any alphanumeric character, such as a letter, number, symbol, punctuation mark, and the like.

In some embodiments, the generated set of characters is displayed at or near keys on the virtual keyboard associated with the subsequent candidate input characters. Its placement at or near a key location can depend, for instance, on the size of the word or the number of nearby subsequent candidate input characters and the size of their associated set of characters.

The set of characters can be displayed in a manner that will attract the user's attention. In some embodiments, a displayed set of character's appearance can be enhanced or changed in a way that makes the set more readily visible to the user. For example, displayed sets of characters can be displayed with backlighting, highlighting, underlining, bolding, italicizing, using combinations thereof, or in any other way for making the displayed set of characters more visible.

When identifying the set of characters for display at block 240, the processor can limit the displayed set of characters to the top few or choose among the higher ranked sets of characters. For example, if two sets of characters are both ranked high, and these sets of characters would otherwise be displayed at the same key location, the electronic device could be configured to display only the highest ranked generated set of characters. In other embodiments, both sets of characters could be displayed at or around the same key location, or one set of characters is displayed at one key location while the second set of characters is displayed at another key location. In some example embodiments, the processor can take into account the display size to limit the number of generated sets of characters. For example, the strings could be displayed in a cluster around the same key location. In some embodiments, the strings may be displayed in a selection interface such as a list. The selection list user interface element may be displayed at or near the key location, and may become visible when the device 100 detects the user selecting list indicator user interface element as described with respect to FIG. 22A below.

In some embodiments, the ranking could be used to choose between a set of characters that, when displayed on adjacent subsequent candidate input characters, would overlap with each other (e.g., because of their respective lengths). In such a scenario, the electronic device could be configured to display the higher ranked set of characters on the keyboard. For example, if the set of characters "establishment" is ranked first in a list generated at block 240 after the letter "E" is inputted, "establishment" could be displayed at the "S" key. When displayed on a virtual keyboard, however, its length might occupy some space on the "A" key and the "D" key, potentially blocking set of characters that would be displayed on or around those key locations. At block 240, it could be determined that "establishment" would be displayed fully, and no other set of characters would be placed at the "A" or "D" keys ahead of the first ranked set of characters "establishment." An alternative to displaying only the top ranked set of characters would be to use abbreviations or recognized shortened forms of the set of characters, effectively permitting a long set of characters to be displayed within or mostly within the area associated with a single key location simultaneously with other sets of characters on adjacent key locations of a virtual keyboard.

FIGS. 3-9 illustrate a series of example front views of the touchscreen 118 having a virtual keyboard 320, consistent with example embodiments disclosed herein. Starting with FIG. 3A, touchscreen 118 includes a virtual keyboard 320 that is touch-active. The position of the virtual keyboard 320 is variable such that virtual keyboard 320 can be placed at any location on touchscreen 118. Touchscreen 118 could be configured to detect the location and possibly pressure of one or more objects at the same time. Touchscreen 118 includes two areas: (1) an input field 330 that displays characters after a user has inputted those characters and (2) the virtual keyboard 320 that receives the input from the user. As described throughout this disclosure, virtual keyboard displays a set of characters at a location on the keyboard corresponding to a subsequent candidate input character that might be received as input from the user.

The examples and embodiments illustrated in FIGS. 3-9 can be implemented with any set of characters, such as words, phrases, acronyms, names, slang, colloquialisms, abbreviations, or any combination thereof.

Figure 3A:
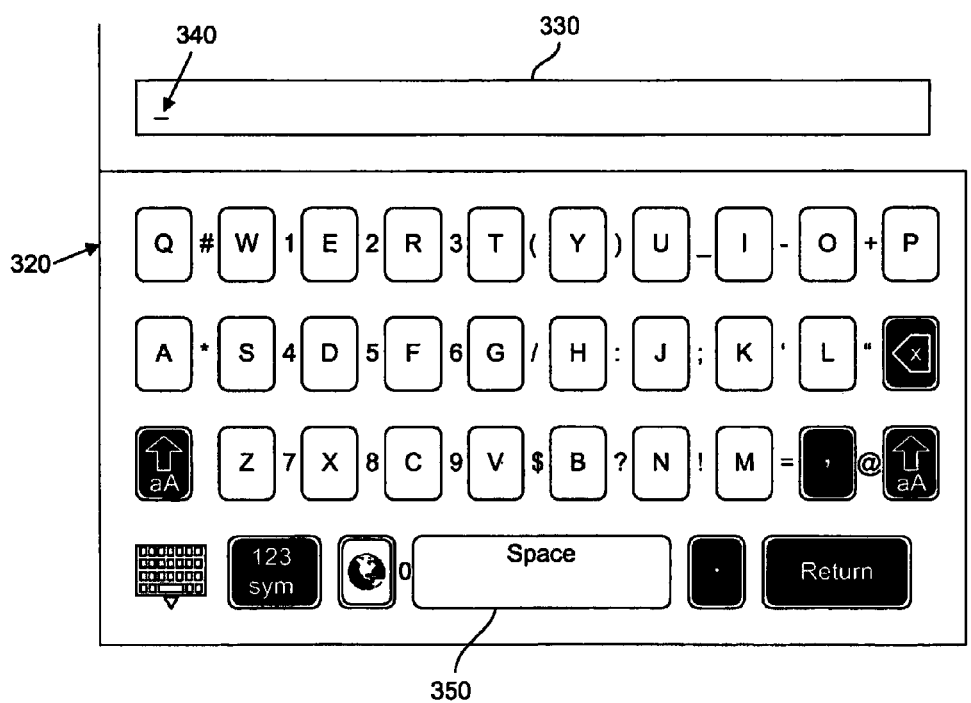
FIGS. 3A, 3B, 3C, and 3D show example front views of a touchscreen, consistent with embodiments disclosed herein.

As shown in FIG. 3A, touchscreen 118 displays a standard QWERTY virtual keyboard 320; however, any conventional key configuration can be displayed for use in the device, such as AZERTY, QWERTZ, or a layout based on the International Telecommunication Union (ITU) standard (ITU E.161) having "ABC" on key 2, "DEF" on key 3, and so on. Virtual keyboard 320 includes space key 350 as well as other keys that can provide different inputs, such as punctuation, letters, numbers, enter or return keys, and function keys. While virtual keyboard 320 is shown as having a square shape, it can have any other shape (such as an arch).

As shown in FIG. 3A, touchscreen 118 displays input field 330, which displays the characters the user inputs using virtual keyboard 320. Input field 330 includes a cursor 340, which can be an underscore (as shown) or any other shape, such as a vertical line. Cursor 340 represents the character space where a next inputted character, selected character, or selected set of characters will be inserted.

Figure 3B:
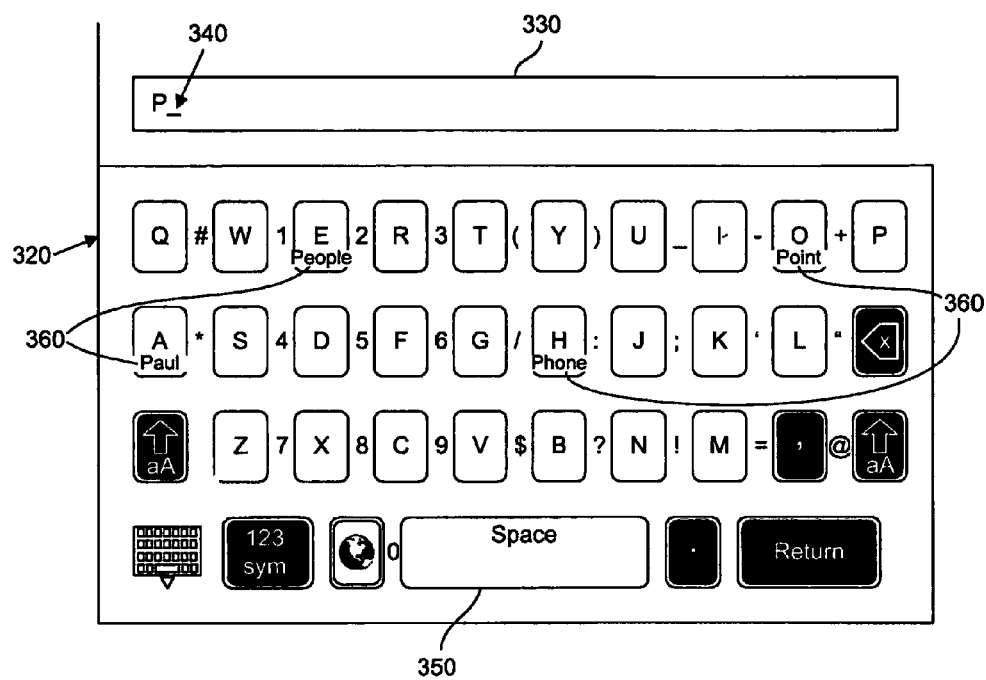

As shown in FIG. 3B, when a user inputs a character (in this example, "P"), this character is displayed in input field 330 and cursor 340 moves to the character space where the next inputted character or word will be inserted. After the character is inputted, a predictor (such as, a predictive algorithm or a circuit) can generate set of characters 360 (for this embodiment) that all begin with the character "P", or characters if more than one character is input. The generated set of characters are displayed at a location on the keyboard corresponding to a subsequent candidate input character that might be received as input from the user. As mentioned, generated set of characters 360 can be displayed at or near the key location corresponding to the subsequent candidate input characters (for example, under the respective A, E, H, and O keys of the virtual keyboard 320). Indeed, slightly shifting the display location of the generated set of characters can address overcrowding of subsequent candidate input characters, effectively permitting more set of characters to be displayed.

In the example shown in FIG. 3B, "P" is received as input and a predictor generates several set of characters 360, which are displayed at keys corresponding to each generated set of characters' subsequent candidate input character. As shown in FIG. 3B, "People" is placed at the "E" key location because the next letter after "P" of "People" is "E"; "Paul" will be placed at the "A" key location because the next letter after "P" of "Paul" is "A"; "Phone" will be placed at the "H" key location because the next letter after "P" of "Phone" is "H"; and so on. It should be noted that any of the letters in the set of characters can be upper case or lower case.

Figure 3C:
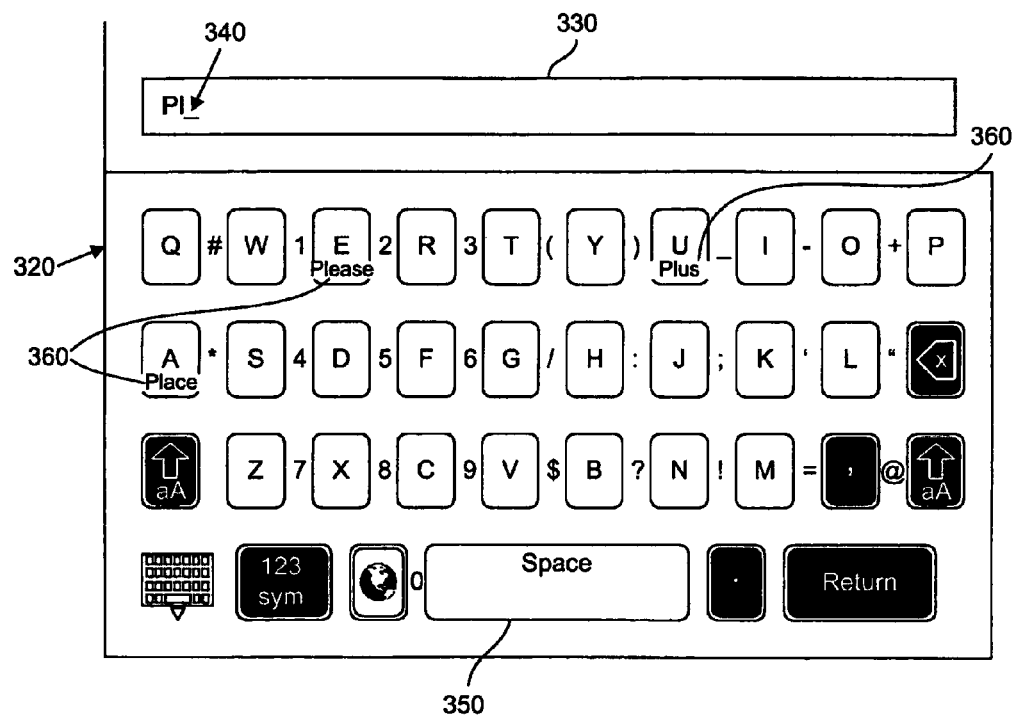

In the embodiment shown in FIG. 3C, "L" is the next input received by the touchscreen, and a predictor determines several generated set of characters 360, which are displayed at a key location corresponding to subsequent candidate input characters (for example. under the respective A, E, and U keys of the virtual keyboard 320), for the current position of cursor 340, which is in the third character position, as shown in input field 330. In another embodiment, a generated set of characters 360 can be presented such as to include the subsequent candidate input character. For example, the set of characters "Please" can be displayed so that the characters "Pl" are displayed before the "E" character near the "E" key location, and the characters "ase" can be placed after the "E" character on the "E" key location. Further, in this or other embodiments, the displayed "E" can be presented in a manner that differs from the "Pl" and "ase", thereby enabling the user to still recognize it as the "E" key while also making it readily visible so that the user can either input the generated set of characters "Please" or input the character "E". The "E" can be capitalized or in lowercase. In other embodiments, an affix can be displayed at the key location. Using the example of the set of characters "Please" above, the "ase" could be displayed at the "E" key so the set of characters fragment "-ease" or "-Ease" would appear.

If the user inputs a generated set of characters, that set of characters is placed in input field 330. This can be seen in FIG. 3D, where the user has inputted generated set of characters "Please," resulting in its placement in the input field. A space is inserted after the set of characters if the user wants to input a new set of characters. A user could input a generated set of characters in various ways, including in a way that differs from a manner of inputting a character key. For example, to input a generated set of characters, a user could use a finger or stylus to swipe the generated set of characters. As used herein, swiping includes swiping the set of characters itself or swiping or touching near the set of characters. For the latter embodiment, the device can detect a swipe or touch near a set of characters, be it a generated set of characters or a predicted set of characters (to be described below), and through the use of a predictor, determine the set of characters the user intended to input. In another embodiment, the user could press a key for a predetermined period of time, such as a long press. That key can be, for example, the key corresponding to the subsequent candidate input character of the set of characters. So, if the set of characters "Please" is intended to be inputted instead of "E", the electronic device 100 can be configured to require that the "E" key be pressed for a predetermined period of time to trigger the input of "Please".

Figure 3D:
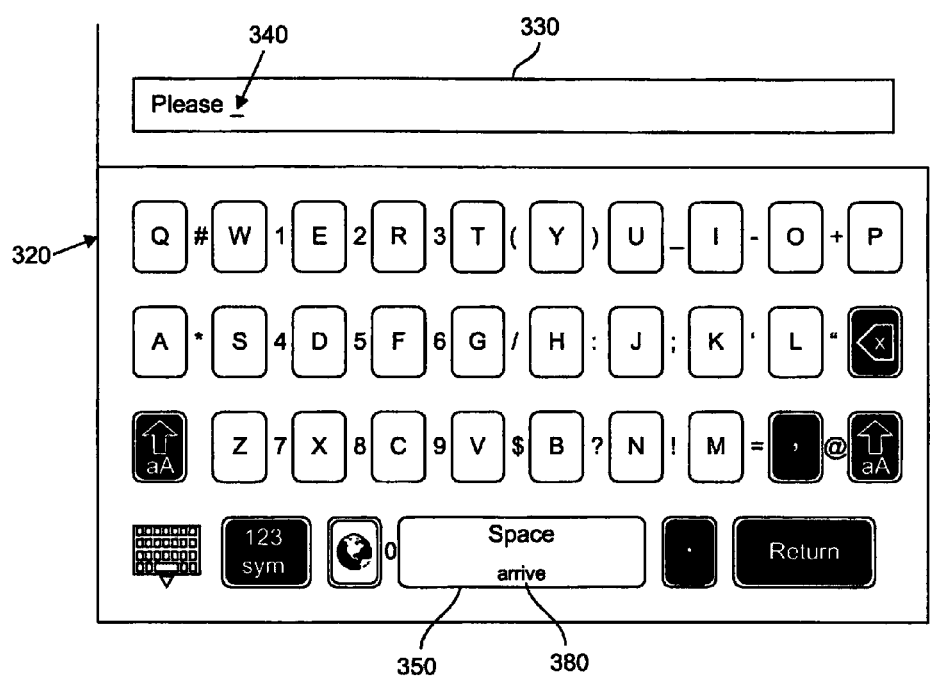

After a generated set of characters 360 has been determined, as shown in FIG. 3D, a predicted set of characters 380 can be displayed, shown here at space key 350. Predicted set of characters 380 can differ from generated set of characters 360 (as shown in FIGS. 3A-3C) and is the system's attempt to predict the next set of characters a user might be contemplating. A predictor is used to determine predicted set of characters 380. As with displayed generated set of characters, predicted set of characters 380 can be received as input in any number of ways, including receiving a swiping of the predicted set of characters with a finger or stylus or receiving a pressing of a key location (such as the space key or another designated key) for a predetermined period of time (long press).

Figure 4A:
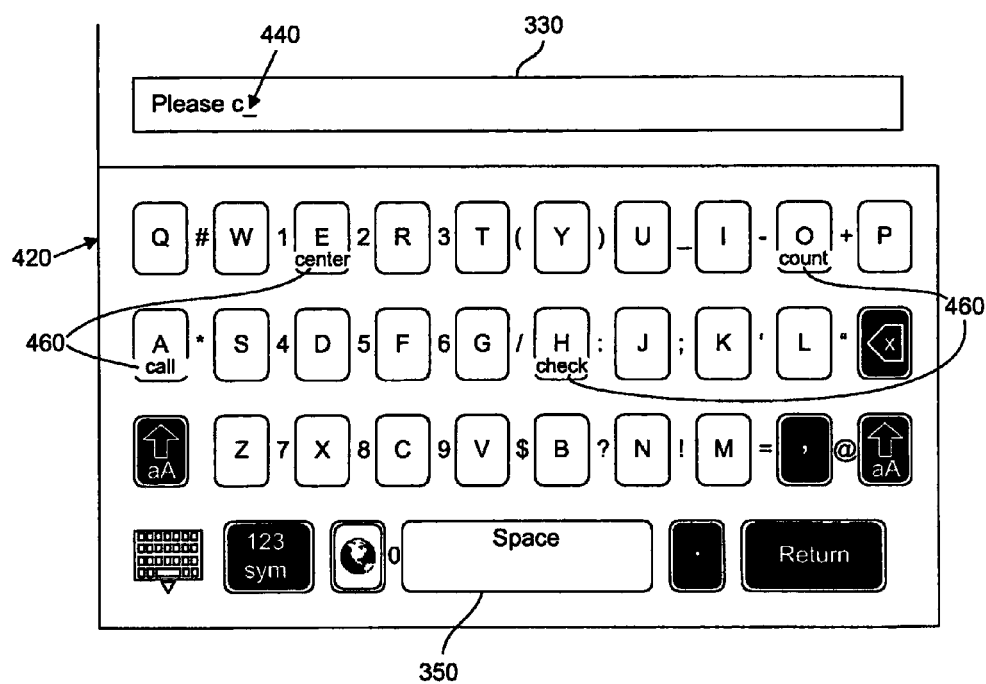
FIGS. 4A and 4B show example front views of a touchscreen, consistent with embodiments disclosed herein.
Figure 4B:
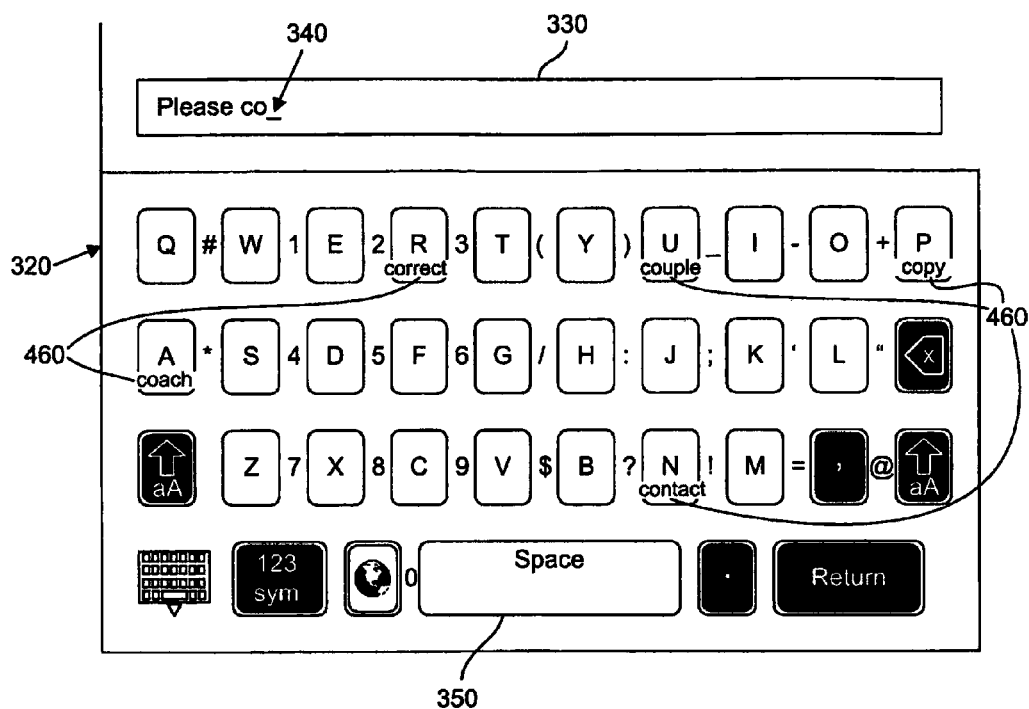

In FIG. 4A, electronic device 100 receives "C" as input from virtual keyboard 320. Again, a predictor determines generated set of characters 460 based in part on the received input. In FIG. 4B, electronic device 100 receives "O" as input from the virtual keyboard and outputs the "O" in input field 330. As shown in FIG. 4A, the set of characters "count" was displayed at the "O" key after the input of the "C" character was received. Since the "O" key was pressed in a manner to only input the "O" character, as shown in FIG. 4B, an "O" is displayed as second character of the currently inputted set of characters, and the set of characters "count" is not inputted by the user. Alternatively, if a user wanted to input the generated set of characters "count," the user can input the "O" key in FIG. 4A in a manner different from a manner of inputting the "O" key, such as by swiping the set of characters "count" or by a long press on the "O" key, as opposed to tapping. Returning to FIG. 4B, after the "O" is inputted, generated set of characters 460 are displayed at the keys corresponding to subsequent candidate input characters, as shown in FIG. 4B.

Figure 5:
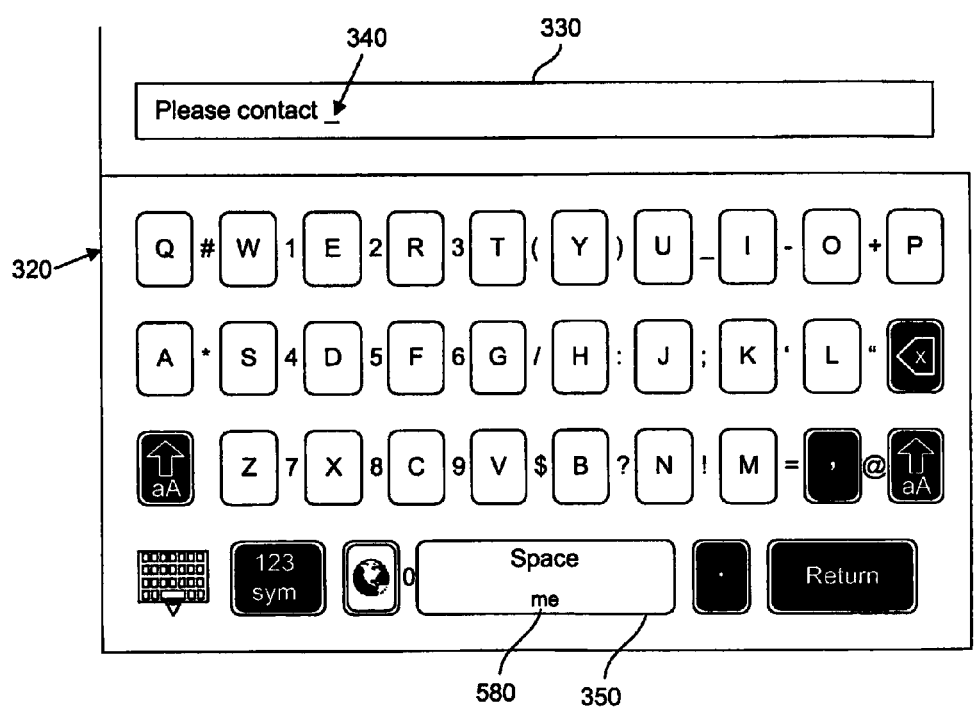
FIG. 5 shows an example front view of a touchscreen, consistent with embodiments disclosed herein.

FIG. 5 shows input field 330 displaying the set of characters "contact" followed by a space. In that instance, the user inputted the generated set of characters "contact" 460 as was shown in FIG. 4B at the "N" key. Referring back to FIG. 5, a <SPACE> character is now automatically inserted after the generated word in the input field. Predicted word "me" 580 is now displayed on space key 350.

Figure 6A:
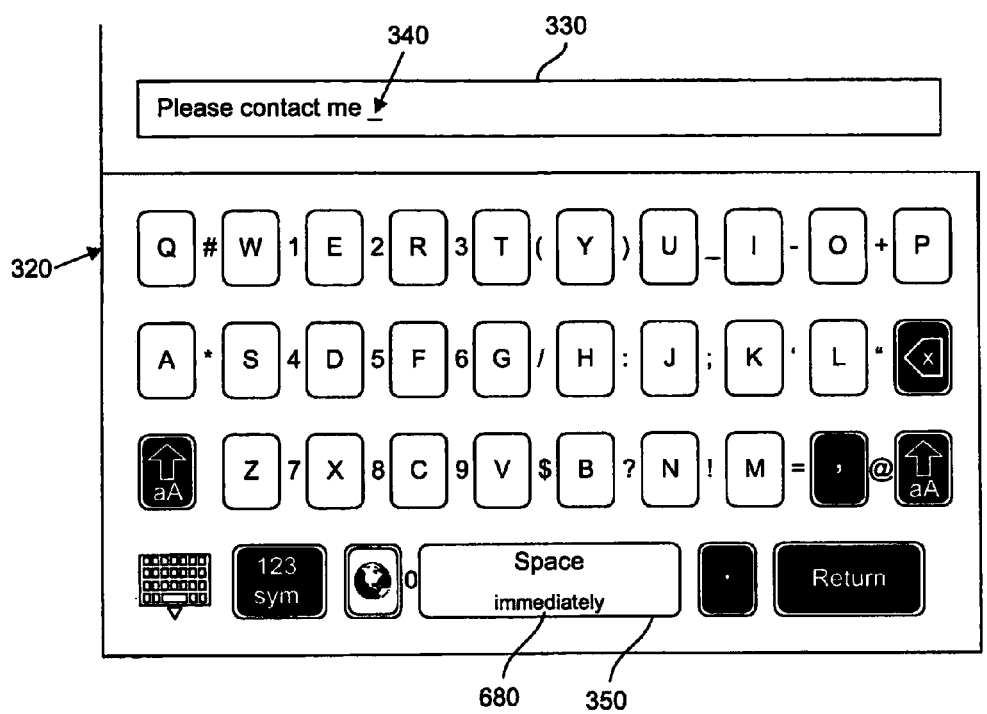
FIGS. 6A, 6B, and 6C show example front views of a touchscreen, consistent with embodiments disclosed herein.

If the predicted word "me" 580 is received as input, the word "me" 580 is then displayed in input field 330 followed by a space as shown in FIG. 6A, which then shows predicted word 680 "immediately" displayed on space key 350. The predicted word is presented after a completed word and space have been displayed in input field 330.

Figure 6B:
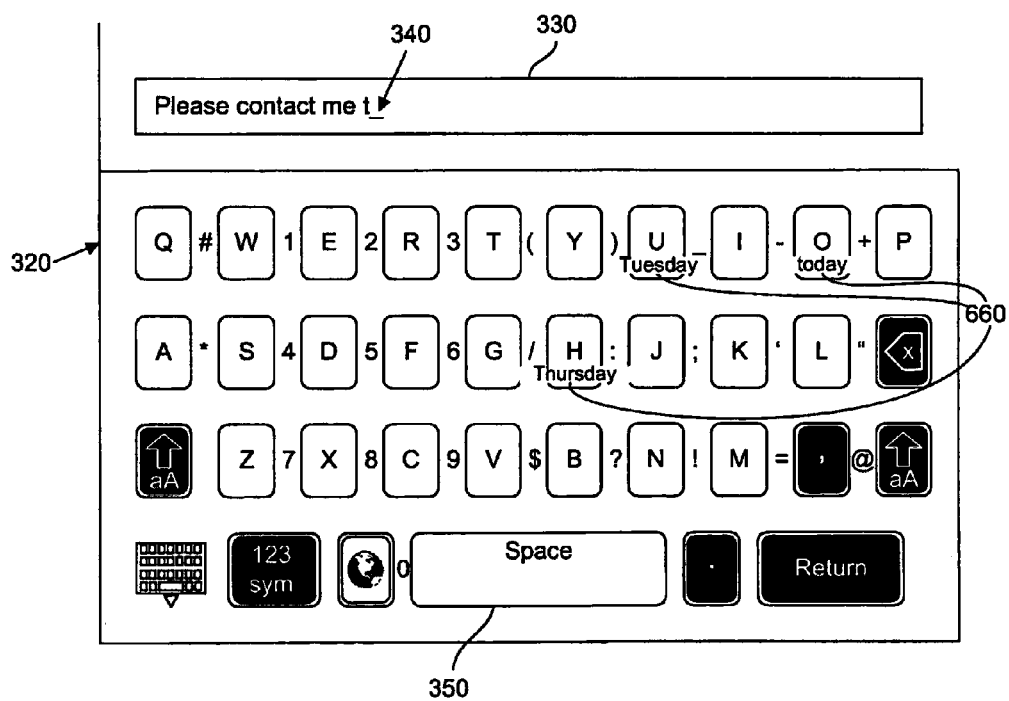
Figure 6C:
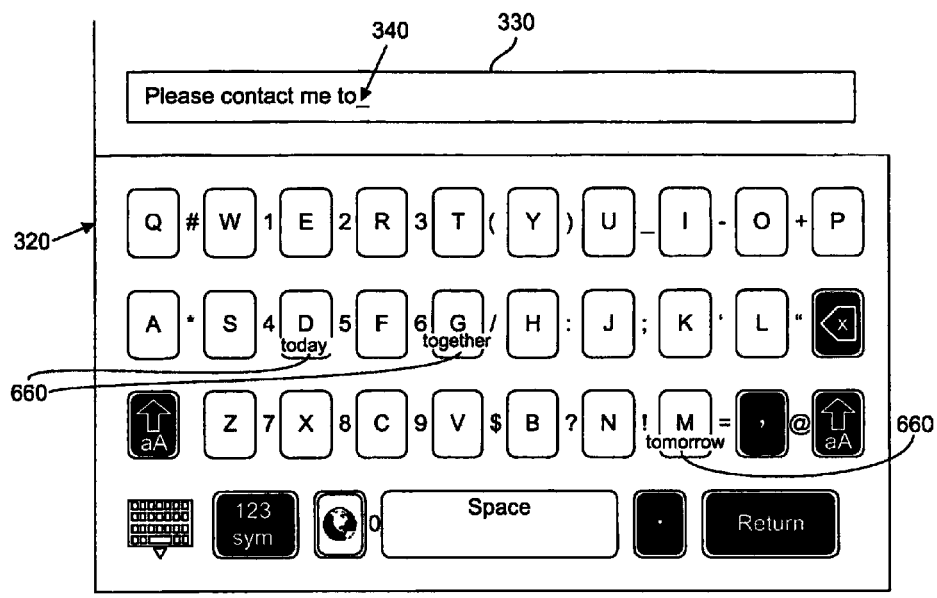

FIG. 6B shows an example where touchscreen 118 has received the "T" character as input after the user has pressed the "T" key. In this scenario, touchscreen 118 displays a "t" in input field 330. Generated set of characters 660 (for example, "Tuesday," "today," and "Thursday") are displayed at the keys of the subsequent candidate input characters. FIG. 6C shows an example where electronic device 100 has received the "o" character as input after the user presses the "O" key instead of inputting generated set of characters 660 "today" as was shown in FIG. 6B. Thus, "o" is now displayed in input field 330.

Figure 7:
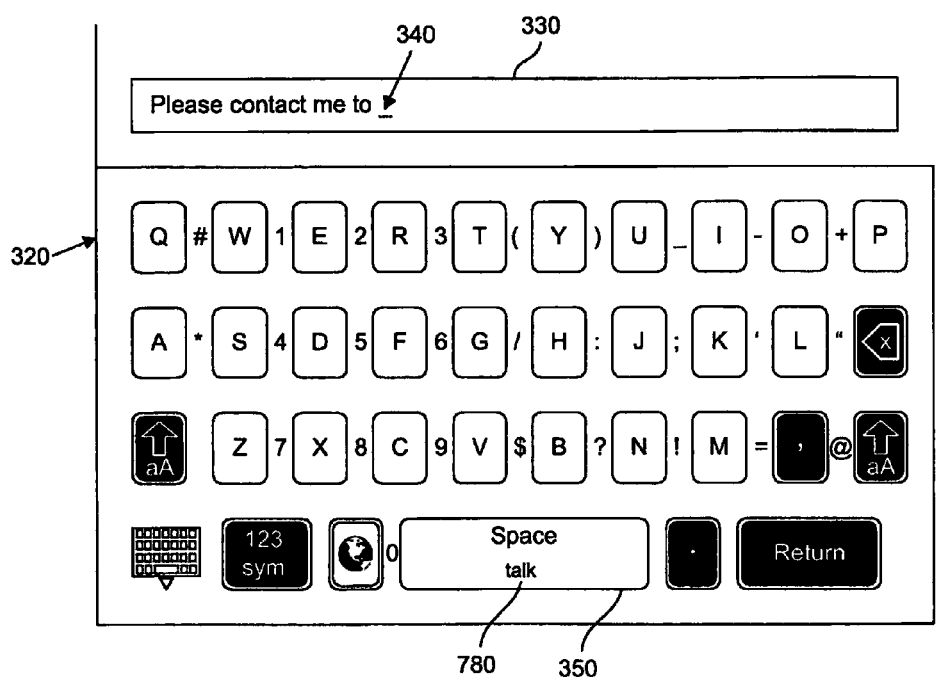
FIG. 7 shows an example front view of a touchscreen, consistent with embodiments disclosed herein.

FIG. 7 shows an example where touchscreen 118 has received the <SPACE> character as input after the user selects the space key. In this scenario, touchscreen 118 inserts a <SPACE> character, and then displays predicted set of characters "talk" 780 at space key 750.

Figure 8A:
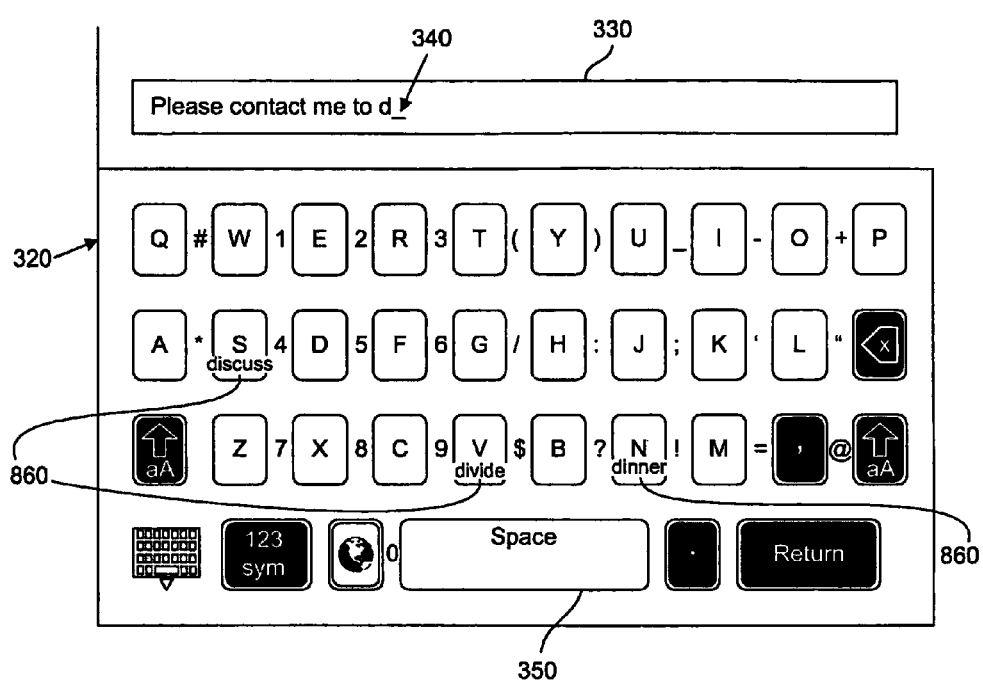
FIGS. 8A and 8B show example front views of a touchscreen, consistent with embodiments disclosed herein.

FIG. 8A shows an example where touchscreen 118 has received the "d" character as input after the user presses the "D" key. In this scenario, touchscreen 118 displays a "d" in the input field 330 and displays generated set of characters "discuss," "divide," and "dinner" 860 on keys corresponding to subsequent candidate input characters. In this example embodiment, while the character "I" was never received as input, electronic device 100 determined that generated set of characters "discuss," "divide," and "dinner" 860 were the set of characters to be displayed on touchscreen. In this embodiment, because each of these set of characters has "i" as its second letter, touchscreen 118 displayed generated set of characters using a further subsequent letter in the set of characters (for example, "discuss" under the "S" key, "divide" under the "V" key, and "dinner" under the "N" key). In other embodiments, generated set of characters "discuss," "divide," and "dinner" 860 can be displayed at or near the "I" key.

Figure 8B:
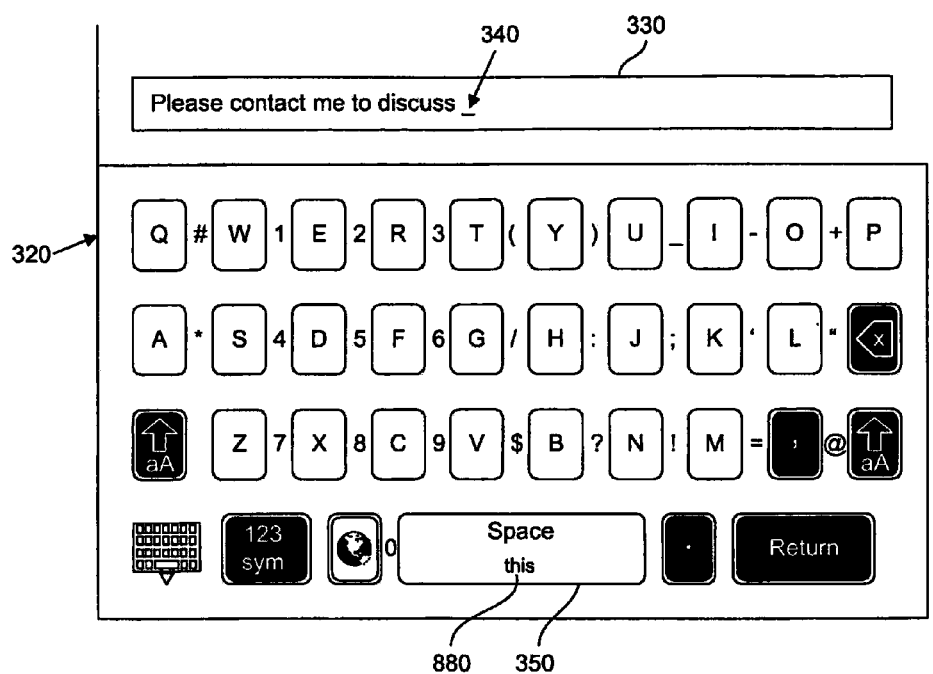

FIG. 8B shows an example where touchscreen 118 has received the set of characters "discuss" as input after the user chooses generated set of characters "discuss" 860. In this example, touchscreen 118 displays predicted set of characters "this" 880 at space key 350.

Figure 9:
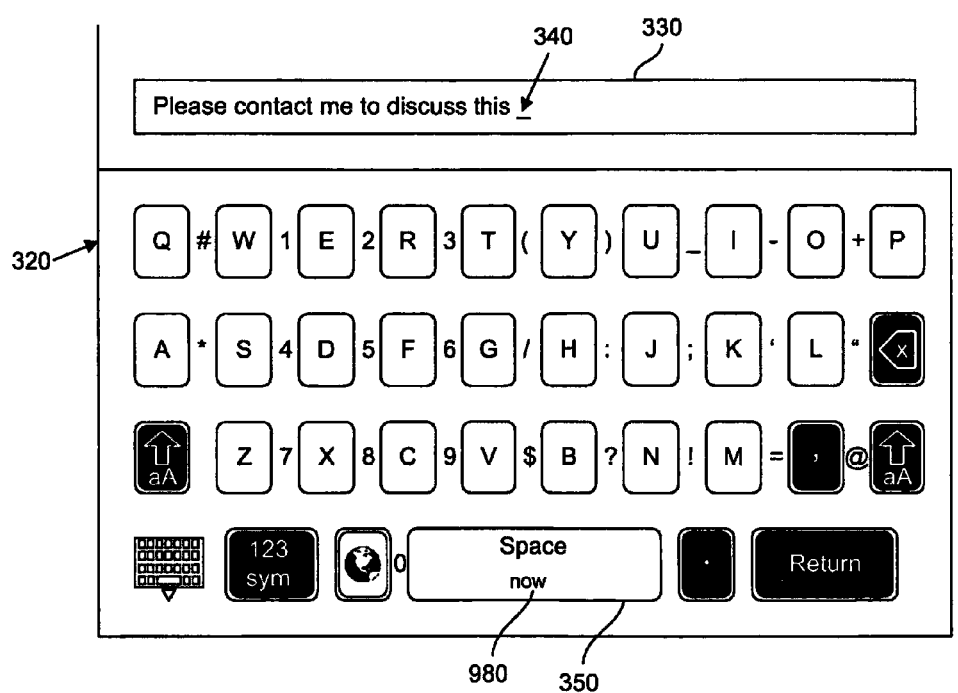
FIG. 9 shows an example front view of a touchscreen, consistent with embodiments disclosed herein.

FIG. 9 shows an example where touchscreen 118 receives the "this" set of characters as input after user selects "this" as a desired predicted set of characters 880. In this example, touchscreen 118 displays predicted set of characters "now" 980 at space key 350.

Touchscreen 118 can also receive punctuation as input at any time during the typing of a message. If a user decides to use punctuation after inputting either a generated set of characters or a predicted set of characters, the <SPACE> character (for example, the <SPACE> character prior to cursor 940 of FIG. 9) is deleted and the inputted punctuation is inserted.

Figure 10A:
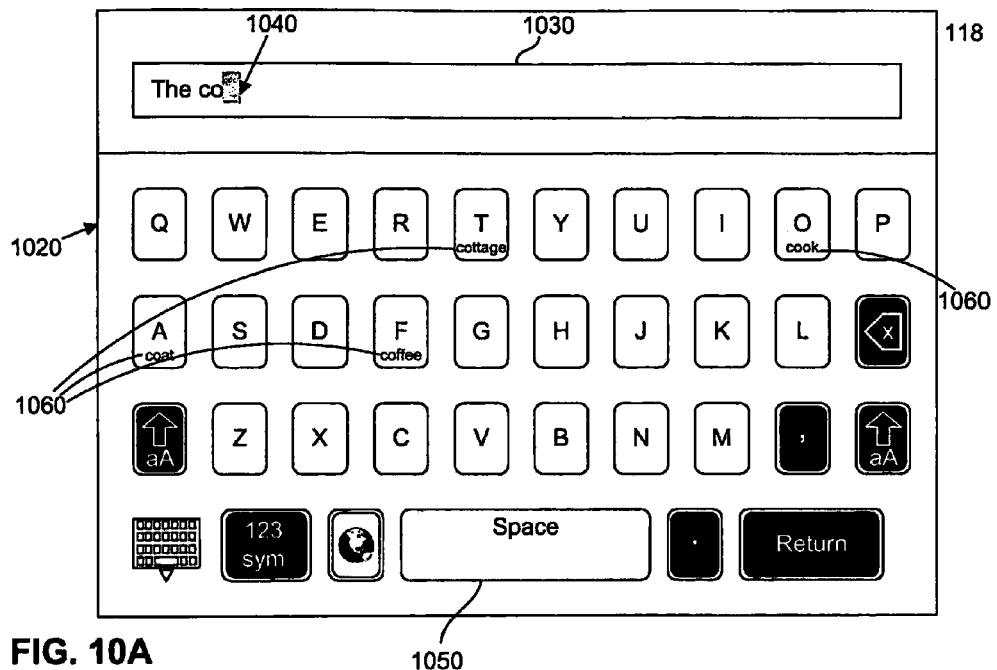
FIGS. 10A and 10B show example front views of a touchscreen, consistent with embodiments disclosed herein.
Figure 10B:
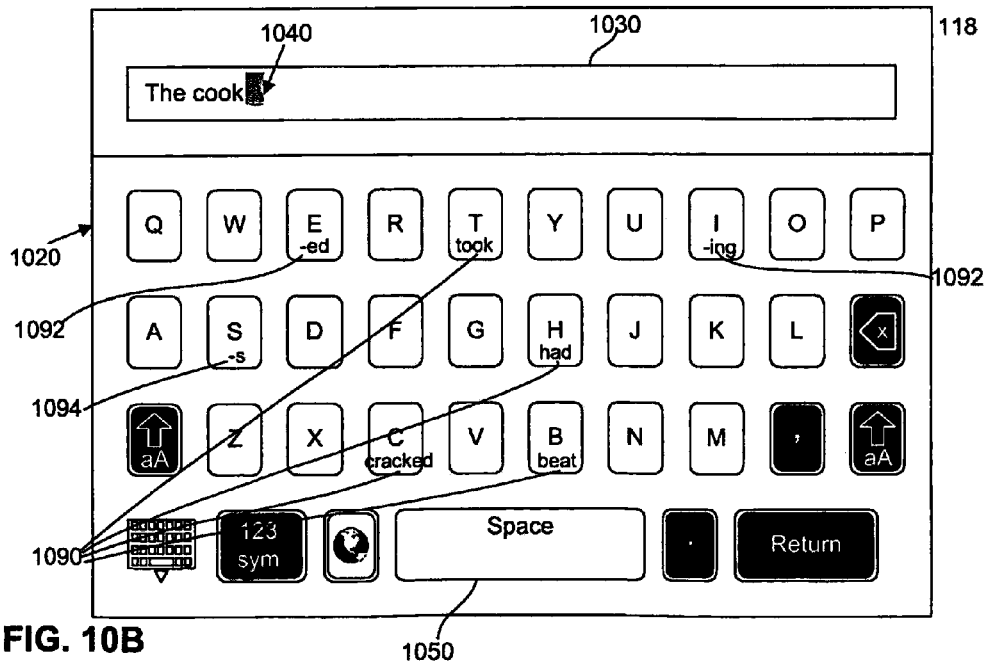

FIGS. 10A and 10B show example front views of a touchscreen, consistent with embodiments disclosed herein. FIG. 10A shows an example where touchscreen 118 displays "The co" in a text bar 1030 and several generated set of characters 1060 are displayed at subsequent candidate input characters. In this example, touchscreen 118 displays generated set of characters "cottage" 1060 under the "T" key location, generated set of characters "cook" 1060 under the "O" key location, generated set of characters "coat" 1060 under the "A" key location, and generated set of characters "coffee" 1060 under the "F" key location.

FIG. 10B shows an example where touchscreen 118 receives the set of characters "cook" as input after the user has selected the generated set of characters 1060 "cook." The set of characters "cook" is inserted into input field 1030 along with a <SPACE> character. In this example, set of characters include new predicted set of characters (such as words 1090, affixes 1092 (for example, "-ed" under the "E" key location and "-ing" under the "I" key location), and plurals 1094 (for example, "-s" under the "S" key location)), all of which are displayed at subsequent candidate input characters. Each predicted word 1090, affix 1092, or plural 1094 is located on respective subsequent candidate input characters that match the first letter of the predicted word 1090, affix 1092, or plural 1094. Now the user has the added option of inputting a predicted set of characters 1090, 1092, and 1094. Input is made in the same manner as described above. In some embodiments, when touchscreen 118 receives either affix 1092 or plural 1094 as an input, the <SPACE> character between cursor 1040 and "cook" is deleted and the corresponding inputted affix or plural is added to the end of "cook."

Figure 11A:
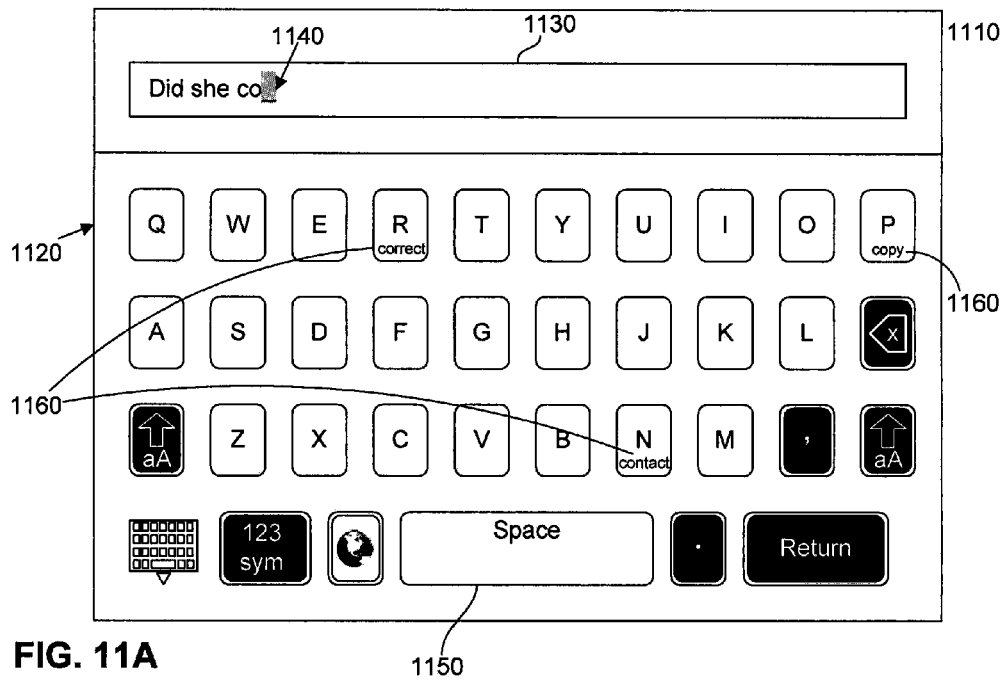
FIGS. 11A and 11B show example front views of a touchscreen, consistent with embodiments disclosed herein.

FIG. 11A shows an example where touchscreen 118 displays "Did she co" in a text bar 1130 and several generated set of characters 1160 are displayed at subsequent candidate input characters. In this example, touchscreen 118 displays generated set of characters "correct" 1160 under the "R" key location, generated set of characters "copy" 1160 under the "P" key location, and generated set of characters "contact" 1060 under the "N" key location. While "co" is provided in the text bars of both FIG. 10A and FIG. 11A, touchscreen displays different generated set of characters based on the context of the characters in their respective text bars 1030 and 1130. For example, in FIG. 10A, the characters "co" follows "The," which implies that a noun beginning with "co" should follow. In FIG. 11A, the characters "co" follow a pronoun, which implies that a verb beginning with "co" should follow. As stated above, contextual data can be used to determine when certain set of characters are more appropriate based on, for example, the set of characters in a text bar or previous actions by a user.

Figure 11B:
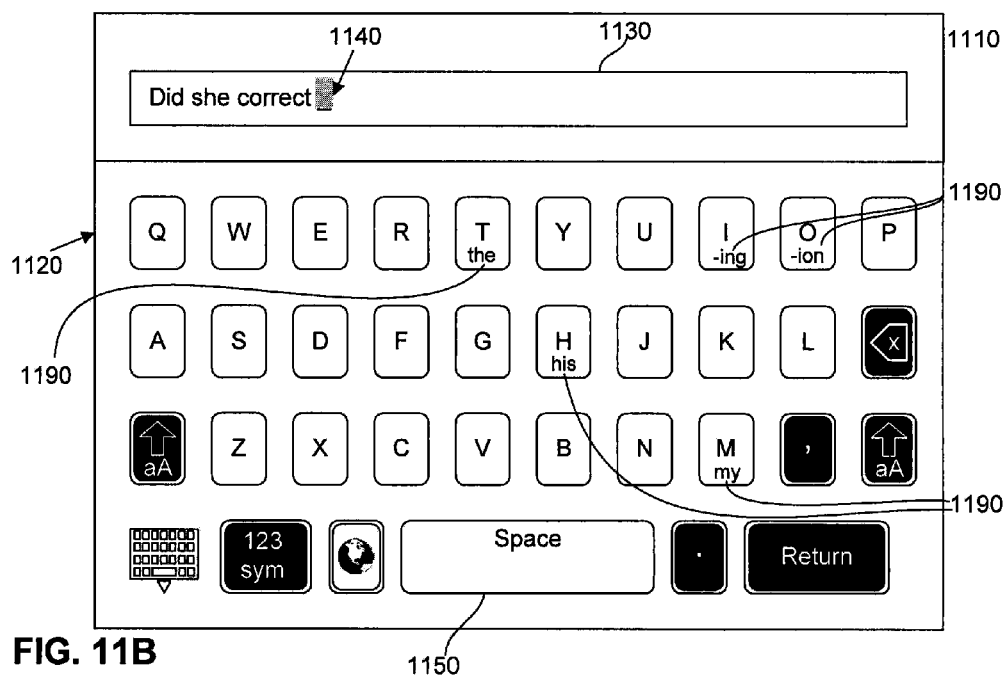

FIG. 11B shows an example where touchscreen 118 receives the set of characters "correct" as input after the user has selected the generated set of characters "correct" 1160. In this example, the set of characters "correct" is inserted in input field 1130 and a <SPACE> character is also inserted. Predicted set of characters (such as words 1190 and affixes 1192) are now displayed at subsequent candidate input characters. In this example, while affixes "-ing" and "-ion" both correspond to the "I" key location, touchscreen 118 displays "-ing" with the "I" key location and "-ion" with the "O" key location. As stated above, the predicted affix may be assigned to a certain key location based on a ranking, on contextual data, or a combination of both. In this embodiment, the "-ing" affix may have had a higher ranking than the "-ion" affix and was thus assigned to the "I" key location. Accordingly, the "-ion" affix was assigned to the "O" key location based on the corresponding "O" character being in the "-ion" affix.

Figure 12A:
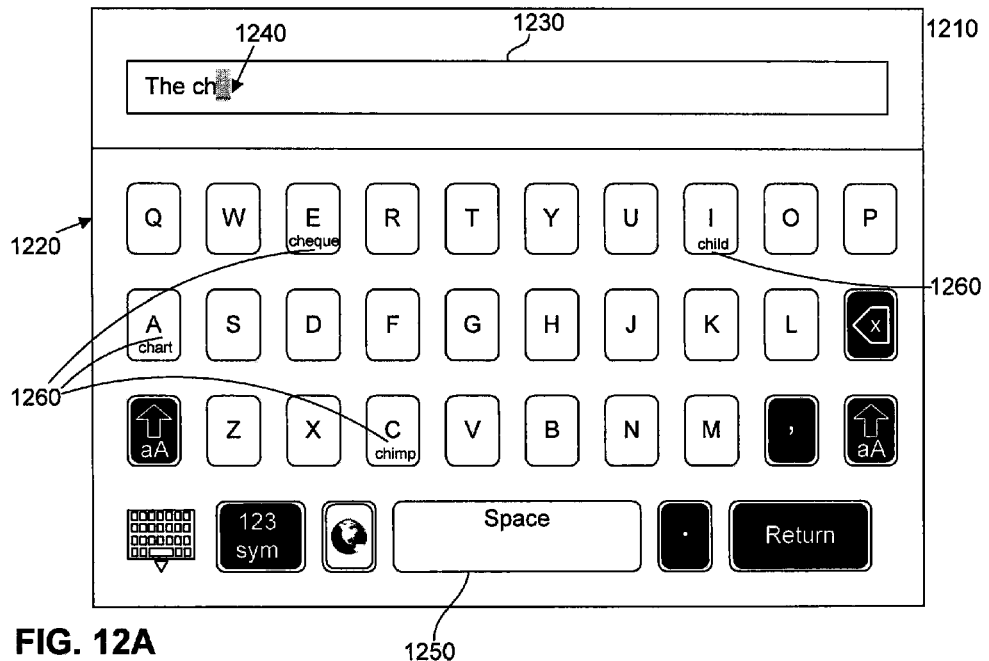
FIGS. 12A and 12B show example front views of a touchscreen, consistent with embodiments disclosed herein.

FIG. 12A shows an example where touchscreen 118 displays "The ch" in a text bar 1230 and several generated set of characters 1260 are displayed at subsequent candidate input characters. In this example, generated set of characters 1260 include both "child" and "chimp." In this embodiment, while the third letter in both "child" and "chimp" are the same, touchscreen displays "child" under the "I" key location and displays "chimp" under the "C" key location. The determination on which generated set of characters goes under which candidate input key can be based on a ranking (as specified above). As illustrated in this embodiment, touchscreen 118 can display a generated set of characters (in this case, "chimp") at a key location even though that key location may not be associated with any subsequent characters of the characters in text bar 1230.

Figure 12B:
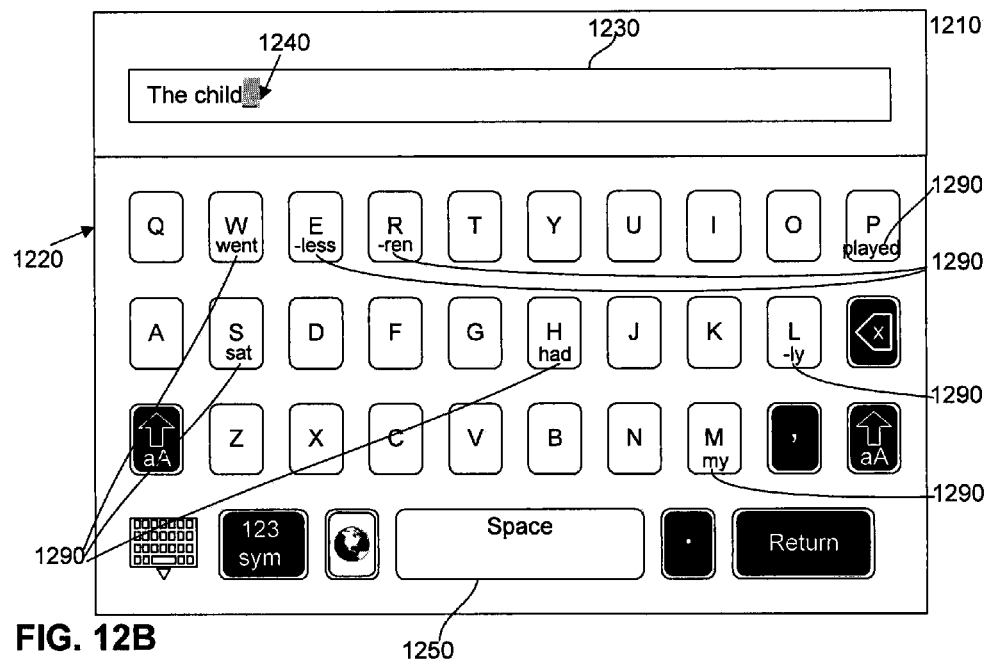

FIG. 12B shows an example where touchscreen 118 receives the set of characters "child" as input after the user has selected the generated set of characters "child" 1260. The set of characters "child" is inserted in input field 1230 and, in this example, a <SPACE> character is not inserted. Predicted set of characters (such as words 1290 and affixes 1292) are now displayed at subsequent candidate input characters. In this example, while affixes "-ly" and "-less" both correspond to the "L" key location, touchscreen 118 displays "-ly" with the "L" key location and "-less" with the "E" key location. As stated above, the predicted affix may be assigned to a certain key location based on a ranking, on conventional data, or a combination of both. In this embodiment, the "-ly" affix may have had a higher ranking than the "-less" affix and was thus assigned to the "L" key location. Accordingly, the "-less" affix was assigned to the "E" key location based on the corresponding "E" character being in the "-less" affix.

Figure 13A:
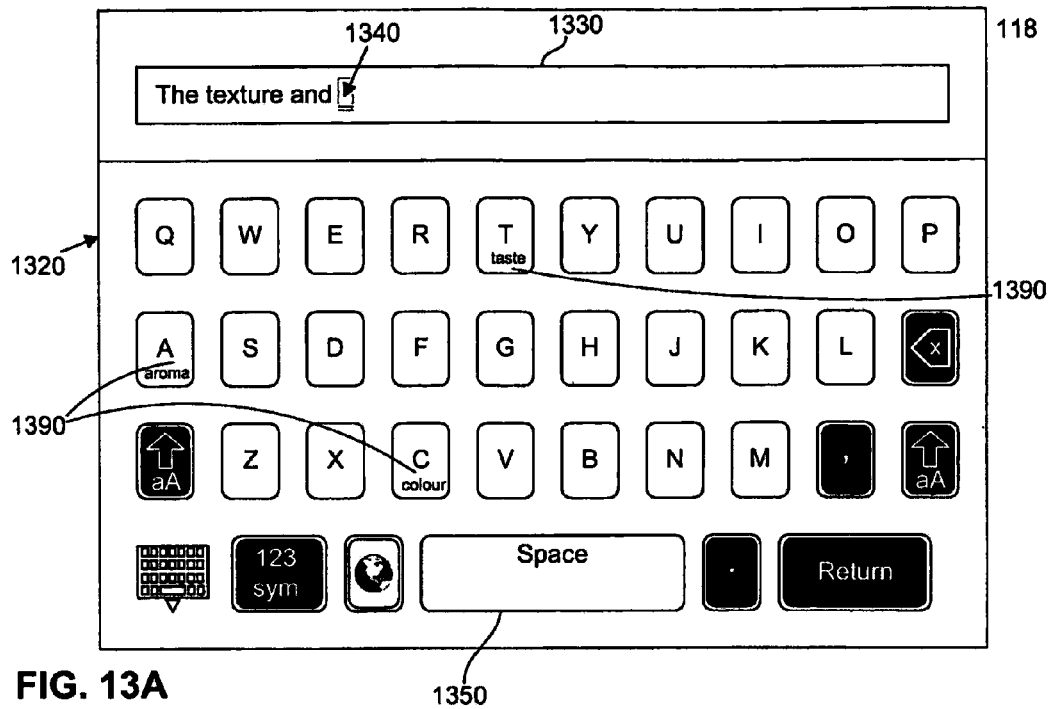
FIGS. 13A and 13B show example front views of a touchscreen, consistent with embodiments disclosed herein.
Figure 13B:
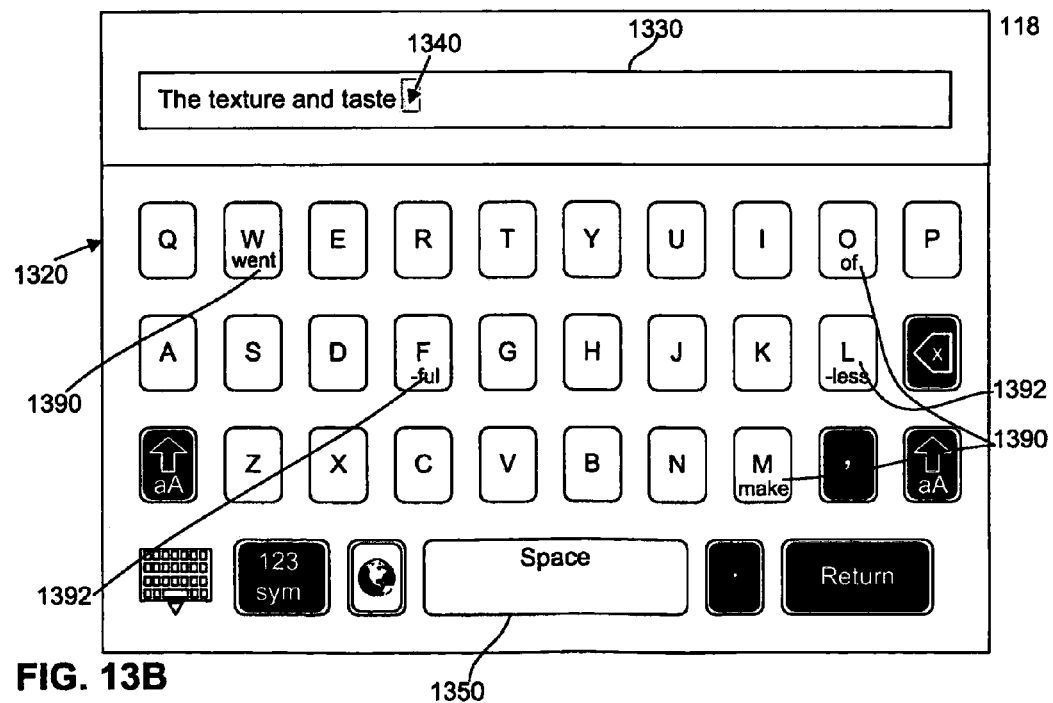

FIG. 13A shows an example where touchscreen 118 displays "The texture and" in a text bar 1330 and several predicted set of characters (for example, words 1390) are displayed at subsequent candidate input characters. FIG. 13B shows an example where touchscreen 118 received the set of characters "taste" as input after the user had selected the predicted set of characters "taste." In this example, a <SPACE> character was inserted after "taste." Consequently, predicted set of characters (such as, words 1390 and affixes 1392) are displayed at subsequent candidate input characters.

Figure 14A:
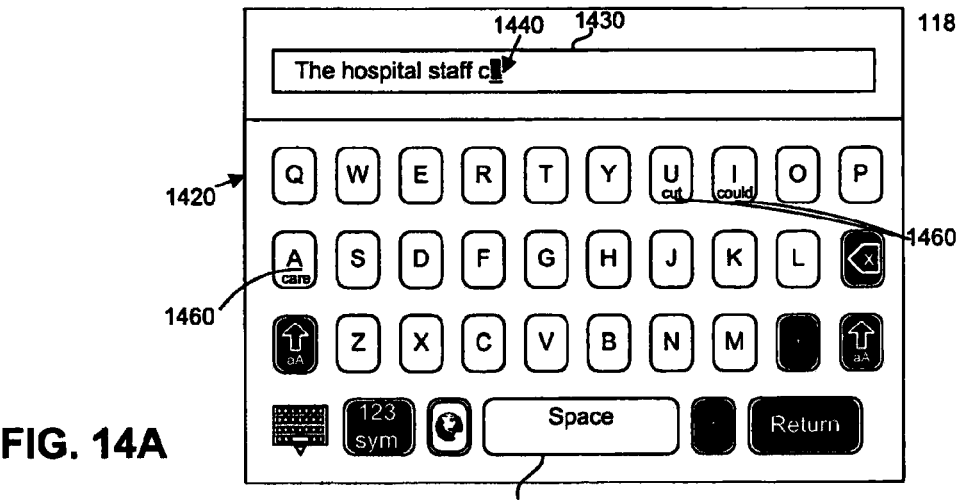
FIGS. 14A, 14B, and 14C show example front views of a touchscreen, consistent with embodiments disclosed herein.
Figure 14B:
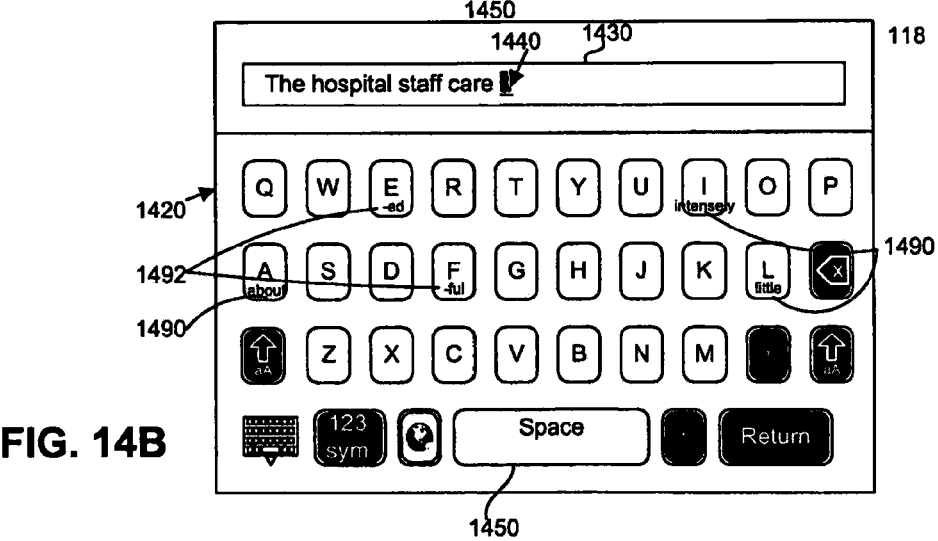
Figure 14C:
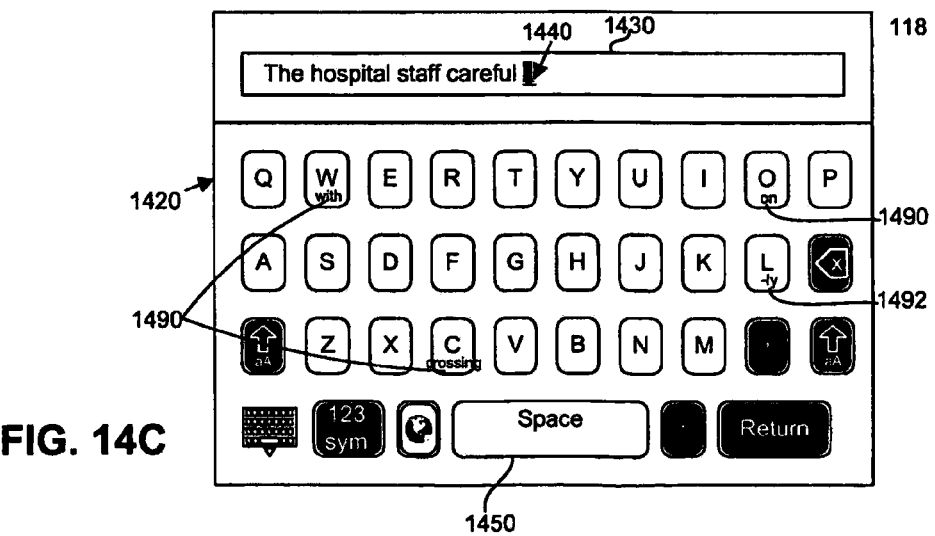

FIG. 14A shows an example where touchscreen 118 displays "The hospital staff c" in a text bar 1430 and several generated set of characters 1460 are displayed at subsequent candidate input characters. FIG. 14B shows an example where touchscreen 118 received the set of characters "care" as input after the user had chosen the generated set of characters "care." Generated set of characters "care" is now placed in input field 1430 along with a <SPACE> and predicted set of characters (such as, words 1490 and affixes 1492) are displayed at subsequent candidate input characters. FIG. 14C shows an example where touchscreen 118 received the affix "-ful" as input (thereby modifying the set of characters "care" to "careful") after the user had chosen the predicted affix "-ful." Thus, the set of characters "careful" is now inserted into input field 1430. Note, in some embodiments, inputting a word or affix can modify the input word or word fragment. For example, if "spicy" was input by a user, and "ness" is a predicted affix and is inputted, "spicy" would change to "spiciness," dropping the "y" and adding "iness". In other embodiments, "happy" could change to "happiness" or "conceive" could change to "conceivable".

Figure 15:
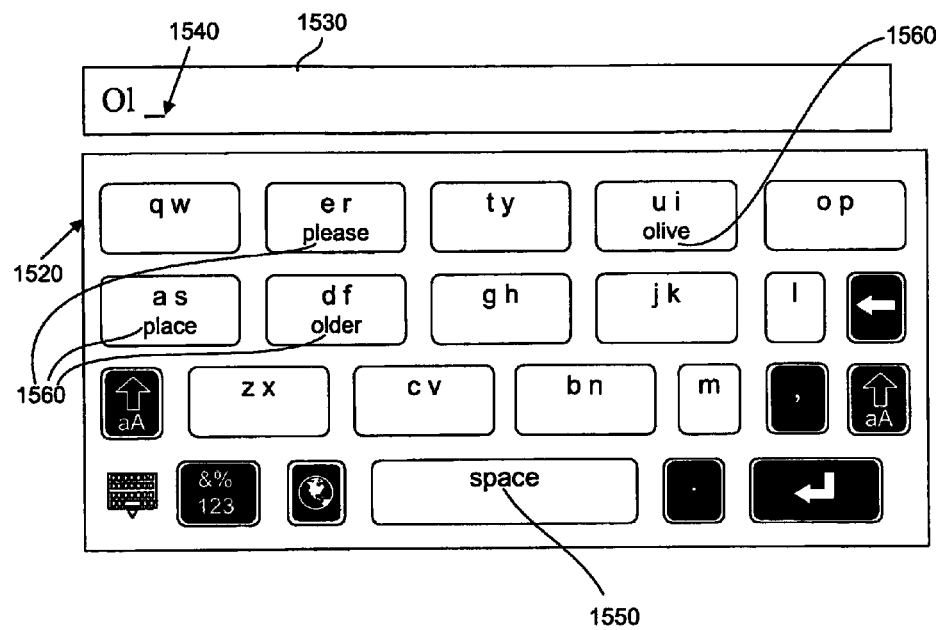
FIG. 15 shows an example front view of a touchscreen, consistent with embodiments disclosed herein.

FIG. 15 shows an example of an ambiguous keyboard 1520, which can have multiple characters assigned to a key location (for example, such as a telephone keypad where "A," "B," and "C" are assigned to key 2; "D," "E," and "F" are assigned to key 3, and so on). For example, the characters "Q" and "W" can be assigned one key location, and the characters "E" and "R" assigned to another key location. In this example, the user has input the characters "Ol" by pressing the "op" key followed by the "L" key. Using a predictor, generated set of characters 1560 are displayed at subsequent candidate input characters. Since the first pressed key can input either an "O" or a "P" and the second pressed key inputs an "L", generated set of characters 1560 will begin with "OL" or "PL", such as shown by generated set of characters 1560 in FIG. 15.

Figure 16:
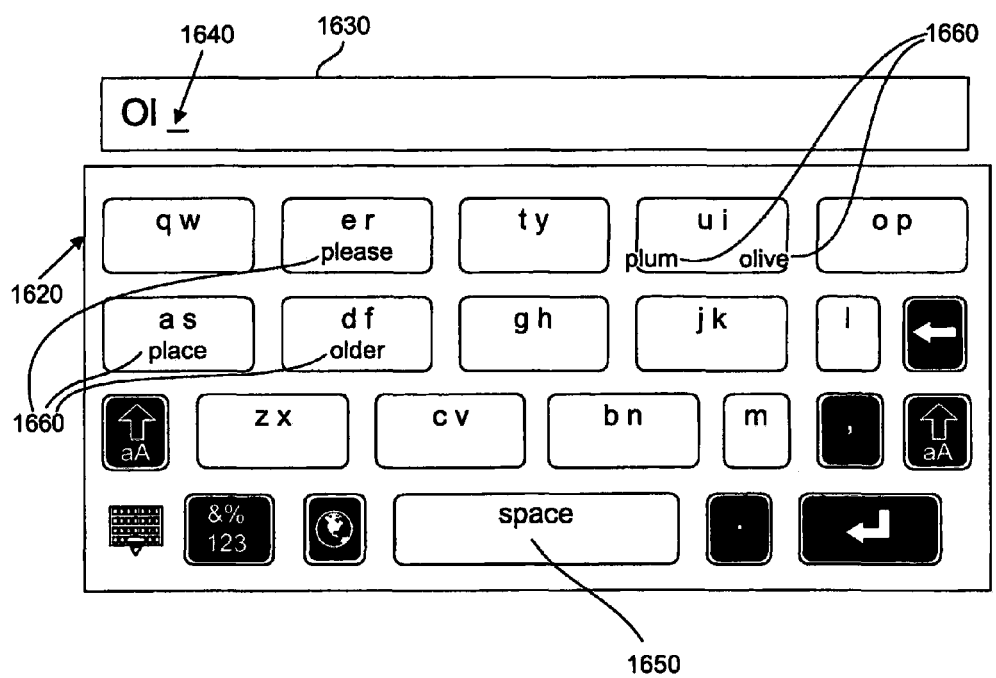
FIG. 16 shows an example front view of a touchscreen, consistent with embodiments disclosed herein.

FIG. 16 shows another example of an ambiguous keyboard 1620. In this example, generated sets of characters "plum" and "olive" 1660 are displayed near the "ui" key. The sets of characters could also have been displayed at or on the "ui" key. Here, both sets of characters correspond to a particular input corresponding to a key, namely the third letter of plum is a "u" and the third letter of olive is an "i." Touchscreen 118 (via main processor 102) can differentiate between the input of either set of characters based on the user's action. For example, the user can swipe at or near the right of the "ui" key to input "olive", or swipe at or near the left of the "ui" key to input "plum".

Figure 17:
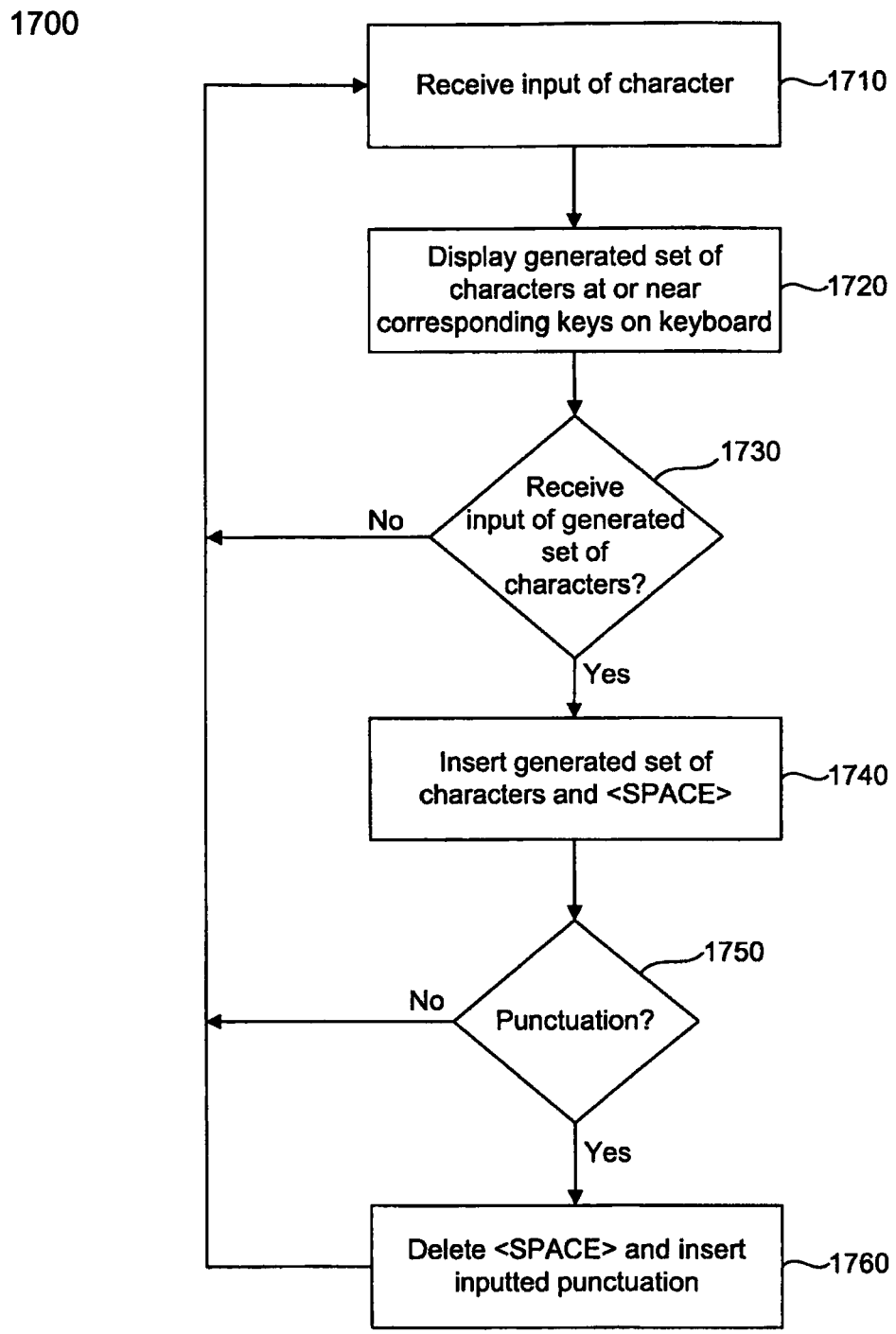
FIG. 17 is a flowchart illustrating an example method, consistent with embodiments disclosed herein.
Figure 18:
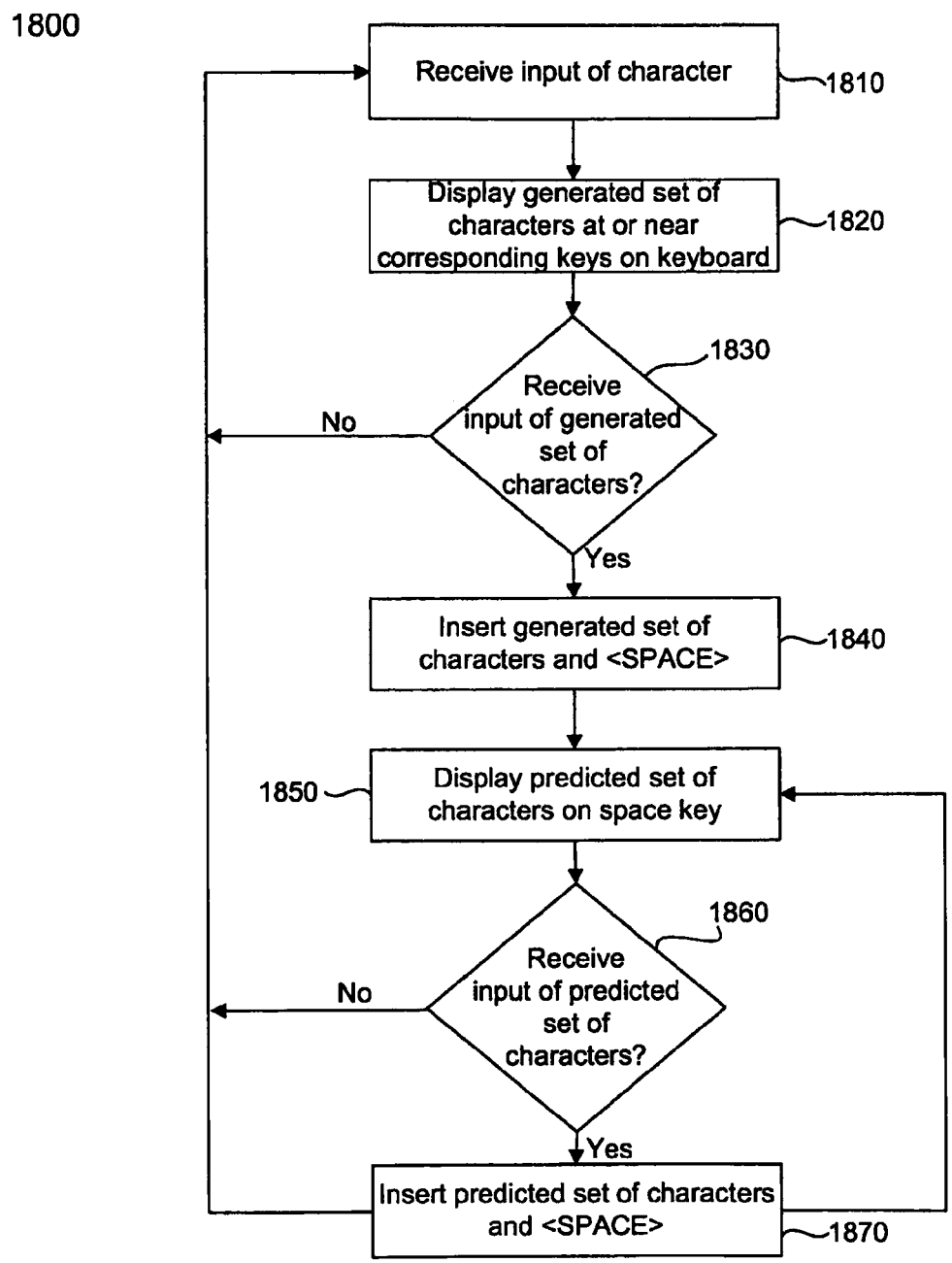
FIG. 18 is a flowchart illustrating an example method, consistent with embodiments disclosed herein.
Figure 19:
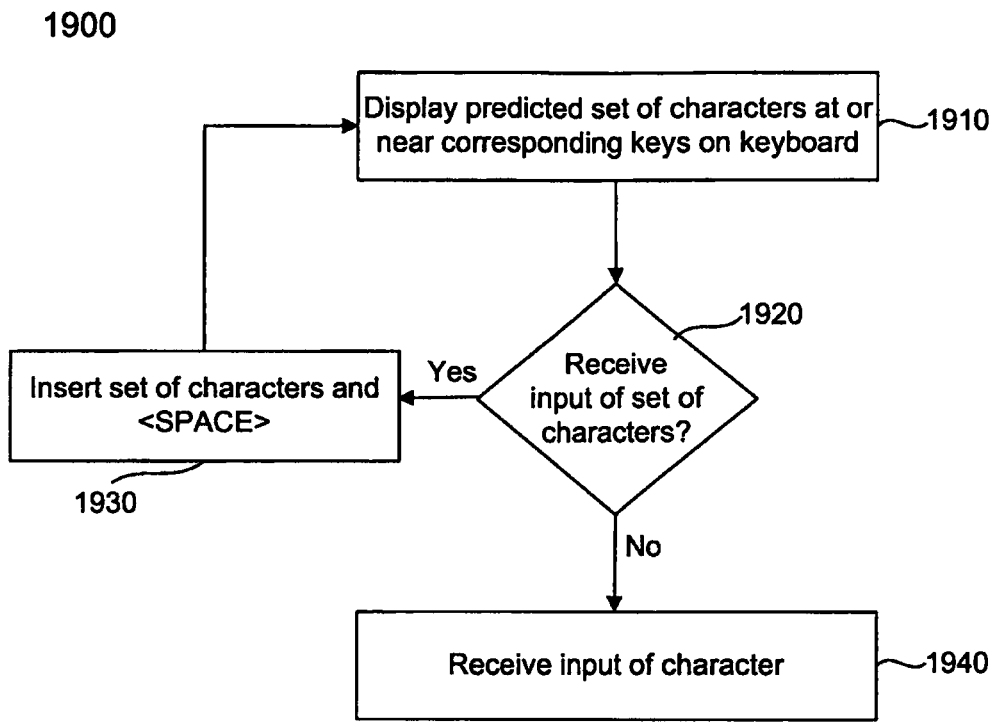
FIG. 19 is a flowchart illustrating an example method, consistent with embodiments disclosed herein.

The examples and embodiments illustrated in FIGS. 17, 18, and 19 can be implemented with any set of characters such as words, phrases, acronyms, names, slang, colloquialisms, abbreviations, or any combination thereof.

FIG. 17 shows in flowchart form a method 1700 in accordance with some embodiments. Method 1700 can be implemented with a processor, such as main processor 102, and stored on a tangible computer readable medium, such as hard drives, CDs, DVDs, flash memory, and the like. At block 1710, the processor receives an input of a character. At block 1720, the processor displays a generated set of characters at or near keys of subsequent candidate input characters on the touchscreen, such as described above.

At block 1730, the processor receives an input of the generated set of characters chosen by a user. If the user does not choose a generated set of characters displayed at or near keys of subsequent candidate input characters, the method restarts at block 1710, where the touchscreen can receive an input of another character. If a generated set of characters is received as input, at block 1740 the generated set of characters and a <SPACE> character is inserted in an input field (for example, input field 330 of FIGS. 3-9) As mentioned previously, the user can choose the generated set of characters, for example, by swiping at or near it or by long pressing a key corresponding to the subsequent candidate input character.

Continuing at block 1750, if the processor detects that punctuation is not to be inserted, the method restarts at block 1710. If punctuation is to be inserted, the method continues to block 1760 where the <SPACE> character is deleted and the appropriate punctuation is added to the input field. After block 1760, the method starts over at block 1710.

FIG. 18 is a flowchart illustrating example method 1800 in accordance with some embodiments. Method 1800 can be implemented with a processor, such as main processor 102, and stored as software instructions on a tangible computer readable medium, such as hard drives, CDs, DVDs, flash memory, and the like, that can be executed by main processor 102. At block 1810, the processor receives an input of a character.

At block 1820, the processor displays a generated set of characters at or near a location on the keyboard corresponding to a subsequent candidate input character on a touchscreen. At block 1830, the processor receives an input of a generated set of characters chosen by a user. If the user does not choose a generated set of characters displayed at or near keys of subsequent candidate input characters, the method restarts at block 1810, where the processor can receive an input of another character. If a generated set of characters is received as input, at block 1840 the generated set of characters and a <SPACE> character is inserted in an input field (for example, input field 330 of FIGS. 3-9). As mentioned previously, the user can choose the generated set of characters, for example, by swiping at or near it or by pressing a key corresponding to the subsequent candidate input character for a predetermined period of time.

At block 1850, a predicted set of characters, different from the generated set(s) of characters, is displayed on a space key of the keyboard after the input of the generated set of characters in block 1830. The predicted set of characters displayed in block 1850 is determined by using a predictor. In some embodiments, the one or more predicted sets of characters can be placed on one or more keys other than the space key.

At block 1860, the processor can determine whether it has received an input of the predicted set of characters based on a user input. If the touchscreen has not received an input of the predicted set of characters because the user has not chosen the predicted set of characters, the method restarts at block 1810. If the processor has received the input of the predicted set of characters, the method continues to block 1870, where the chosen predicted set of characters and a <SPACE> character is inserted in the input field. From here, method 1800 can return to either block 1810 or block 1850.

Even though method 1800 does not display the punctuation illustration as shown in method 1700, the punctuation illustration, as shown in blocks 1750 and 1760, can likewise be applied to method 1800.

FIG. 19 is a flowchart illustrating an example method 1900 in accordance with some embodiments. At box 1910, predicted set of characters is displayed at corresponding subsequent candidate input characters. In these embodiments, an input has not been received or a delimiter has been activated, such as inputting a <SPACE>. Here, one or more predicted set of characters (such as, words, affixes, or a combination thereof) are placed on subsequent candidate input characters that correspond to the first letter of the generated set of characters. Moving to box 1920, it is determined whether the touchscreen receives an input of the set of characters (such as, word or affix) based on a user's selection. If an input is received, the method moves to block 1930 where the predicted set of characters and a <SPACE> character are inserted into an input field. Then the method starts over at block 1910. If the touchscreen does not receive an input of the set of characters, the touchscreen is available to receive an input of a character (as described by block 1710 of FIG. 17 or block 1810 of FIG. 18) and proceed through methods (such as methods 1700 of FIG. 17 or 1800 of FIG. 18 or even method 1900 of FIG. 19).

Swipe-Then-Tap Mode

In a swipe-then-tap mode, the device detects input when a user enters data by tracing her finger over the keys of the virtual keyboard 320 to begin spelling out text. During the swipe process, the device displays one or more strings (or sets of characters or words) to the user. Once the device displays strings, it detects selection input gestures of the user (such as a tap, swipe, or flick, for example) reflecting a user's selection of one of the displayed strings.

In some embodiments, the device detects an input gesture that includes a swipe in a particular direction. Based on the detected direction of the swipe, the device may predict characters the user intends to commit to input. In some aspects, the device determines that when a user changes direction at a key location, the user intends to commit the character associated with the key location as input. For example, when a user swipes her finger to the right reaching the key location for the character "h," and changes direction by moving her finger to the upper right, the device may predict that the user is committing the character "h" as input. In some aspects, the device may determine that a user is committing a character when it detects a pause in the swipe process at a key location associated with a character. For example, when a user pauses at the key location for the character "a," the device may predict that the user is committing the character "a" as input.

As the user moves her finger along the virtual keyboard 320, the device displays one or more predicted strings based on the characters that the user has committed to input, and the predicted strings include the committed characters. The device displays the strings at key locations based on the relationship between the characters associated with the key locations and the characters of the predicted strings. The relationship may include non-committed characters of the predicted strings. For example, the device may display the predicted strings at the key location associated with the first non-committed character of the predicted strings. By displaying predicted strings at key locations associated with the non-committed characters, the device further facilitates the input process by presenting predictions in connection with the user's swipe.

FIGS. 20A-23B illustrate examples of a user entering data on a virtual keyboard 320 in the swipe-then-tap mode. In FIGS. 20A-23B, the user's input gestures are shown using solid and broken lines. Solid lines illustrate the portions of the user's swipe covering key locations associated with characters that have been committed to input, while broken lines represent the portions of the user's swipe that are in progress. While discussing Examples 20A-23B, reference will be made to the device predicting strings. The particular methodology used by the device to predict strings may vary across embodiments and different predictor methodologies may be employed.

Figure 20A:
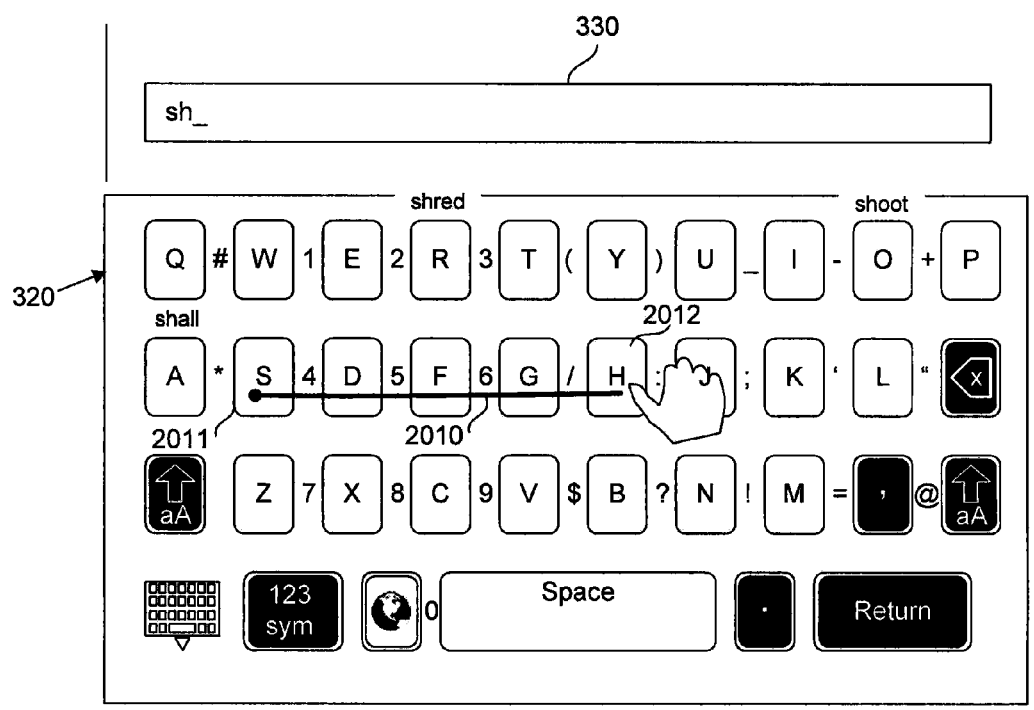
FIG. 20A, 20B, 20C show an example front view of a touchscreen, consistent with embodiments disclosed herein.
Figure 20B:
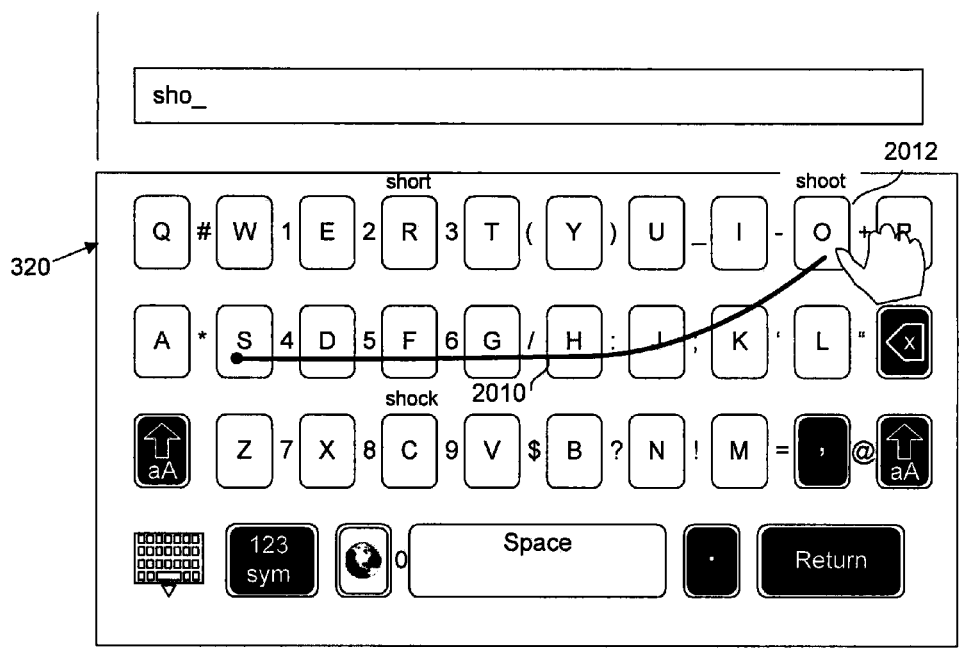
Figure 20C:
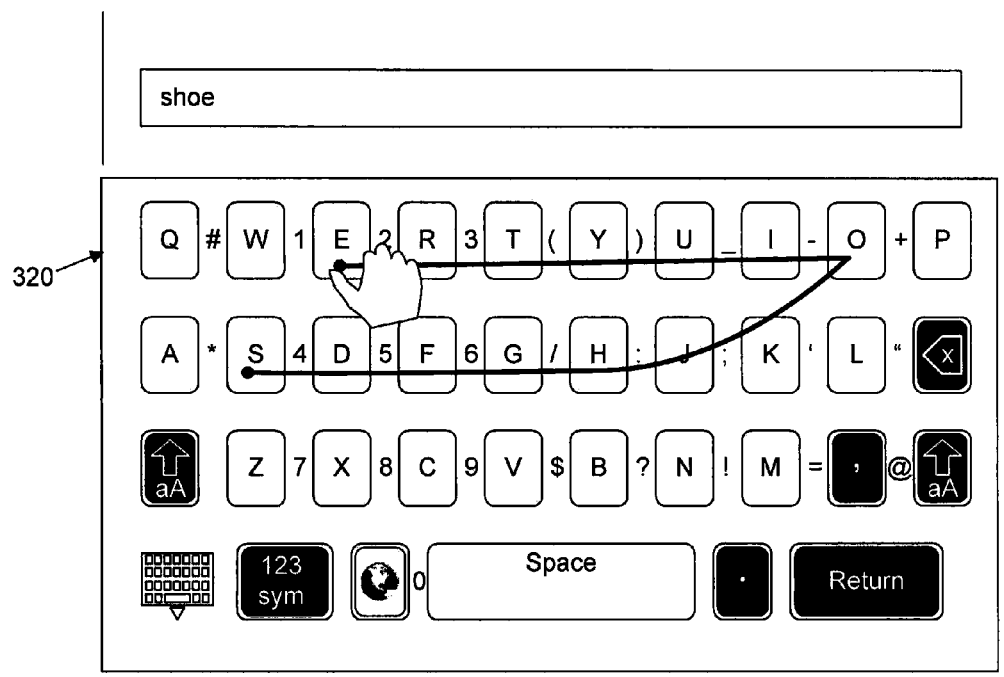

FIGS. 20A-20C depict an example of a user entering text on a virtual keyboard 320 in the swipe-then-tap mode. For the purpose of explaining FIGS. 20A-20C, we begin with an assumption that the user wishes to input the word "shoe." The device begins detecting an input gesture when the user first places her finger at key location 2011, which is associated with the character "s." As the user begins to swipe (shown as line 2010), the device predicts that the user is committing the character "s." The device continues to detect the swipe as the user moves to key location 2012 which is associated with the character "h." Once the user reaches the "h" key location 2012, the user may begin swiping in a new direction. The device, as it detects the change in direction, determines that the user is committing the characters "sh," and the device may predict the strings "shoot," "shred," and "shall." The virtual keyboard 320 displays the predicted strings at key locations based on the relationship between the predicted strings and the non-committed characters of the predicted strings. For example, the virtual keyboard 320 may display the predicted strings at key locations associated with the first non-committed character of the predicted strings. As shown in FIG. 20A, the virtual keyboard may display the string "shoot" above the "o" key, the string "shred" above the "r" key, and the string "shall" above the "a" key. The virtual keyboard may also display the committed characters in the input field 330.

Turning now to FIG. 20B, as the device continues to detect the input gesture, the user moves her finger to the key location 2012 associated with the character "o." When the user pauses momentarily over the "o" key location 2012, the device determines that the user is committing "o" as input. In response, the virtual keyboard 320 presents a second set of predicted strings, based on the committed characters "sho," at key locations it selects based on the relationship between the predicted strings and the non-committed characters of the predicted strings. For example, the string "shock" may appear above the "c" key location and the string "short" may appear above the "r" key location. The device determines that the strings "shred" and "shall" are no longer predicted strings as they do not contain the committed characters "sho." As a result, the virtual keyboard no longer displays "shred" and "shall", as illustrated in FIG. 20B.

With reference now to FIG. 20C, the user completes her swipe by moving to the key location associated with the character "e," then releasing her finger or thumb from the virtual keyboard 320. When the user stops at "e," the device determines that the user is committing the character "e" for input. Further, when the user releases her finger or thumb from the virtual keyboard 320, the device determines that the user completed the swipe and predicts that user is entering the string "shoe." The device displays "shoe" in input field 330.

As the device detects the user's swipe, the device may change its predictions as it gains additional information about the characters the user is committing to input. The additional information can include the direction of the swipe as it relates to non-committed characters of the predicted strings. For example, when a swipe is not in the direction of the next non-committed character of a string, the device may no longer predict the string.

Figure 21A:
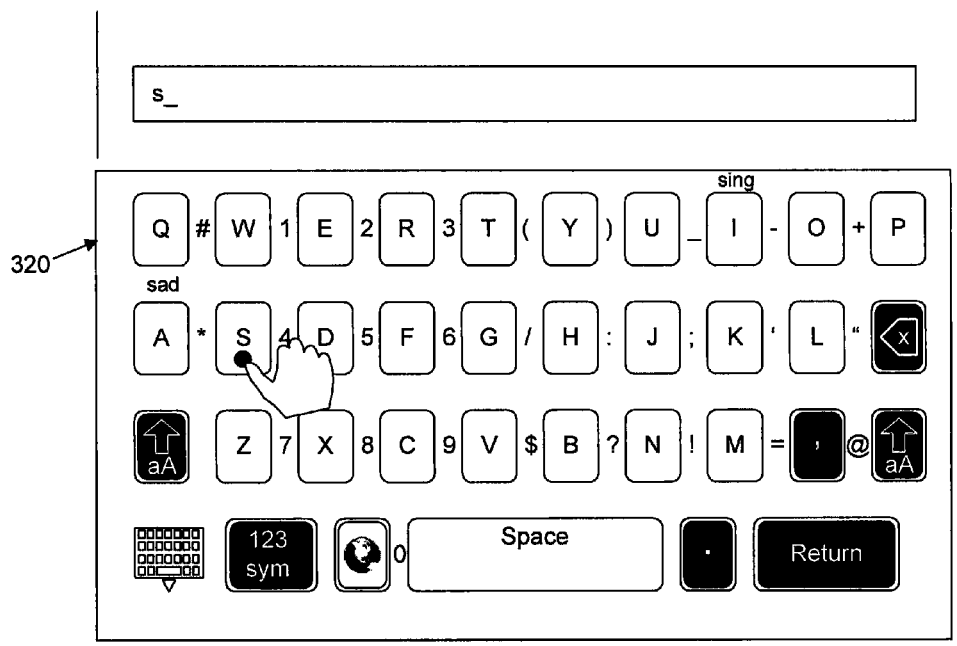
FIG. 21A, 21B, 21C show an example front view of a touchscreen, consistent with embodiments disclosed herein.
Figure 21B:
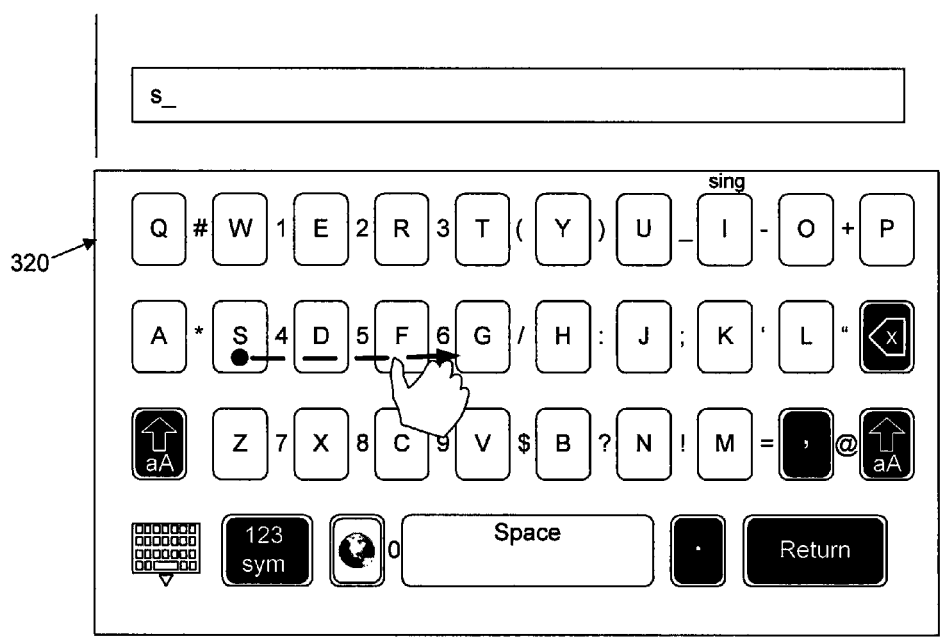
Figure 21C:
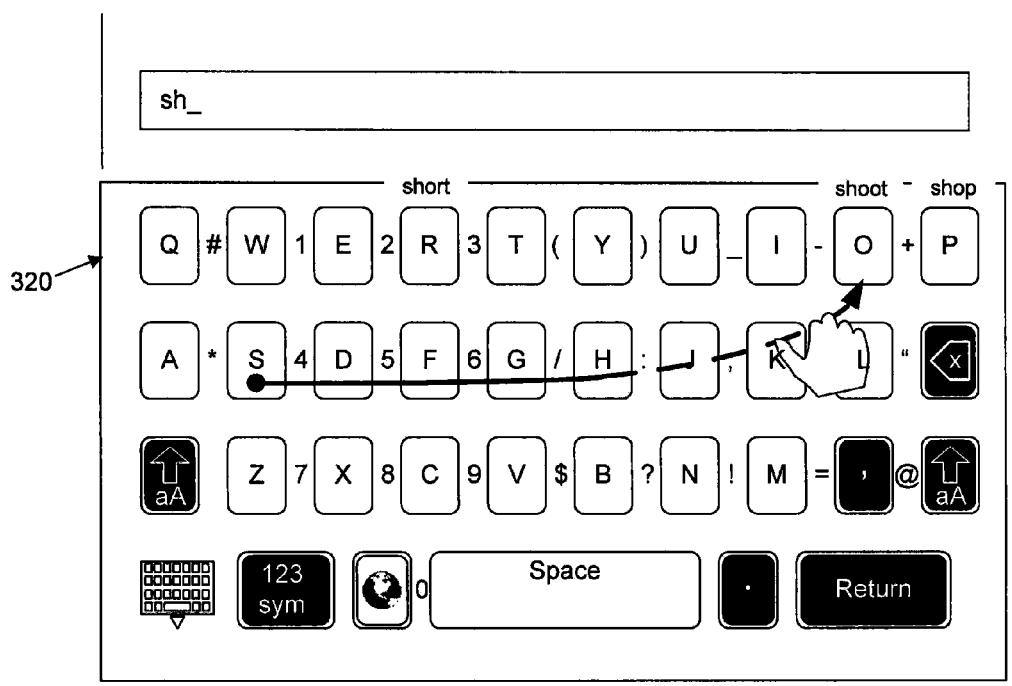

FIGS. 21A-21C illustrate an example of how the device may change its predictions based on the direction of the user's swipe. For the purpose of explaining FIGS. 21A-21C, we begin with the assumption that the user is entering the string "shore." The user begins inputting "shore" by placing her thumb on the "s" key. The device detects the user's input gesture at the key location associated with the character "s," and determines that the user is committing "s" as input. The device suggests the strings "sad" and "sing," and the virtual keyboard 320 may display "sad" above the "a" key and the string "sing" above the "i" key.

Turning now to FIG. 21B, the user continues her input gesture by swiping to the right. The device detects the direction of the input gesture and determines that the user is swiping away from the "a" key and toward the "h" key. As a result, the device determines that the string "sad" is no longer a predicted string, and the virtual keyboard 320 no longer displays the string "sad" above the "a" key.

As shown in FIG. 21C, the user continues the input gesture by swiping to "h" and, once there, changing direction. When the user changes direction at "h," the device may determine that the user is committing "h" as input. Further as the user begins to move away from the "i" key location and toward the "o" key location, the device may determine that "sing" is no longer an appropriate prediction. As a result, the virtual keyboard 320 may no longer display "sing" above the "i" key. Based on the user's input gesture committing "sh" and the direction of the input gesture toward the "o" key, the device suggests the strings "shoot," "short," and "shop." The virtual keyboard 320 displays the strings above the "o" key, the "r" key and the "p" key, respectfully.

Some input gestures include characters matching more than one string which can result in an ambiguous input. For example, the input gestures for the strings "shoe" and "shote" could be the same as the input gesture for the string "shore," as all three strings start with "sho" and the characters "r" and "t" are along the swipe pattern from the "o" key location to the "e" key location. As a result, when the device detects the user swiping from "s" to "h" to "o" and then through "t" and "r" to "e," the device may be unsure if the user is inputting "shoe", "shote," or "shore." An ambiguous input may also occur when the user swipes quickly. For example, when the user attempts to swipe "shore", the user may inadvertently end on "w." As a result, the device may predict four possible strings: "show," "shoe," "shote," or "shore."

Figure 22A:
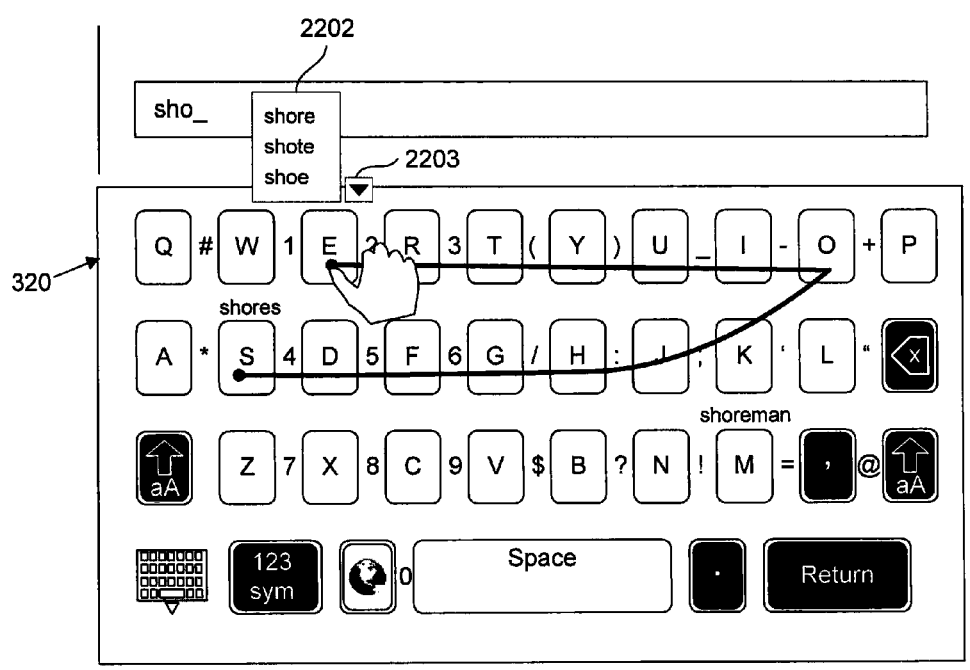
FIG. 22A, 22B, 22C show an example front view of a touchscreen, consistent with embodiments disclosed herein.

To resolve an ambiguous input gesture, the device may display a selection interface 2202, such as the selection interface illustrated in FIG. 22A. For example, the selection interface 2202 may be a pop-up list with the strings "shoe" "shore" and "shote," that appears above the "e" key location of the virtual keyboard 320 at the end of the user's input gesture. To select one of the predicted strings, the user may tap the desired string from the pop-up list.

Figure 22B:
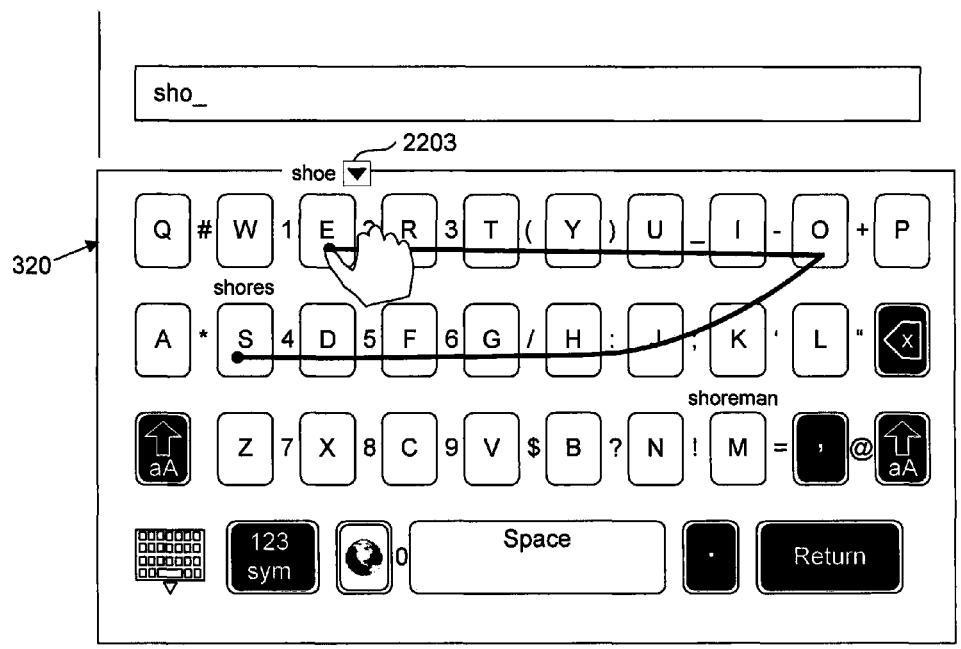

In some embodiments, the device may display a user element, such as a list indicator 2203, before displaying the selection interface 2202. FIG. 22B illustrates one example of the device displaying a list indicator 2203. To display the selection interface 2202, the user taps the list indicator 2203. The list indicator 2203 may be rendered as an arrow, button, or other user interface element. In some embodiments, the list indicator 2203 may be displayed next to the string the device predicts is the most likely string the user is attempting to input. For example, when the device detects an input gesture moving from "s" to "h" to "o" to "e," the string "shoe" and a list indicator 2203 (such as an arrow) may be displayed near the "e" key. If the user desires to input the string "shoe" the user may tap "shoe," but if the user would like to see a list of additional suggestions matching the input gesture (such as "shore" and "shote," for example), the user may tap the list indicator 2203 to open the selection interface 2202 (shown in FIG. 22A).

Figure 22C:
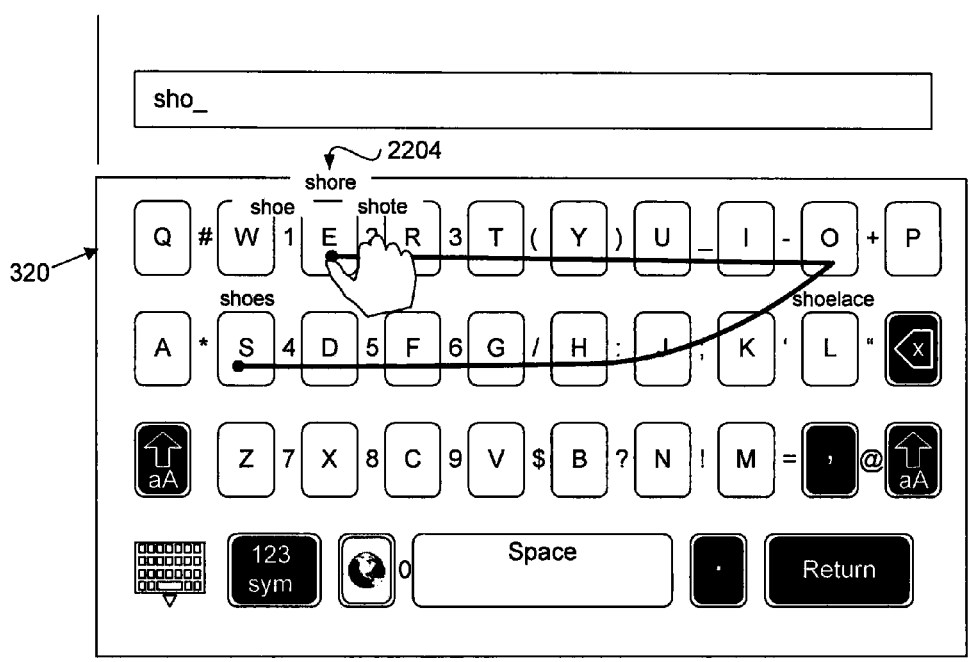

Turning to FIG. 22C, in another embodiment, the virtual keyboard 320 may display multiple predicted strings in a cluster 2204 around the final key location of an input gesture. Once the strings appear in the cluster 2204, the user may tap one of them to select it for input. In addition to displaying predicted strings in a cluster 2204 or pop-up list 2202 at the final key location of the input gesture, the virtual keyboard may also display additional predicted strings at other key locations associated with non-committed characters of the predicted strings that match the input gesture. For example, as shown in FIG. 22C, when the device detects an input gesture committing "shoe", the virtual keyboard may display the string "shoelace" above the "l" key and the string "shoes" above the "s" key in addition to displaying the cluster 2204 at the "e" key.

In some embodiments, the virtual keyboard 320 may not display the string the user is attempting to input. Accordingly, the device may provide a way for the user to command the virtual keyboard 320 to display additional, predicted strings. In some embodiments, the device may detect multi-touch input gestures and display additional predicted strings in response. For example, the device can detect that the user is keeping a first finger on the last key location of an input gesture and detect that the user is tapping a second finger on the virtual keyboard 320. In response, the device display additional suggestions.

Figure 23A:
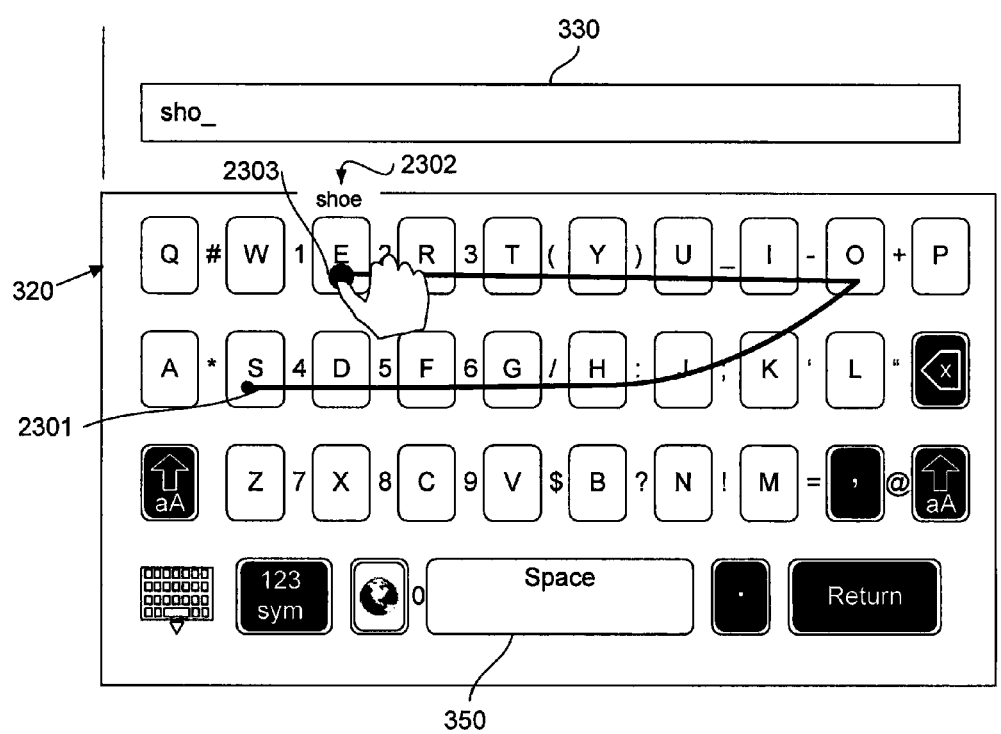
FIG. 23A, 23B show an example front view of a touchscreen, consistent with embodiments disclosed herein.
Figure 23B:
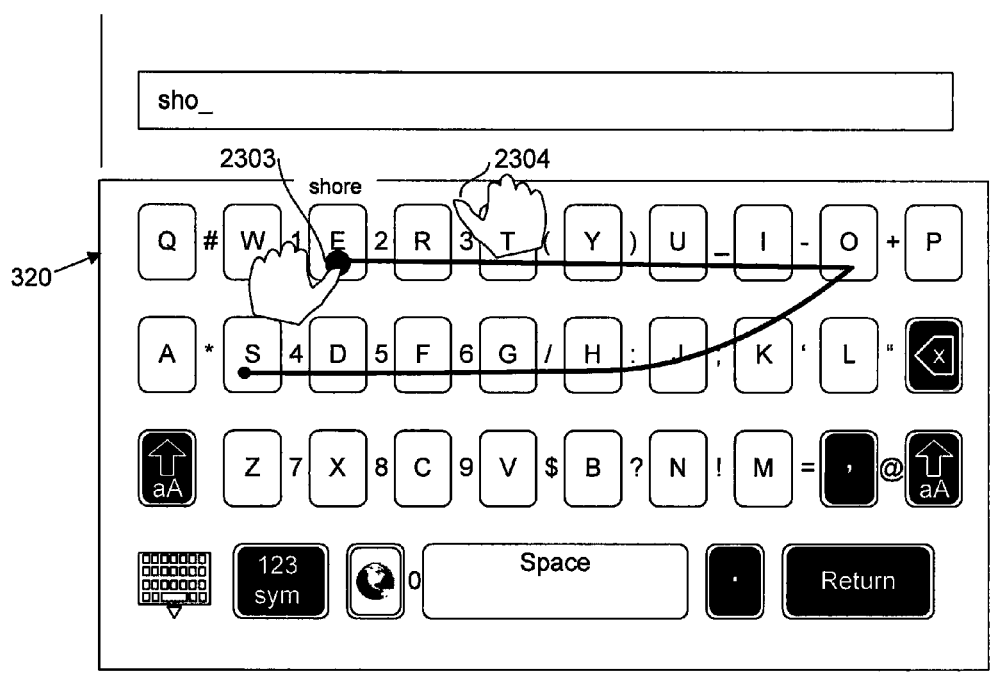

FIGS. 23A and 23B illustrate the use of multi-touch input gestures to display additional predicted strings. As shown in FIG. 23A, when the device detects an input gesture committing the characters "shoe," the virtual keyboard 320 may display the string "shoe" 2302 above the "e" key. However, instead of "shoe," the user may have wanted to input "shore." To command the virtual keyboard to display additional suggestions, including "shore," the user may keep a first finger on the "e" key 2303 (at the end of the swipe pattern) and then tap a second finger 2304 on the virtual keyboard 320 to display another predicted string. In the example shown in FIG. 23B, the next suggested string may be "shore." When there are several predicted strings matching the input gesture, the device cycles through each of the strings as the user continues to tap the virtual keyboard 320 with the second finger 2304. Once the user sees the string she is attempting to input, she may tap it. The device interprets the tap as a selection of the desired string. For example, when the device detects a swipe that results in the strings "shoe," "shore," or "shote", the device may predict that "shoe" is the most likely string to be entered by the user. The virtual keyboard displays "shoe" at the key location that is at the end of the input gesture. If "shoe" is not the string the user is attempting to input, the user can tap a second finger on the virtual keyboard while keeping her first finger on "e", and the virtual keyboard may display "shore." If the user wants to input "shore", she taps it. If the user would like to see additional suggestions, the user continues to tap her second finger on the virtual keyboard while keeping her first finger on "e" to cycle through additional predictions until the displayed string is the string the user desires to input. In some embodiments, the virtual keyboard may have a dedicated area for tapping to cycle through the predicted strings. In other embodiments, the user may tap a second finger anywhere on the virtual keyboard to cycle through the predicted strings.

Swipe-Then-Flick Mode

Figure 24A:
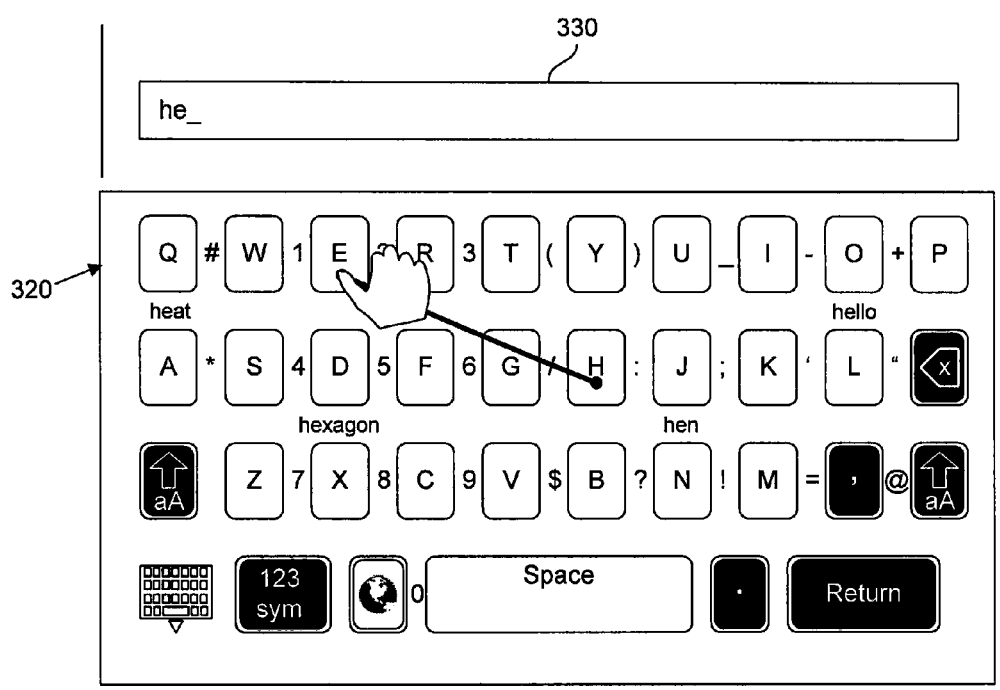
FIG. 24A and 24B show an example front view of a touchscreen, consistent with embodiments disclosed herein.
Figure 24B:
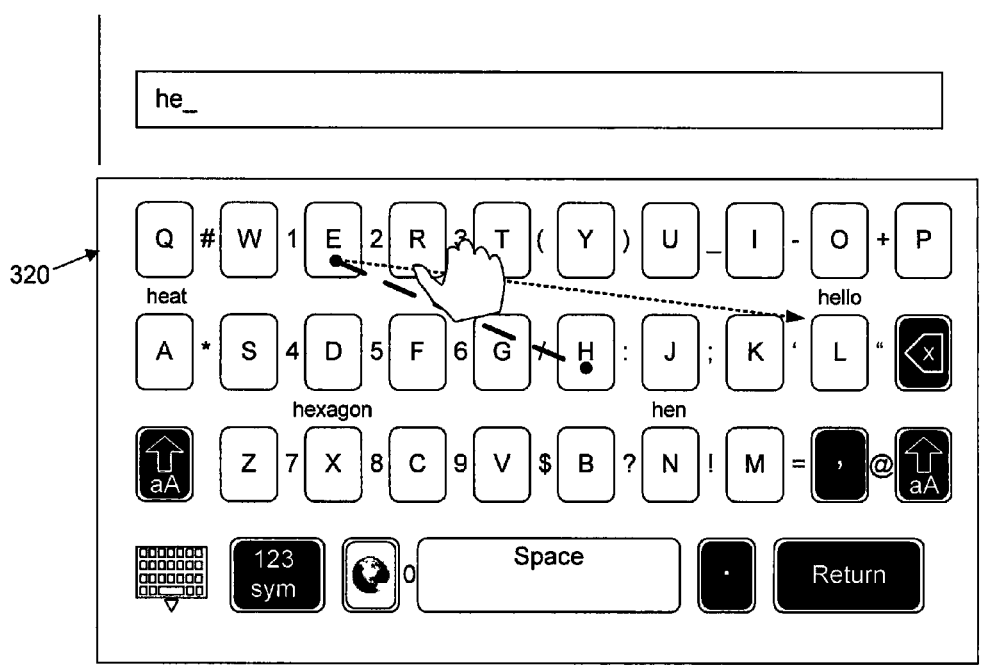

In some embodiments, the device may have a swipe-then-flick mode. In the swipe-then-flick mode, a user enters strings by swiping her finger over key locations of the virtual keyboard 320 to begin spelling out a string. In response, the device displays predicted strings on the virtual keyboard 320. To select one of the displayed strings, the user flicks (a swipe at a faster speed) in the direction of a displayed string. The swipe-then-flick mode allows a user to quickly select a suggested string without lifting a finger from the virtual keyboard 320. FIGS. 24A and 24B illustrate an example of the swipe-then-flick mode. In FIGS. 24A and 24B, the user's swipe is illustrated with a solid line, while the user's flick is depicted using a dotted line with an arrow pointing in the direction of the flick.

For the purpose of explaining FIGS. 24A and 24B, we begin with an assumption that the user wishes to input the word "hello." For example, as shown in FIG. 24A, the user begins to input the string "hello" by starting a swipe at the "h" key and then moving to the "e" key. As the user begins to change direction at the "e" key the device determines that the user is committing "he" for input. The device predicts the strings "hello", "heat", "hen," and "hexagon," and the virtual keyboard displays the predicted strings over the "l," "a," "n", and "x" key locations, respectively.

As shown in FIG. 24B, to select "hello," the user flicks toward "hello" which is displayed at the "l" key location. As the flick is much quicker than the swipe, the device determines that the user is selecting one of the displayed words rather than continuing to commit additional characters for input. The device determines the direction of the flick, determines that it is toward "hello," and interprets the flick as the user selecting "hello."

In swipe-then-flick mode, the virtual keyboard may display suggested strings based on whether there would be ambiguity in interpreting the flick motion. For example, when the device detects a user swiping from "h" to "e", the device may predict "hen," "hem," and "hello." The virtual keyboard 320, however, may only display one of these strings because the "n," "m," and "o" key locations are close together, and a flick in the direction of any of these key locations may result in an ambiguous selection. Thus, the device may select the string that is most likely to be entered by the user, and the virtual keyboard may only display that string for selection. For example, if the user is in an email application and is just starting to input text, "hello" may be suggested by the device and displayed by the virtual keyboard.

Tap-Then-Swipe Mode

Figure 25A:
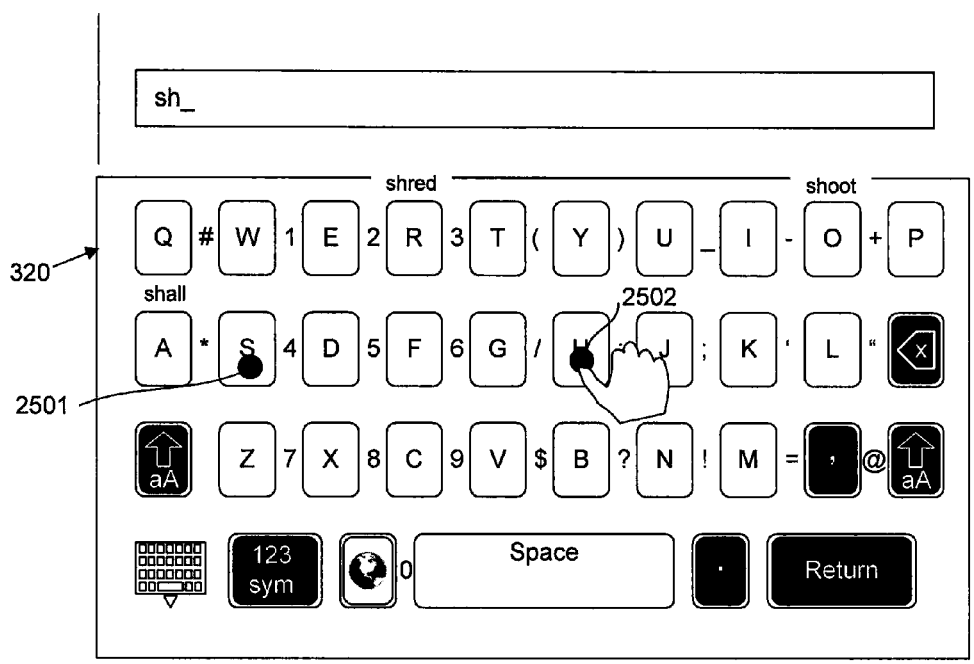
FIG. 25A and 25B show an example front view of a touchscreen, consistent with embodiments disclosed herein.
Figure 25B:
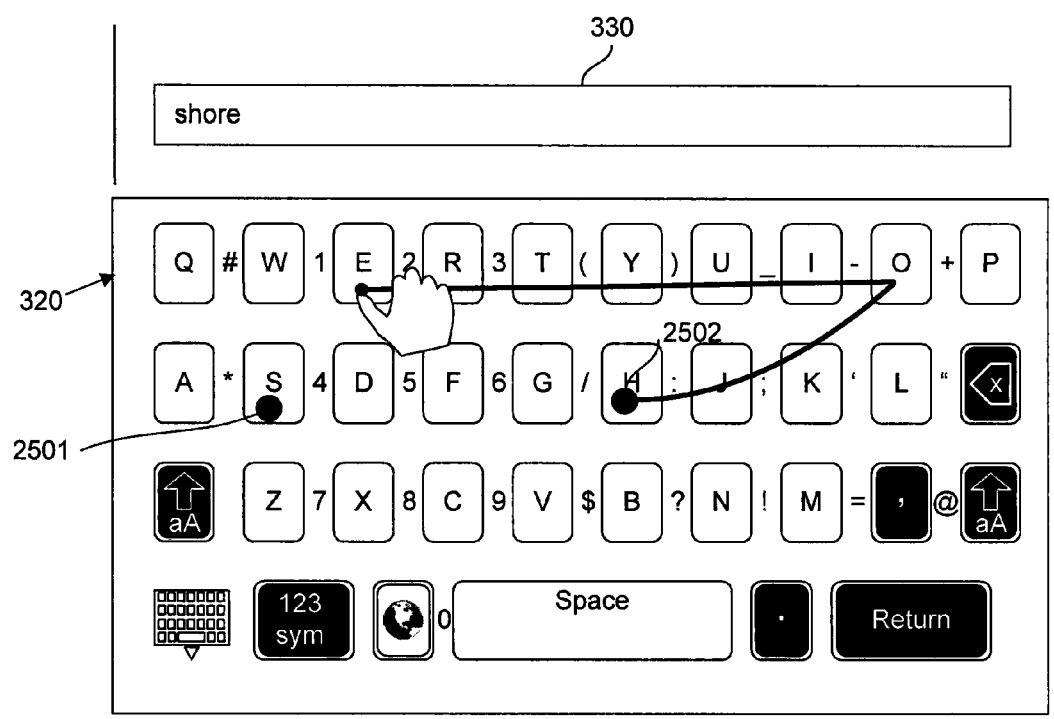

In some embodiments, the device may have a tap-then-swipe mode. In the tap-then-swipe mode, the user taps the first few characters of a string, then swipes the remaining characters. By tapping the first few characters, the user may prevent ambiguous input. FIGS. 25A and 25B illustrate an example of the tap-then-swipe mode.

For the purpose of explaining FIGS. 25A and 25B, we begin with the assumption that a user is attempting to input the word "shore." The user begins the input by tapping the "s" key (indicated by touch 2501) and then the "h" key (indicated by touch 2502). The device interprets the taps as the user committing the characters "sh" for input, and the device may predict the words "shall," "shoot," and "shred." As shown in FIG. 25A, the virtual keyboard 320 displays the predicted words above the key locations associated with the first non-committed character of the predicted strings following "sh." For example, the virtual keyboard displays "shoot" above the "o" key, "shall" above the "a" key, and "shred" above the "r" key.

Turning now to FIG. 25B, once the user taps "sh," she swipes the remainder of the word "shore" by swiping from "h," to "o," and then to "e." The device predicts the user is attempting to enter "shore" and the virtual keyboard displays "shore" in input field 330.

Verbatim Mode

In some embodiments, a user may input characters that the device does not recognize as part of a predicted string. For example, the user may input characters that are part of names or abbreviations and that are not part of the device's dictionary. In addition, the user may desire to enter verbatim text to help resolve ambiguous text entry. Accordingly, the virtual keyboard 320 may have a verbatim mode that allows the user to enter verbatim text. In some embodiments, the user enters verbatim text by swiping at a slower speed and briefly pausing on each key location associated with each character to be committed as input. The device may interpret the slow speed of the swipe and the pauses over each key location as a verbatim text entry.

Figure 26:
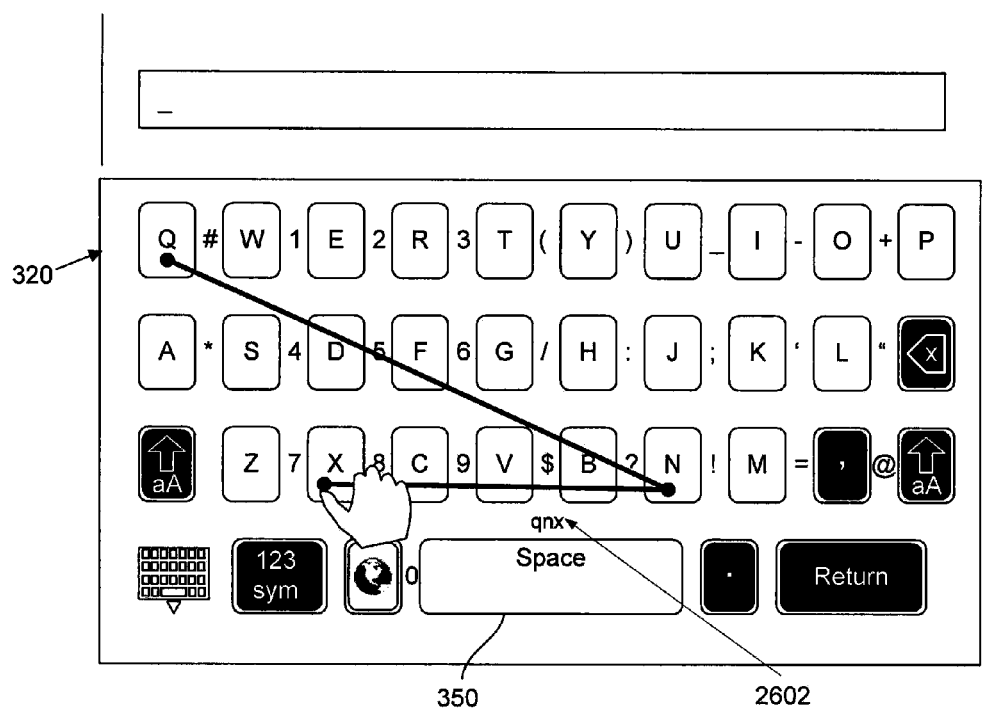
FIG. 26 shows an example front view of a touchscreen, consistent with embodiments disclosed herein.

When the device detects slow swiping and pausing at key locations, the characters associated with the key locations where the user paused during the swipe may be committed as input. The virtual keyboard 320 may display the committed characters above the space bar 350 of the virtual keyboard. The user may tap the displayed, committed characters, and the device may interpret the tap as a selection of the committed characters as verbatim text. For example, as shown in FIG. 26, the device may detect a swipe where the user starts at "q," pauses, slowly swipes to "n," pauses, and then slowly swipes to "x," and releases. The verbatim text 2602 ("qnx") appears above the space bar 350. The user selects "qnx" by tapping it. In some embodiments, the device may provide a dedicated key that, when selected, places the virtual keyboard in verbatim mode. In other embodiments, the virtual keyboard may enter verbatim mode automatically by detecting the swipe speed and pauses of the user.

Figure 27:
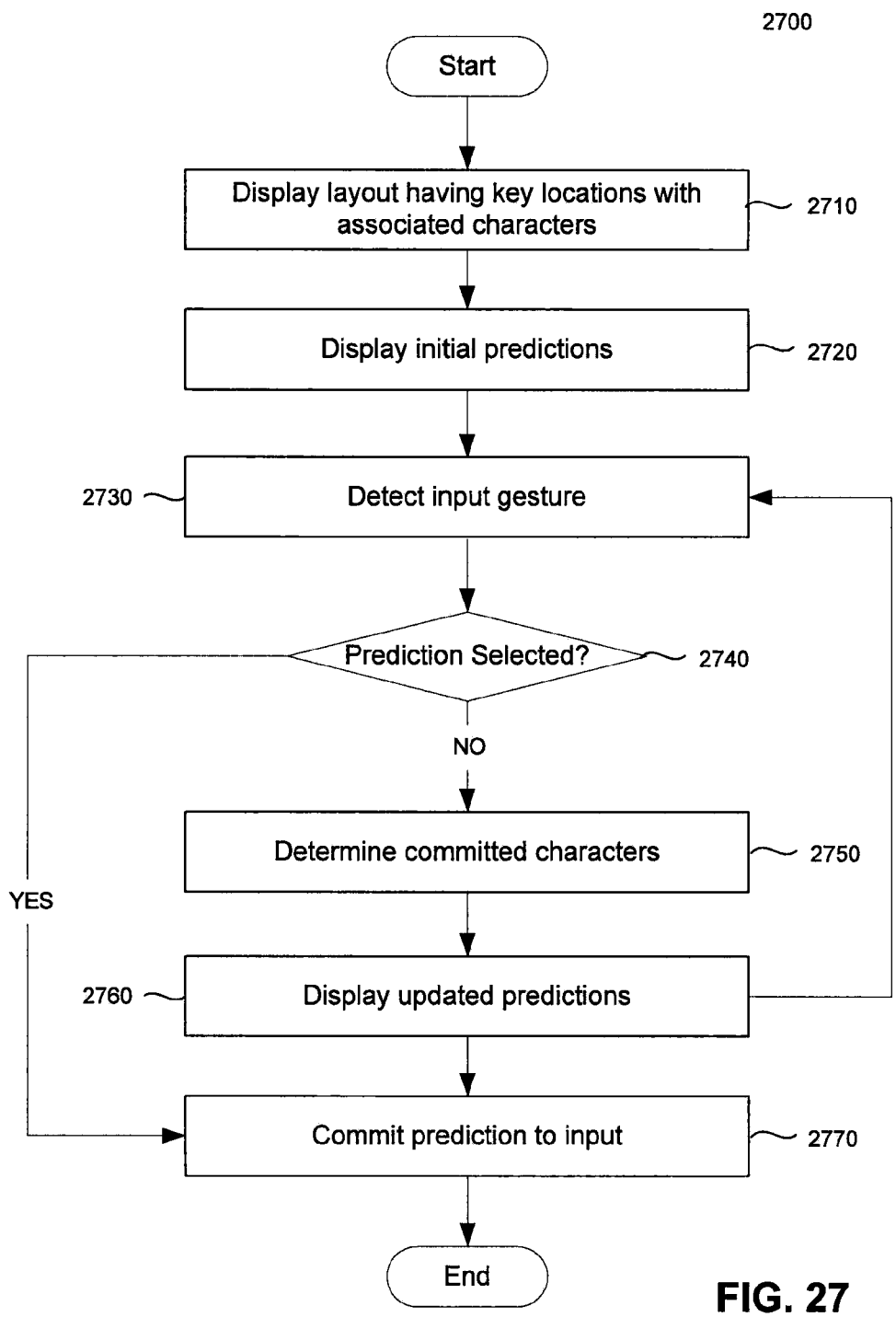
FIG. 27 is a flowchart illustrating an example method, consistent with embodiments disclosed herein.

FIG. 27 is a flowchart illustrating a method 2700 performed by the device in embodiments having a swipe-then-tap mode, a swipe-then-flick mode, a tap-then-swipe mode, and/or a verbatim mode. Method 2700 can be implemented with a processor, such as the main processor 102 of the device, and stored as software instructions on a tangible computer readable medium, such as hard drives, CDs, DVDs, flash memory, and the like, that can be executed by the main processor 102 of the device.

At box 2710, the device displays a layout having key locations with associated characters. The device displays the layout in response to an input received by the user indicating that the user would like to input text. For example, a user may open a text editing application, select a text field that is part of an electronic form, or select a user interface button to reply to an email message. The layout may include a virtual keyboard 320 such as the virtual keyboard 320 of FIGS. 20A-26. The layout includes key locations, and each key location is associated with a character. For example, the layout may include a key location associated with the character "t." In some embodiments, the device may render the key locations as virtual keys of a virtual keyboard, and the rendering of the virtual keys may include a representation of the key location's associated character.

Once the device displays the layout, the device displays initial predictions at box 2720. The initial predictions may include one or more strings that the device predicts for the user. The device can generate the initial predictions based on context. For example, when the user is responding to an email, the device may predict the strings "Dear" and "Hello." The device may also generate the initial predictions based on frequently used strings. For example, if a user generally begins replies to emails with the sender's first name, the device may generate an initial prediction that is the sender's first name. After generating the initial predictions, the device displays them at key locations associated with characters in the predicted strings. For example, the device may display "Dear" at the "d" key location and "Hello" at the "h" key location.

At box 2730, the device detects an input gesture from the user. The input gesture may be, for example, a swipe or a tap. At box 2740, the device determines whether the input gesture represents a selection of one of the initial predictions or a selection of characters. For example, the user may select a predicted string by tapping it, and the device may interpret the tap as the user selecting the predicted string for input. When the device determines that the user selected a prediction (box 2740:YES), the device commits the prediction to input at box 2770. The device may, for example, display the committed prediction in a text area or text field associated with the application for which the user is entering text.

When the device determines that a user has not selected a prediction, but rather, the detected input gesture represents a selection of characters (box 2740: NO), the device determines, at box 2740, which characters the user is committing to input based on the input gesture. The input gesture may represent a tap or a swipe. When the input gesture is a tap at a key location, the device may determine the user is committing the character associated with the key location to input. For example, when the device detects a tap at a key location corresponding to the letter "a," the device determines that the user is committing "a" as input.

When the input gesture is a swipe, the device determines whether the user is attempting to commit a character to input based on a change in the user's swipe, and commits the character associated with the key location at the point where the user's swipe changed. The device may detect a change in the user's swipe when the swipe begins at a key location and moves in a direction away from the key location. For example, a user may swipe the word "shoe." To start the swipe, the user will place her thumb on the "s" key. When the user moves her thumb toward the "h" key, the device will detect a change in the swipe. As the user started on the "s" key and is moving away from it, the device determines that the user's swipe changed at the "s" key. Accordingly, the device determines that the user is committing "s" as input.

The device may also detect a change in the user's swipe when the direction of the swipe changes. For example, when the user swipes "shoe" and reaches the "h" key, the user may continue to swipe toward the "o" key. As the "o" key is above and to the right of the "h" key, the user must change the direction of her swipe from straight to the right (moving from "s" to "h") to up and to the right (moving from "h" to "0") at the "h" key. The device detects the change in direction at the "h" key, and accordingly determines that the user is committing "h" as input.

The device may also detect a change in the user's swipe when the user's swipe changes speed or pauses momentarily. For example, when the user swipes "swerve" and reaches the "w" key, the user may continue to swipe toward the "e" key and the "r" key. As the "e" key is in the same direction as the "r" key from the "w" key, the user may pause or slow down the swipe at "e" before landing on "r." The device detects the pause at the "e" key and determines that the user is committing "e" as input.

After the device determines that the user is committing a character to input, the device may update the predicted strings based on the characters that have been so far committed. At box 2750, the device displays updated predictions. The device displays the predictions at or near the key locations of characters that have an association with the non-committed characters of the predicted strings. In some aspects, the device may display the predictions at or near key locations associated with the first non-committed characters of the predicted strings. For example, when the device determines the user has committed the characters "cl" as input, the device may determine "clog," "clap," and "clean" as predicted strings. The device may display "clog" at or near the "o" key, "clap" at or near the "a" key, and "clean" at or near the "e" key.

The device may also display predictions at or near key locations associated with non-committed characters of the predicted strings that are not the first non-committed characters of the predicted strings, such as the second or third non-committed characters of the predicted strings. For example, when the device determines the user has committed the characters "cl" as input, the device may determine "clan" and "clap" as predicted strings. As "clan" and "clap" share the same first non-committed character ("a"), the device may display "clan" at the "n" key location and display "clap" at the "p" key location. The device may also display multiple predictions at or near one key location. For example, the device may display multiple predictions at or near one key location in a cluster or list as described above with respect to FIGS. 22A-22C.

After the device displays updated predictions, processing returns to box 2730 where the device continues to detect input gestures from the user. The device may continue to perform boxes 2730-2760 until a string is committed to input. The device may commit a string to input based on an input gesture from the user selecting a predicted string. As described above, when the user taps a predicted string, the device may commit the predicted string to input. In some embodiments, the user may select a predicted string by flicking (i.e., swiping very quickly) in the direction of the predicted string (for example, as described above with respect to FIGS. 24A-24B). When the device detects a flick in the direction of a predicted string, the device commits the predicted string to input.

Other embodiments will be apparent to those skilled in the art from consideration of the specification and practice of the disclosure. It is intended that the specification and examples be considered as examples only.

What is claimed is:

1. An input method for a communication device having a programmed algorithm configured to predict input, the input method comprising:
   displaying an initial predicted string;
   detecting a swipe input gesture;
   determining one or more committed characters, wherein each one of the one or more committed characters is committed based at least in part on a change of direction in the swipe input gesture at a key location associated with the corresponding committed character, and;
   displaying an updated predicted string, the updated predicted string including the one or more committed characters and having been generated by the programmed algorithm configured to predict input,
   wherein the updated predicted string is presented at or near a key location associated with the non-committed characters of the updated predicted string.

2. The input method of claim 1, further comprising receiving a selection input reflecting a selection of the updated predicted string.

3. The input method of claim 2, wherein the selection input comprises one of: a tap gesture or a flick in the direction of the updated predicted string.

4. The input method of claim 1, further comprising displaying a second updated predicted string at or near the key location.

5. The input method of claim 4, wherein the updated predicted string and the second updated predicted string are presented in a selection list.

6. The input method of claim 4, wherein the updated predicted string and the second updated predicted string are presented in a cluster at or near the key location.

7. The input method of claim 1, wherein the swipe input gesture includes pauses over one or more key locations and the updated predicted string includes a verbatim string of the associated characters of the one or more key locations.

8. The input method of claim 7, wherein the verbatim string is presented at or near a key location associated with a space character.

9. The input method of claim 1 wherein the updated predicted string is presented: adjacent to the key location, above the key location, or in close proximity to the key location.

10. A communication device, comprising:
    a display, and
    a processor configured to read computer executable instructions that when executed:
    display an initial predicted string;
    detect a swipe gesture;
    determine one or more committed characters, wherein each one of the one or more committed characters is committed based at least in part on a change of direction in the swipe gesture at a key location associated with the corresponding committed character, and;

display an updated predicted string at or near a key location that is selected based at least in part on a relationship between the updated predicted string and non-committed characters of the updated predicted string, wherein the updated predicted string includes the one or more committed characters.

11. The communication device of claim 10, wherein the processor is further configured to read computer executable instructions that when executed receive a selection input reflecting a selection of the updated predicted string.

12. The communication device of claim 11 wherein the selection input comprises one of: a tap gesture or a flick in the direction of the updated predicted string.

13. The communication device of claim 10, wherein the processor is further configured to read computer executable instructions that when executed display a second updated predicted string at or near the key location.

14. The communication device of claim 13, wherein the updated predicted string and the second updated predicted string are presented in a selection list.

15. The communication device of claim 13, wherein the updated predicted string and the second updated predicted string are presented in a cluster around the key location.

16. The communication device of claim 10, wherein the input gesture comprises pauses over one or more key locations and the updated predicted string is a verbatim string of the associated characters of the one or more key locations.

17. The communication device of claim 16 wherein the verbatim string is presented at a key location associated with a space character.

18. The communication device of claim 10, wherein the updated predicted string is displayed at or near a key locations by displaying the updated predicted string adjacent to the key location, above the key locations, or in close proximity to the key location.

19. An input method for a communication device having a keyboard, the input method comprising:

detecting an input gesture, the input gesture comprising a direction, determining one or more committed characters, wherein each one of the one or more committed characters is committed based at least in part on a change of the direction of the input gesture at a key location associated with the corresponding committed character and, presenting on a display one or more strings at or near key locations that are selected based at least in part on a relationship between each presented string and a character associated with the selected key location, wherein the one or more strings include the one or more committed characters.

20. The input method of claim 19, wherein the one or more strings are presented by displaying the one or more strings: adjacent to the key locations, above the key locations, or in close proximity to the key locations.

\* \* \* \* \*